United States Patent [19]

Mackey et al.

[11] Patent Number: 5,153,577
[45] Date of Patent: Oct. 6, 1992

[54] MAPPING CHARACTER COLOR ATTRIBUTES INTO GREY PIXEL PATTERNS

[75] Inventors: Kevin J. Mackey, Palo Alto; Donald R. Woods, Los Altos, both of Calif.

[73] Assignee: Xerox Corporation, Stamford, Conn.

[21] Appl. No.: 171,506

[22] Filed: Mar. 21, 1988

Related U.S. Application Data

[62] Division of Ser. No. 856,525, Apr. 28, 1986, Pat. No. 4,899,136.

[51] Int. Cl.⁵ .............................................. G09G 1/14
[52] U.S. Cl. ................................... 340/793; 340/703
[58] Field of Search ......................... 340/793, 701, 703

[56] References Cited

U.S. PATENT DOCUMENTS

| | | | |
|---|---|---|---|
| 3,643,252 | 2/1972 | Roberts, Jr. | 340/324 A |
| 3,932,843 | 1/1976 | Trelut et al. | |
| 4,149,148 | 4/1979 | Miller et al. | 340/721 |
| 4,149,238 | 4/1979 | James et al. | 364/200 |
| 4,204,206 | 5/1980 | Bakula et al. | 340/721 |
| 4,253,145 | 2/1981 | Goldberg | 364/200 |
| 4,278,973 | 7/1981 | Hughes et al. | 340/721 |
| 4,315,310 | 2/1982 | Bayliss et al. | 364/200 |
| 4,365,295 | 12/1982 | Katzman et al. | 364/200 |
| 4,437,184 | 3/1984 | Cork et al. | 371/19 |
| 4,456,954 | 6/1984 | Bullions, III et al. | 364/200 |
| 4,458,331 | 7/1984 | Amezcua et al. | 364/900 |
| 4,463,442 | 7/1984 | Dachowski et al. | 364/900 |
| 4,484,266 | 11/1984 | Becker et al. | 364/200 |
| 4,484,302 | 11/1984 | Cason et al. | 364/900 |
| 4,550,386 | 10/1985 | Hirosawa et al. | 364/900 |
| 4,555,775 | 11/1985 | Pike | 364/900 |
| 4,564,903 | 1/1986 | Guyette et al. | 364/300 |
| 4,569,081 | 2/1986 | Mintzer et al. | 382/47 |
| 4,574,364 | 4/1986 | Tabata et al. | 364/721 |
| 4,688,031 | 8/1987 | Haggerty | 340/793 |
| 4,725,833 | 2/1988 | Nakamura | 340/793 |
| 4,827,255 | 5/1989 | Ishii | 340/793 |

FOREIGN PATENT DOCUMENTS

| | | |
|---|---|---|
| 0165517 | 12/1985 | European Pat. Off. |
| 0168034 | 1/1986 | European Pat. Off. |
| 223383 | 5/1987 | European Pat. Off. |

OTHER PUBLICATIONS

Irwin, J. W., "Use of a Coprocessor for Emulating the PC AT", in F. Waters, Ed., *IBM RT Personal Computer Technology*, IBM, Austin, 1986, pp. 137-141.

Krishnamurty, R., and Mothersole, T., "Coprocessor Software Support", in F. Waters, Ed., *IBM RT Personal Computer Technology*, IBM, Austin, 1986, pp. 142-146.

(List continued on next page.)

*Primary Examiner*—Jeffery A. Brier
*Attorney, Agent, or Firm*—W. Douglas Carothers, Jr.; James T. Beran

[57] ABSTRACT

An emulator emulates a processor that provides a display in which each character is presented in a foreground color on a background color. The emulator maps the foreground colors and background colors into gray pixel patterns for display, with the foreground colors being mapped differently than the background colors. Each background color is mapped into a respective gray pattern, with some of the gray patterns representing more than one background color if necessary. In general, the foreground colors are mapped to three pixel patterns—white, 50% gray, and black. For a given background color, two of these three gray patterns are chosen as most legible, and one is used for the lighter foreground colors and the other for the darker foreground colors. In the special case where the foreground color is the same as the background color, however, the foreground color is mapped to the same gray pattern as the background color so that the character is invisible.

10 Claims, 48 Drawing Sheets

OTHER PUBLICATIONS

Goering, R., "Apollo Entry Fuels CAE/CAD Workstation Battle", *Computer Design*, Mar. 1, 1986, pp. 26-27.

"Copydisk", Xerox Corp., Palo Alto, 1980.

Rose, C. D., "Apollo Fights Back with New Work Stations", *Electronics*, Feb. 24, 1986, pp. 20-21.

Mace, S. and Sorenson, K., "Amiga, Atari Ready PC Emulators", *InfoWorld*, vol. 8, No. 18, May 5, 1986.

*8010 Star Information System Reference Library*, 5.0 Update, Xerox Corporation, 1984, pp. 119-188.

David C. Smith et al., "The Star User Interface: An Overview", Proceedings of the National Computer Conference, Houston, Tex., Jun. 7-10, 1982, pp. 515-528.

David C. Smith et al., "Designing the Star User Interface", *Byte* Magazine, vol. 7(4), 15-28, Apr. 1982.

FIG. 4B

Xerox DOS 3.10

| NAME | EXTENSION | SIZE | DATE | TIME |
|---|---|---|---|---|
| FORMAT | COM | 10471 | 24-Oct-85 | 13:49:46 |
| GRAFTABL | COM | 1273 | 12-Aug-85 | 16:17:16 |
| GRAPHICS | COM | 5730 | 10-Apr-85 | 18:27:06 |
| JOIN | EXE | 8956 | 15-May-85 | 0:00:54 |
| KEYBFR | COM | 3248 | 15-Jul-85 | 15:04:06 |
| KEYBGR | COM | 3248 | 15-Jul-85 | 15:04:04 |
| KEYBIT | COM | 3248 | 15-Jul-85 | 15:04:06 |
| KEYBSP | COM | 3248 | 15-Jul-85 | 15:04:06 |
| KEYBUK | COM | 3840 | 27-Aug-85 | 14:13:56 |
| LABEL | COM | 38422 | 15-May-85 | 0:00:54 |
| LINK | EXE | 5179 | 11-Oct-85 | 12:19:42 |
| MODE | COM | 266 | 15-May-85 | 0:00:54 |
| MORE | COM | 7971 | 24-Oct-85 | 13:53:04 |
| PRINT | COM | 4034 | 24-Oct-85 | 13:53:34 |
| RECOVER | COM | 16448 | 28-Aug-85 | 15:08:38 |
| RESTORE | COM | 154 | 1-Jan-80 | 4:35:08 |
| SAMPLE | TXT | 1006 | 10-Oct-85 | 11:48:04 |
| SELECT | COM | 7856 | 15-May-85 | 0:00:54 |
| SHARE | EXE | | | |

Phoenix ROM BIOS 01/27/86
Copyright (C) Phoenix Software Associates Ltd. 1984, 1985 All Rights Reserved

*FIG. 17B*

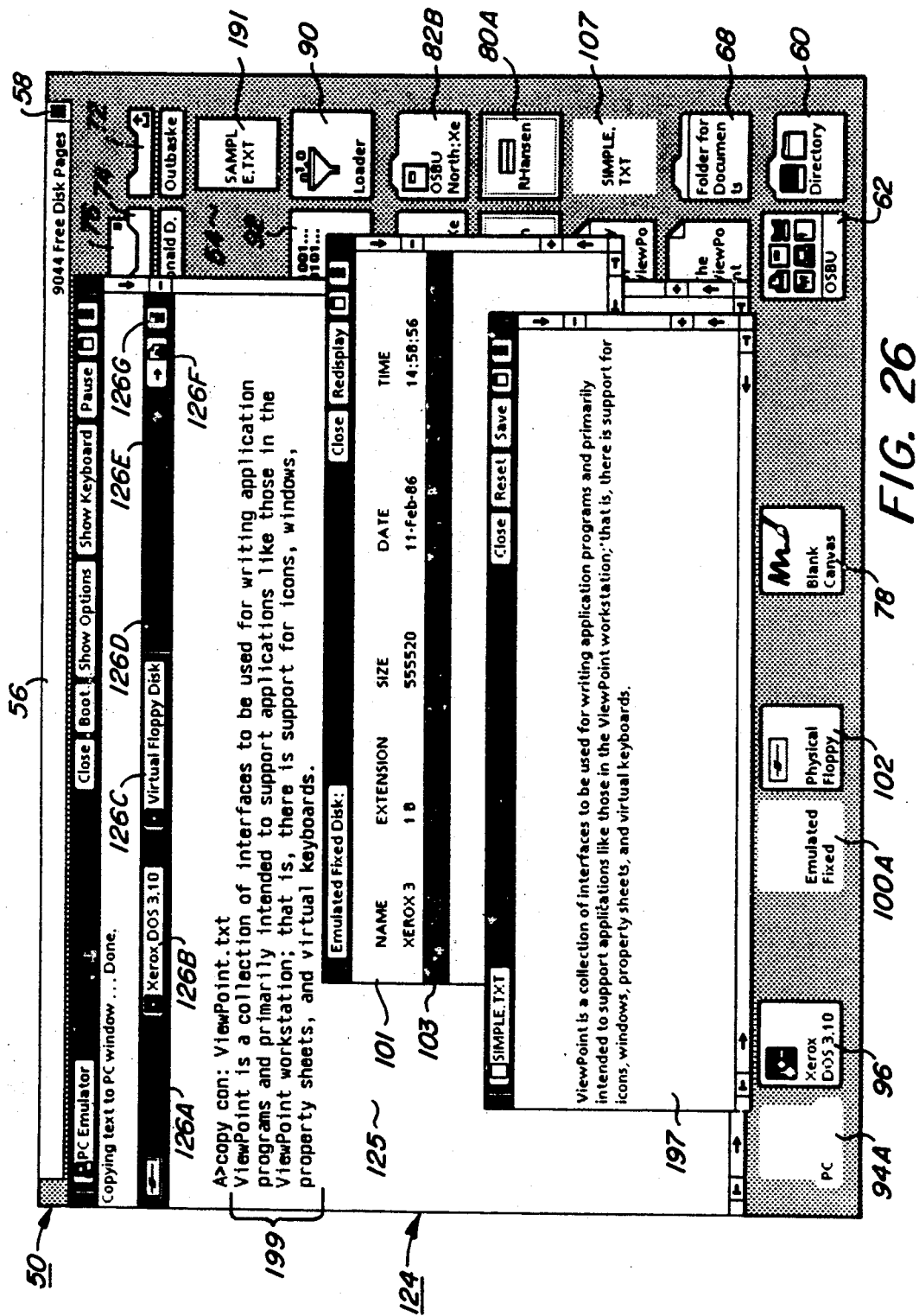

MAPPING CHARACTER COLOR ATTRIBUTES INTO GREY PIXEL PATTERNS

This is a division of application Ser. No. 856,525, filed Apr. 28, 1986, now U.S. Pat. No. 4,899,136.

CROSS-REFERENCE TO RELATED APPLICATION

This application is directly related to the subject matter of patent application Ser. No. 06/856,526, filed Apr. 28, 1986, assigned to the same assignee herein and is incorporated herein in its entirety by reference thereto.

BACKGROUND OF THE INVENTION

This invention relates to video display processor systems for display of video data or information on a single display screen of a raster scan type video display and more particularly to simultaneously displaying video data reflecting the operation of two processors in discrete portions of a single display screen and the user interface therefor. Such a multiprocessor system may comprise a first display processor, e.g. a host computer system, having a display capability for simultaneously displaying both the video data of the first processor and the video data of at least one other display processor, which may, for example, be the emulated display processor of target system central processor, e.g the IBM PC, which other display processor is connected to the host computer. The host computer system allocates a portion of its display screen for emulation of the display screen environment of the emulated display processor. Since the early 1970's, the development and advancement of raster scan display systems for displaying video information on a video or CRT display has progressed at a fairly rapid pace. Examples paramount in the advancement of this area of art include, inter alia, the use of bitmaps which are memory representations of the pattern of information to be presented on the display screen of a the video display, the bitblt or raster op routine which is a fundamental bitmap operation for the bit block transfer of a memory block of information in the display memory from one location to another location in that memory, and the division of a bitmap display into several regions, also referred to in the art by many other terms such as viewports, files, ports, windows, pages or layered bitmaps, to provide separate display of video information in independent screen regions. The processor systems controlling such multi-region screens may include, for example, means (1) for the manipulation of displayed data presented or present in the different regions of the display screen, (2) for the relocation of either entire regions including the displayed data therein to other portions of the display screen or beneath or on top of other display regions of the display screen and (3) for the relocation of displayed data in one screen region to another screen region. Examples of such systems are the Xerox 8010 Professional Workstation or Information System first commercially introduced by Xerox Corporation in April, 1981 and the Xerox 1100 SIP for the Xerox Smalltalk-80 TM System first commercially introduced in November, 1983 and previously described with pictorial representations in Volume 6(8) of BYTE of August, 1981, published by BYTE Publications, Inc., a subsidiary of McGraw-Hill, Inc. See also U.S. Pat. No. 4,414,628 which discloses a raster display system for processing and displaying a plurality of superimposed pages on a single display screen. Further, U.S. Pat. Nos. 4,533,910, 4,450,442 and 4,555,775 respectively disclose raster display systems for (1) creating and displaying video information in different regions on a single display screen, (2) displaying a plurality of display files from separate processors in superimposed relationship and in any desired combination thereof on a single display screen and (3) displaying several superimposed bitmap layers, each representative, for example, of a window port, and wherein all layers are displayed, as superimposed, and are running simultaneously so that any one of the windows may be interacted with at any time.

In recent times, with the introduction of the microprocessor-based IBM PC and its more recent followons, such as, the IBM PC XT and the IBM AT (all collectively hereinafter referred to as the "IBM PC") produced by the IBM Corporation and with its high level of placement in the business community and general consumer market, there has been a number of manufacturers and developers developing systems that have been either designed to be an equivalent to an IBM PC or designed to emulate an IBM PC via an emulating software environment. The wide acceptance of the IBM PC has also created a huge software industry catering to the IBM PC market, including emulated or equivalent versions in that market, for various kinds of applications, e.g Lotus 1-2-3 TM, Wordstar TM, Multimate TM, Symphony TM, Framework II TM, Multiplan TM, Turbo Pascal TM, C Compiler (Microsoft TM), Pascal Compiler (Microsoft TM) and Cobol Compiler (Microsoft TM), etc. Manufacturers and developers have found that in order to maintain their own personal computer based system viable in the market place, they must also make some provision for running IBM PC applications and programs since many customers or potential customers already have IBM PC equipment in use in day to day business and work.

For the most part, these competing manufacturers and developers have provided in their systems separate hardware and/or software for emulating the IBM PC which may be booted and run separately, while their own proprietary system is inactivated, to permit the running of IBM PC applications and programs already in the hands of IBM PC users. While users of such competitive systems can process data or run applications or programs applicable to either the proprietary system or to the IBM PC emulated or equivalent system provided in the same machine, there has been no offering of a means by which the proprietary system can be running simultaneously on the same display facility with the IBM PC emulated or equivalent system so that IBM PC applications and programming could be carried out while the proprietary system is also concurrently running and to further permit the transfer of displayed video data and/or application and program files from one such system to the other for further use or processing.

SUMMARY OF THE INVENTION

According to this invention, a multiprocessor system comprises concurrent display of video data reflecting the operation of two processors in discrete portions of a single display screen with a user interface adapted for interaction with both processors. One processor controls the entire display while allocating a portion of the display screen for the use of the other processor which processor emulates a target processor system, for example. the IBM PC. To fully emulate another target processor system requires emulation of its screen facility and abstractions used in the display operations of the targeted system.

More specifically, the multiprocessor system comprises a general purpose host computer having a central processor having real resources including I/O devices, main memory, a video display with a display bitmap memory for display information that is destined for display on the display screen of said display and user input means, e.g. a keyboard and a cursor control device or mouse, to the host computer to provide user input to the display screen. A user interface on the display screen includes metaphoric symbols with which the user can interact with by using the input means to selectively change the focus of the input means to a designated symbol visually pointed to via the input means to thereafter permit manipulation of the designated symbol or interaction with data input/output relative to the designated symbol. As previously indicated, the system also includes at least one emulating computer having a processor emulating a target processor system and further includes interface means for emulating the above identified real resources for the emulating processor which is responsive to the input/output of the emulating processor for communicative sharing of the central processor real resources by the emulating processor. There are also means in the interface to direct user input via the input means as input for either the central processor or the emulating processor. The input means also initially changes the input focus to either the allocated emulating processor screen portion or to the remaining portion of the central processor display screen prior to interaction with the metaphoric symbols in a selected screen portion. The change of input focus causes subsequent user input via the input means to be directed to particular selected screen portion until interrupted by a change in focus input to the other unselected screen portion, which is accomplished by the user via the input means.

Facilities are also provided to permit transferring of displayed data reflecting the operation of one processor to the control of the other processor in response to user inputs selecting the data to be transferred and indicating the destination of the selected data on the display. More specifically, if data from each processor is displayed in a discrete portion of the display screen, the user may select data in one processor's controlled screen portion or selected document and transfer it to the other processor's controlled screen region, and vice versa.

A more specific aspect relative to the foregoing is that the display environment is designed to emulate the IBM PC display by providing all of the information which would appear on the PC display in a portion of the host system display called the PC emulator window. The display screen of the host system represents an abstraction of the business office metaphor and includes software applications, called "ViewPoint" supported by basic workstation (BWS) software to support those applications. The office metaphor includes an office desktop as well as a representation of the emulating processor as the PC emulator, which is represented as a metaphoric icon or symbol on the host system screen, which, when "opened", reveals an emulated PC window. The display screen of the host system also shows other objects beside the PC emulator window, and some of those objects are other icons for the PC emulator or for the host system operation or for both. Other objects represented in iconic form are in and out baskets, waste baskets, documents, folders, messages, file drawers, printers, etc. Further objects are basic workstation (BWS)) windows and property sheets associated with the operation of either processor and for each of the above mentioned objects. This ability to display both an emulated PC display screen and, in the remainder of the display screen, the conventional display screen of the host system is an important feature of this invention. The host system processor loads the information to be displayed into a bitmap memory from both display data read from the PC's emulated main memory allocated in the host system's main memory as well as display data read from the host system's main memory.

In order to present color text from the PC on the host system's monochrome display, it is necessary to map the colors onto gray pixel patterns. Each character in the PC color/graphics text mode has a foreground color and a background color. The invention provides a novel mapping in which both legibility and invisibility are maintained, as appropriate.

In order to maintain legibility, each background color is mapped to a respective gray pixel pattern. The foreground colors are generally mapped to one of three pixel patterns. The three patterns can, for example, be white, black, and a gray pattern such as 50|% gray. Of these three patterns, the two that are more legible for each background pixel pattern are used for the foreground. One of these two can be used for lighter foreground colors and the other for darker foreground colors.

In order to maintain invisibility, it is necessary to map differently if the foreground color is the same as the background color. In this special case, the foreground color is mapped to the same gray pixel pattern as the background, so that it will be invisible.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4B is a view of the property sheet for a particular application.

FIG. 17B is a view of a virtual floppy disk icon opened to reveal its directory of files.

FIGS. 26 and 26A are views illustrating access to the content of an emulated fixed disk via either the BWS desktop or the PC emulator window.

DETAILED DESCRIPTION OF THE PREFERRED EMBODIMENTS

Table of Contents of Detailed Description

Section

Figure 1:
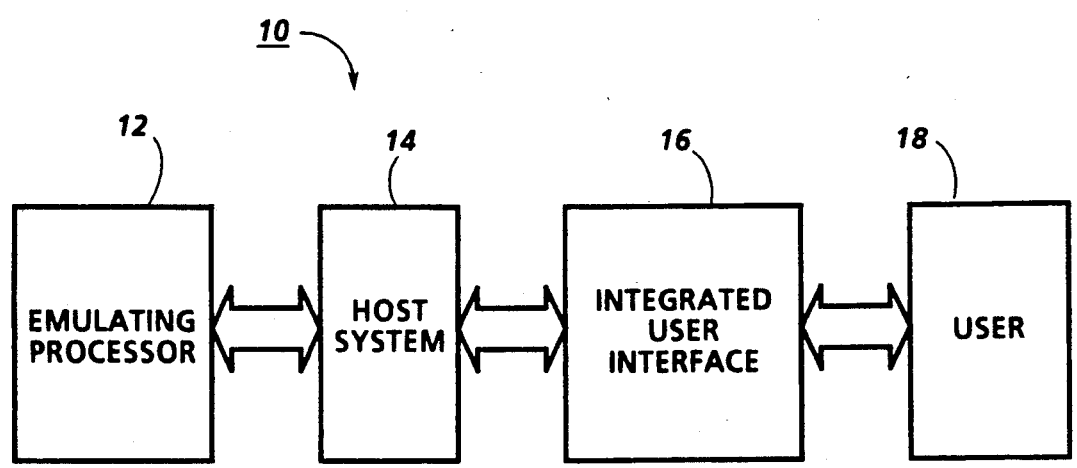
FIG. 1 is a functional block diagram showing the major components of the multiprocessor system of this invention.

I. System Overview
II. User Interface
  A. Icon Types
  B. Icon Operation and Windows
III. PC Emulator and Its Configuration and Reconfiguration
IV. Emulated Fixed Disk (EFD) Icon
V. Virtual Floppy Disk Icon
VI. Physical Floppy Drive Icon
VII. MS-DOS and ViewPoint File Names and Type
VIII. Flowchart Exemplification of PC Emulator Configuration and Reconfiguration
IX. Data Transfer Between PC World and ViewPoint World
X. Monochrome and Color/graphics Display Modes for PC Emulator
XI. Input Mechanism and Methodology
  A. Invoking Icon Functions
    1. Selecting the PC Emulator Icon
    2. Request Property Sheet
    3. Opening the PC Emulator Icon
  B. Data Transfer Between System processors
    1. Move/Copy Input
    2. Exit/Boot Transfer
    3. Freehand Drawing I. System Overview Reference is now made to FIG. 1 wherein there is illustrated the major components of the multiprocessor system 10 utilized in this invention. The emulating processor 12 in system 10 comprises a processor that is capable of executing sequences of the same instructions and instruction set which a central processor of a target system can execute. This means that if one of those sequences of instructions is presented to emulating processor 12, it will perform operations which permit it to continue to execute that sequence to completion. While executing the sequence, it will provide output signals and receive input signals like those of the target system. An example of such a target system is the IBM PC.

Emulating processor 12 shares its resources through an environment that is part of host system 14. These shared resources include I/O devices, memory and display which are all under the control of host system 14. Hose system 14 is modified by a combination of hardware and software to provide emulated I/O and memory for emulating processor 12. This system provides appropriate input signals expected by the target processor system in response to output signals from emulating processor 12. Thus, when emulating processor 12 makes output calls, it is actually making them to host allocated resources, such as allocated memory in host system 14 or to emulated I/O functions, and these calls are handled by system 14 as shared resources of its own environment. On the other hand, emulating processor 12 is content that it is operating with its own resources and has no realization that these remote resources are actually shared with another system. These modifications to system 14 are made without sacrificing its original capabilities but rather by supplementing its capabilities so that the resulting system is more robust and interactively useful in ways not contemplated via operation of host system 14 per se.

Details concerning emulating processor 12 and host system 14 including the emulated interface environment in system 14 for processor 12 are described in detail in previously references U.S. patent application Ser. No. 06/856,526 and is incorporated herein by reference thereto.

Emulation of a target processor system would be cumbersome and not as useful if a user were not able to deal with host system 14 as if its user interface were the target system being emulated. Thus, it is also important to emulate the target processor's user interface in a manner which does not sacrifice and disrupt the established user interface capabilities of host system 14 and yet provides an emulated user interface of the target processor system user interface that is readily recognized by user 18 as the display and user environment of the targeted processor system. This emulated interface is integrated with the host system user interface to form integrated user interface 16. Interface 16, therefore, integrates together the visual user interface of two different inhomogeneous video processor systems into a friendly environment with shared compatability in the transfer of data between the two different systems. The emulated user interface of the targeted processor system, its functions and operation is a primary focus of this invention.

To understand interface 16, it is useful to briefly discuss as background the basic software architecture of host system 14 and also described some attributes common to the user interface already adopted for host system 14.

Figure 2:
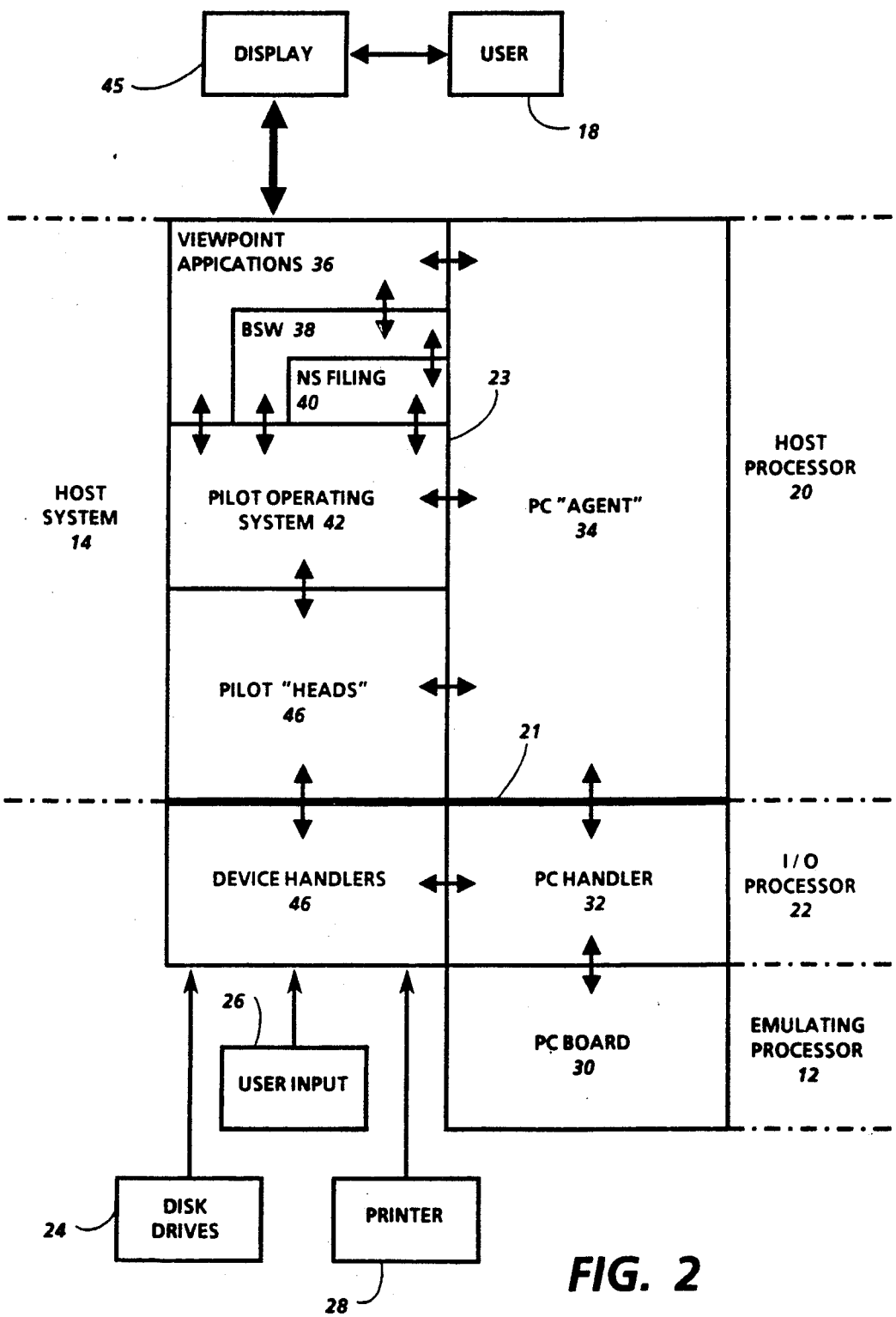
FIG. 2 is a schematic diagram illustrating the software architecture of the multiprocessor system of FIG. 1.

FIG. 2 is a low level diagrammatic overview of the software architecture of system 10, and generally depicts the flow of commands through the system software between emulating processor 12, host system 14, I/O devices and user input. The double headed arrows represent communication paths via interfaces between software components shown. The heavy line at 21 represents the main memory of system 14 which is the primary interface between I/O processor 22 and host processor 20 both of which are part of host system 14.

Emulating processor 12 comprises PC board 30 which contains an 80186 processor for executing target processor system code, e.g. MS-DOS and BIOS in the IBM PC. I/O processor 22 is an 80186 processor comprising PC handler 32 and device handlers 46 written in 80186 assembly code in firmware. PC handler 32 handles requests from PC board 30 for transfer generally to PC "agent" 34 in host processor 20. Such requests would, for example, be requests to memory for instruction sequences, requests to I/O devices under the control or host system 14, e.g. a rigid disk memory at drives 24 or printer 28 and the transfer of data to allocated memory space in main memory of host system 14 for display in an allocated region on the display screen of display 45. In the case of the physical floppy drive, also represented at drives 24, the software handling is of a minimal level because the functions involved are mostly hardwired so that requests from PC board 30 are handled directly by handlers 32 and 46 to the physical floppy drive at 24.

Host processor 20 comprises a Mesa processor for executing Mesa code which is a derivative form of Pascal and is defined in the Mesa Programmer's Manual and Mesa Language Manual available from Xerox Corporation. Each of the block components shown in FIG. 2 is written in Mesa code and represent the fundamental code organization blocks for processor 20. All these blocks are found in the Xerox 6085 workstation. Processor 20 includes an operating system 42 called "Pilot" that is called on demand by other interfaced programs such as a ViewPoint applications 36, basic workstation (BWS) 38 and NS filing system 40. The Pilot operating system provides the basic facilities needed when calling on main memory, which calls may be, for example, for program execution from BWS 38 or from PC board via handler 32 and PC "Agent" 34. Further information concerning Pilot is found in the Xerox Development Environment Product Overview and in the Pilot Programmer's Manual available from Xerox Corporation. Operating system 42 would also provide the facilities needed to write to disk drives 24 via Pilot "heads" 44 and device handlers 46. Pilot "heads" handle the executed calls to the software handlers 46 in I/O controllers that provide the low level tracking to disk drive sectors for storage of data transferred via handlers 46 to memory media of the drives.

NS filing system 40 represents a tree structure hierarchy of Mesa files with explicit code references as to their interconnection and relationship. BWS 38 represents a series of software facilities for providing services to ViewPoint applications 36. ViewPoint applications 36 are the underlying programs for supporting objects and bodies of data on display 45 including data originating from emulating processor 12 communicated via PC "agent" 34 and applications 36 to display 45. Additional information on ViewPoint and ViewPoint applications, BWS and NS filing including the development of applications and programs supporting those applications in provided in one or more of the following publications of Xerox Corporation: Xerox Development Environment: Concepts and Principals, XDE User's Guide, Services Programmer's Guide, ViewPoint Application Developer's Guide, Xerox ViewPoint Programmer's Manual and the Xerox Viewpoint User's Guide. PC "agent" 34 mediates between high level code applications of the Mesa environment to the left of line 23 and the PC environment below line 21. User 18 is placed in an abstraction of the typical office environment via display 45 and employs a familiar desktop metaphor present on display 45 to interact with a PC application, which is another ViewPoint application 36, and this interaction passes input to the PC "agent" 34 for ultimate delivery to a PC application running on PC board 30. PC "agent" 34 also traps output from PC board 30 for transfer to and presentation on display 45.

User input 26 represents conventional input devices, such as a keyboard 29 and cursor control device or mouse 27 connected to system 14. Input 24 may be input data for that portion of display 45 assigned to host system 14 for conversely may be input data for that portion of display 45 allocated to emulating processor 12. In the former case, translation of the input signals through handlers 46 is focused to appropriate ViewPoint applications 36 designated too receive such input. In the latter case, translation of the input signals through handlers 46 is translated into appropriate character set of the emulated system, e.g. IBM scan codes via PC "agent" 34 to the keyboard input of emulating processor 12, which, in turn, may provide this as output for presentation in the PC allocated portion of display 45 relative, for example, to a running PC application.

Figure 3:
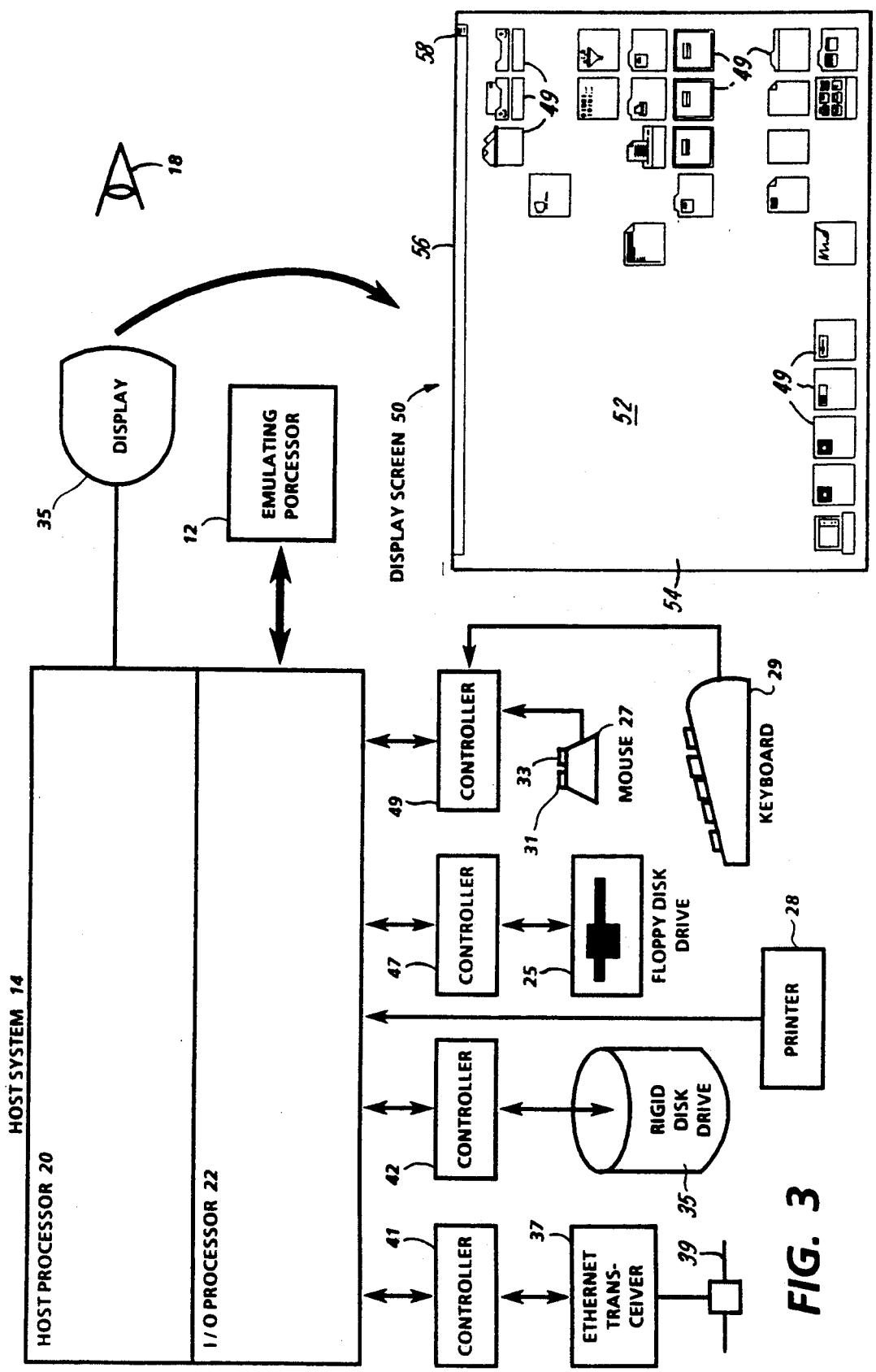
FIG. 3 is a schematic diagram illustrating the hardware architecture and typical screen display abstraction used with the multiprocessor system of FIG. 1.

FIG. 3 is a high level representation of the hardware architecture of host system 14 and includes a view representative of display screen 50 of display 48 illustrating an office desktop metaphor employing various abstractions of the typical office environment. It is important to understand the basic methodology present in the host system display of the office desktop metaphor to also understand the emulated display of the target system processor and the interaction between that emulated display and the desktop display of host system 14. The display screen 50 shown in FIG. 3 is a miniature of the display screen shown in FIG. 4.

In FIG. 3, I/O devices are specifically shown connected via controllers to host system 20. I/O processor 22 is responsible for servicing these controllers. The components connected to I/O processor 22 include Ethernet controller 41 connected to Ethernet transceiver 37 and Ethernet communication medium 39; rigid disk controller 43 connected to rigid disk drive 35; floppy disk controller 47 connected to floppy disk drive 25; and serial controller 49 connected to receive input signals from keyboard 29 and input signals from mouse 27. Further details relating to the architecture and operation is found in U.S. patent application Ser. No. 06/856,126.

Mouse 27 may be, for example, an optical mouse of the type disclosed in U.S. Pat. No. 4,521,772. Mouse 27 has two buttons or microswitches 31 and 33 which are respectively referred to as the left button the right button. The left button is referred to as "point" and the right button is referred to as "adjust". As is common with mouse 27, the movement of the mouse housing on a surface causes display cursor 52 to visually move on screen 50 in the same direction of mouse housing movement. Point button 31, when pressed and released, is used to indicate an object on screen 50 or to an item within an object on screen 50. This point function is referred to as "clicking" the mouse button 31 or 33. Clicking also is used to identify the down and release movement of a keyboard key. Adjust button 33 is used in combination with left button 31, for example, in selection of text wherein point button 31 is a reference pointer to the beginning place of text to be selected and right button 33 is a second pointer to end place of text encompassed by the combination of these two selections.

II. User Interface

As previously indicated, screen 50 represents the office metaphor and visually displays objects 49 in FIG. 3 representing common office abstractions comprising pictorial representations of real office objects, such as a desk top, inbasket, outbasket, documents, file folders, etc. These symbols are referred to as icons representing current working environment of user 18 and are intended to suggest there familiar office objects. Desktop 54 is a gray scale representation and is the primary view of ViewPoint applications that user 18 sees on display screen 50 and therefore occupies the entire screen 50 and appears under all objects 49 displayed on the screen. Desktop 54 resembles the top of an office desk, together with surrounding equipment used in the office environment.

Message area 56 is the header at the top of screen 50 for displaying system messages to user 18. In the example shown there is an indication of the number of free pages left on rigid disk drive 35. Other messages would be prompts to suggest the next action to be taken by a user such as, when invoking a <MOVE> command for moving an object to another place on screen 50 and display of the message in header 56, "Please specify a destination". The triple bar symbol 58 at the left end of header 56 is transient or pop-up menu activated via mouse pointer button 31 held in tis down position, thereby visually producing a menu which contains a list of command items which may be, for example, "Date and Time", "End Session" (logoff), "Spelling Checker", etc., which should be self evident as to their usage. These subcommands are invoked by moving the cursor pointer with button 31 still held in its down position over a selected item, which is then highlighted by system 14 to indicate to the user its potential selection. At this point, if button 31 is released by the user, the selection is accomplished, the pop-up menu visually disappears and the command item selected is initiated.

Other commands for performing functions on objects 49 may be invoked from keyboard 29. These functions include <DELETE>, which will delete the object and its contents, <COPY> which will copy the object and its contents to another desktop location, <MOVE> which will move the object and its contents to another desktop location, <PROP'S> which will open a window displaying properties or parameters for a particular object and provide alternative choices for these parameters, and <OPEN> which opens an object to reveal the contents of the object in a BWS window.

A. Object Types

Figure 4:
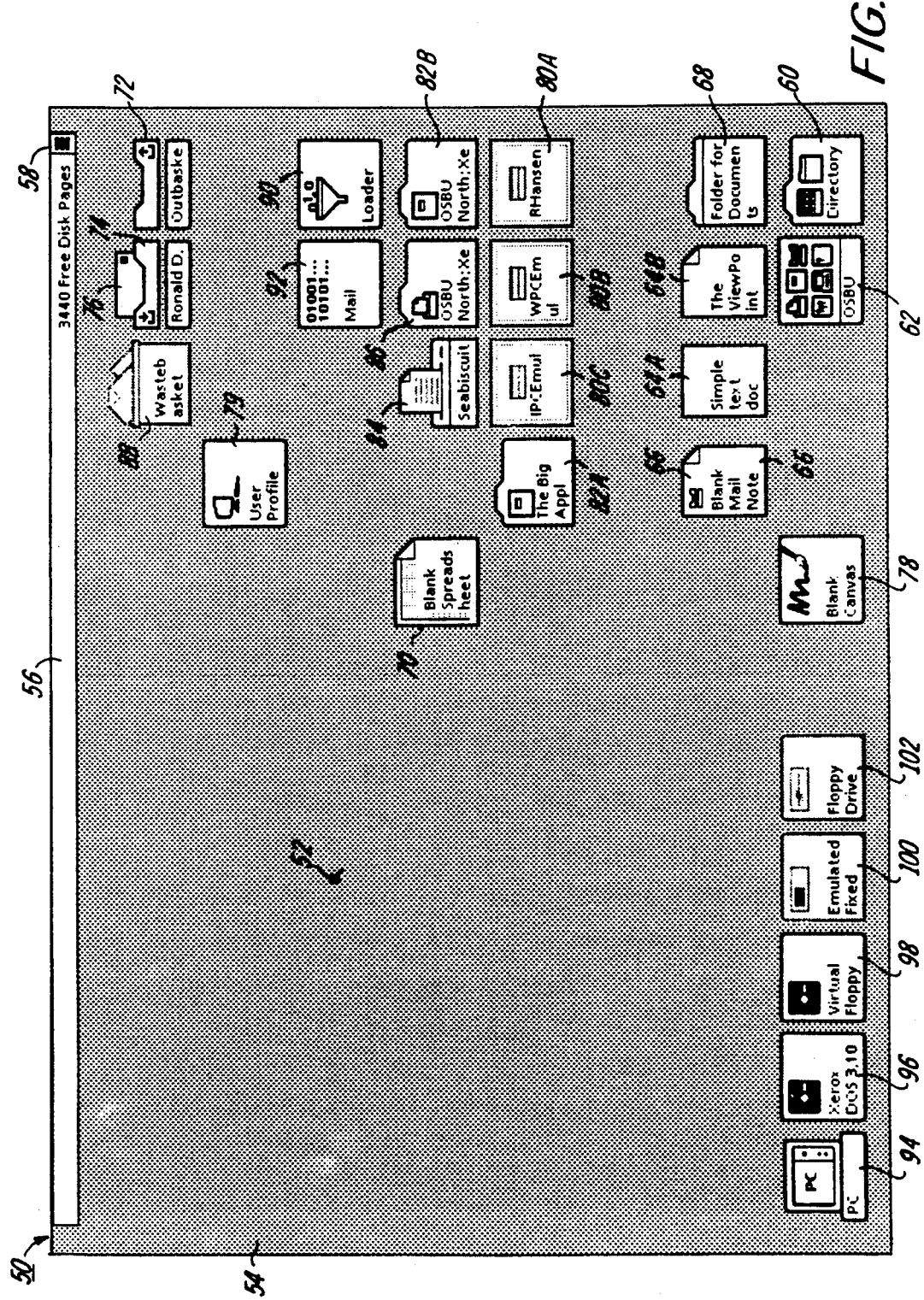
FIG. 4 is an enlarged view of the display screen of FIG. 3 showing a desktop with various sundry metaphoric icons or symbols.

FIG. 4 shows in better detail a number of objects 49 also called "icons" that might typically appear on desktop 54. These icons are present in the Xerox 8010 and 6085 workstations and will be briefly identified as to their meaning and function.

It is of interest to initially note that the icons 49 on desktop 54 are aligned vertically and horizontally according to an invisible orthogonal grid on desktop 54. Thus, their placement on desktop 54 is not arbitrary and the application software for desktop 54 is capable of determining and keeping track of the location of icons on the surface of desktop 54. The locations of each square in the desktop grid are listed in the desktop software so that at any given time, the desktop application can determine the X, Y location of icons on its surface and also help to determine whether the positioning of one icon on top of another on the desktop is a permissible function. For example, the dropping or releasing of a document icon onto a file folder icon or on a printer icon are both permissible functions; the dropping of one document icon onto another document icon is not a permissible function.

Many of the icons may be opened via the <OPEN> function to reveal their content, such as a list or directory of files or the content of a document. In this sense, icons 49 are containers representing pointers to files and other bodies of data stored at drives 24.

Icon 60 is a directory divider which when opened contains a plurality of directory icons, one of which is icon 62. Directory icon 62 serves as a source of icons representing shared and remote objects that the user may access, such as filing and printing services. Directory icon 62 represents an organization "OSBU" and when opened, provides a series of services available on the network or LAN, whose iconic representations may be brought onto desktop 54.

The next series of icons to be identified are data icons. Icons 64 represent documents that appear on desktop 54. Document icon 64A is entitled "simple Text Doc" and document icon 64B is entitled "The ViewPoint Story", although part of its title will not display since the icon face is not sufficiently large to display all of the title. However, the title portion displayed still functions as a visual pointer for that particular document. These document icons may be copied, moved or opened to display the content of their documents as well as their full titles. Also shown is icon 66 which is a Blank Mail Note. This icon may be copied or moved or opened, and a message typed in the open window of the icon and the icon closed after message typing. Mail icon 66 may then be moved to outbasket icon 72 where it is dropped or released and electronically sent to an addressee of the note. Icon 68 is a file folder into which document icons 64 and mail note icon 66 may be placed. Opening of folder icon 68 will reveal a directory listing objects contained in the folder either by alphabetical order or chronologically by version data, any one of which may be opened in the folder or moved from the folder and placed on desktop 54. Icon 70 is a blank spreadsheet which may be opened to provide a spread of financial data, for example, and may be also copied or moved and placed in folder icon 68.

The next series of icons to be identified relate to surrounding furniture or equipment in an office environment. Icon 72, previously alluded to, is an outbasket for electronic mail messages while icon 74 is an inbasket for receiving incoming electronic messages, such as mail note icon 66. In basket icon 74 displays a mail flag 76 indicating that there is mail to be retrieved by the addressee names on the inbasket. Icon 74 may be opened to reveal a mail window through which mail notes 66 may be accessed and opened or may be moved to desktop 54 and opened for reading.

Icons 80 are file drawers for storing data icons and may be opened revealing a directory displaying the titles of documents or folders they contain, which may then be individually opened or removed or copied from the file drawer. Icon 80A is a personal file of a user while icons 80B and 80C are file drawers of groups of users, for example, for a particular project. Icons 82 are file drawer divider icons from which a series of icon file drawers, such as icons 80 may be accessed. Divider icon 82A represents file drawers residing on a remote file server called "The Big Application" and divider icon 82B represents file servers for a particular organization, "OSBU North" within a company.

Icon 84 is a representation of printing resource called "Seabiscuit". The actual printing device may be directly connected as printer 28 or may be remotely located. Document icons 64, mail note icon 66 or folder icon 68 may be moved or copied and dropped onto printer icon 84 and their content will be printed either locally or remotely. Divider Icon 86 may be opened to reveal a plurality of different printers that are remote and accessible via LAN 39, and may be selected as a printer for printing the content of documents, mail notes, spreadsheets, folders or the like. In the particular desktop 54 here, the remote printer "Seabiscuit" has been placed on Desktop 54 and printable items dropped on this icon will be properly formatted and sent to this particular printer.

Divider icons 82 and 86 are, thus, groups of file drawers or printers that eliminate the hierarchy of going through individual drawers or printers separately located on desktop 54 thereby saving desktop space.

Wastebasket icon 88 is a container into which, for example, mail notes, documents or folders may be dumped for disposal but are retrievable since they are still in the container. The metaphor here is that user 18 changes his/her mind about destroying (deleting) a document or the like and removes the document from the wastebasket by opening icon 88 and moving the document icon back onto desktop 54.

Icon 78 is a freehand drawing program comprising a canvas which the user may copy graphics into or use palette tools to produce free hand drawings. Icon 79 is the User profile for desktop 54 which contains a listing of various ViewPoint applications present and supporting desktop 54. Various parameters of these applications may be edited upon opening the user profile icon to change, for example, the location of BWS window structures.

Figure 4A:
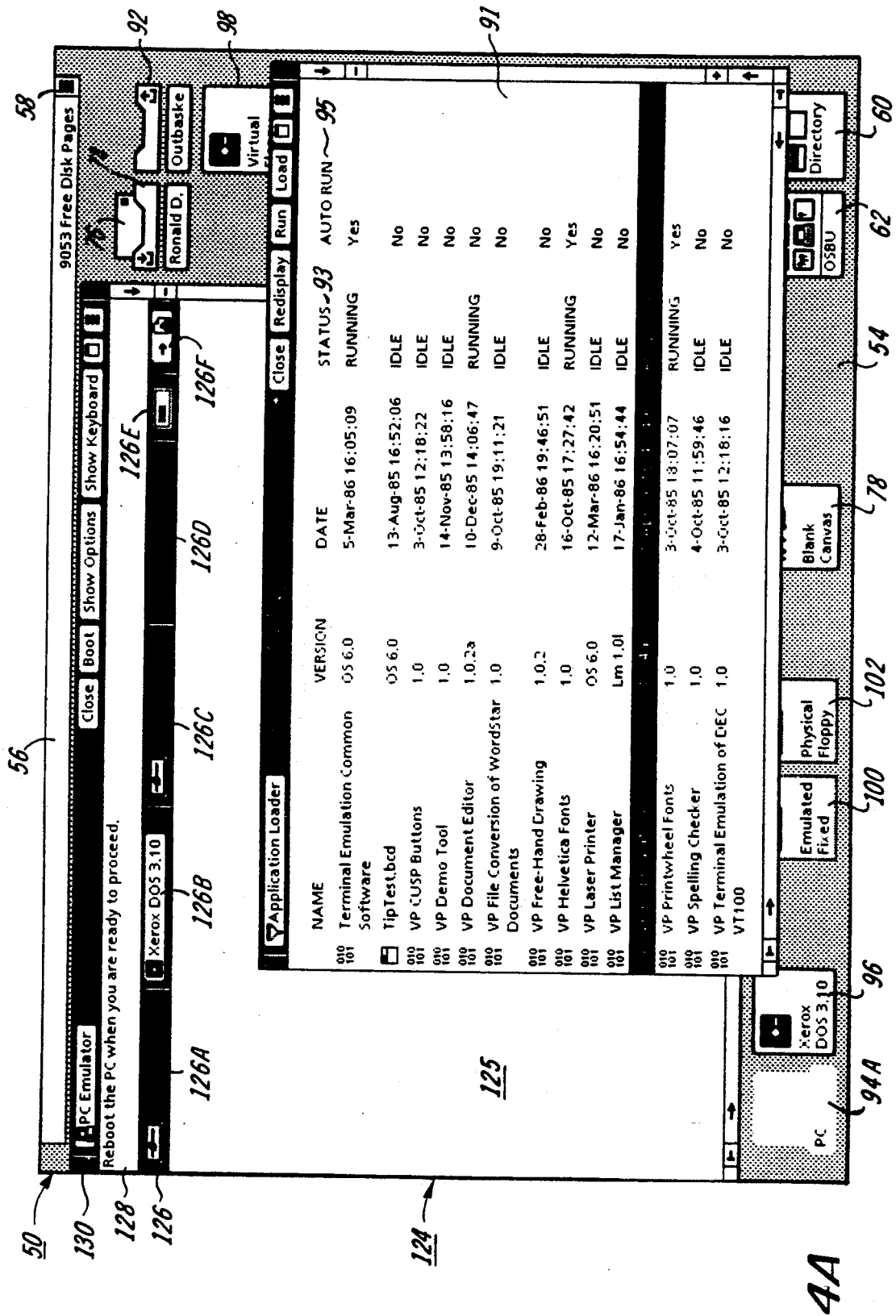
FIG. 4A is similar to FIG. 10 and shows the view of the open window for the loader symbol or icon illustrating various software applications and their status.
Figure 4B:
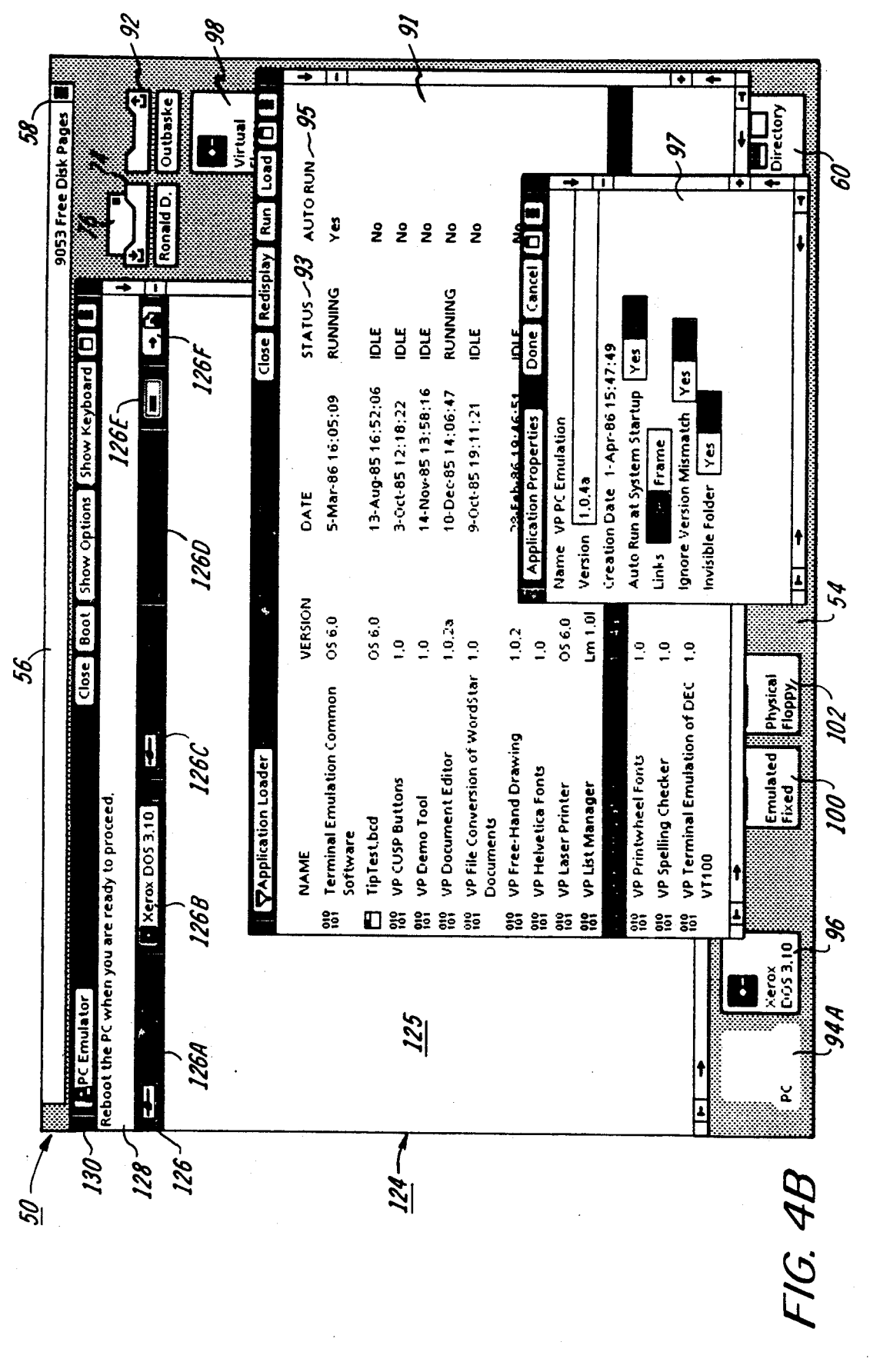

Icon 70 represents a program or application loader into which a program may be loaded and run on desktop 54. For example, mail program icon 92 comprising a mail access environment may be moved or positioned onto loader icon 90 to load this ViewPoint application in the runtime environment. FIG. 4A shows the loader icon opened revealing in window 91 a directory of applications in the loader which are either running or idle as indicated at status 93. "Auto Run" 95 reveals whether an application that is idle is set to automatically run upon booting host system 14. In window 91, the application for the PC emulation is shown selected, which is already set in a running mode of operation. To change various properties of this application as loaded, the <PROP'S> command may be invoked revealing the property sheet 97 as shown in FIG. 4B for the PC emulation application. Property sheet 97 includes a parameter listing which may be changed via cursor 52 and mouse point button 31 to invoke desired selection alternatives as shown. The advantage of loader 70 is that user 18 can force various applications to be in an idle state so that applications not necessary to a particular user session are not also running, thereby improving execution performance of host system 14.

B. Icon Operations and Windows

Figure 5:
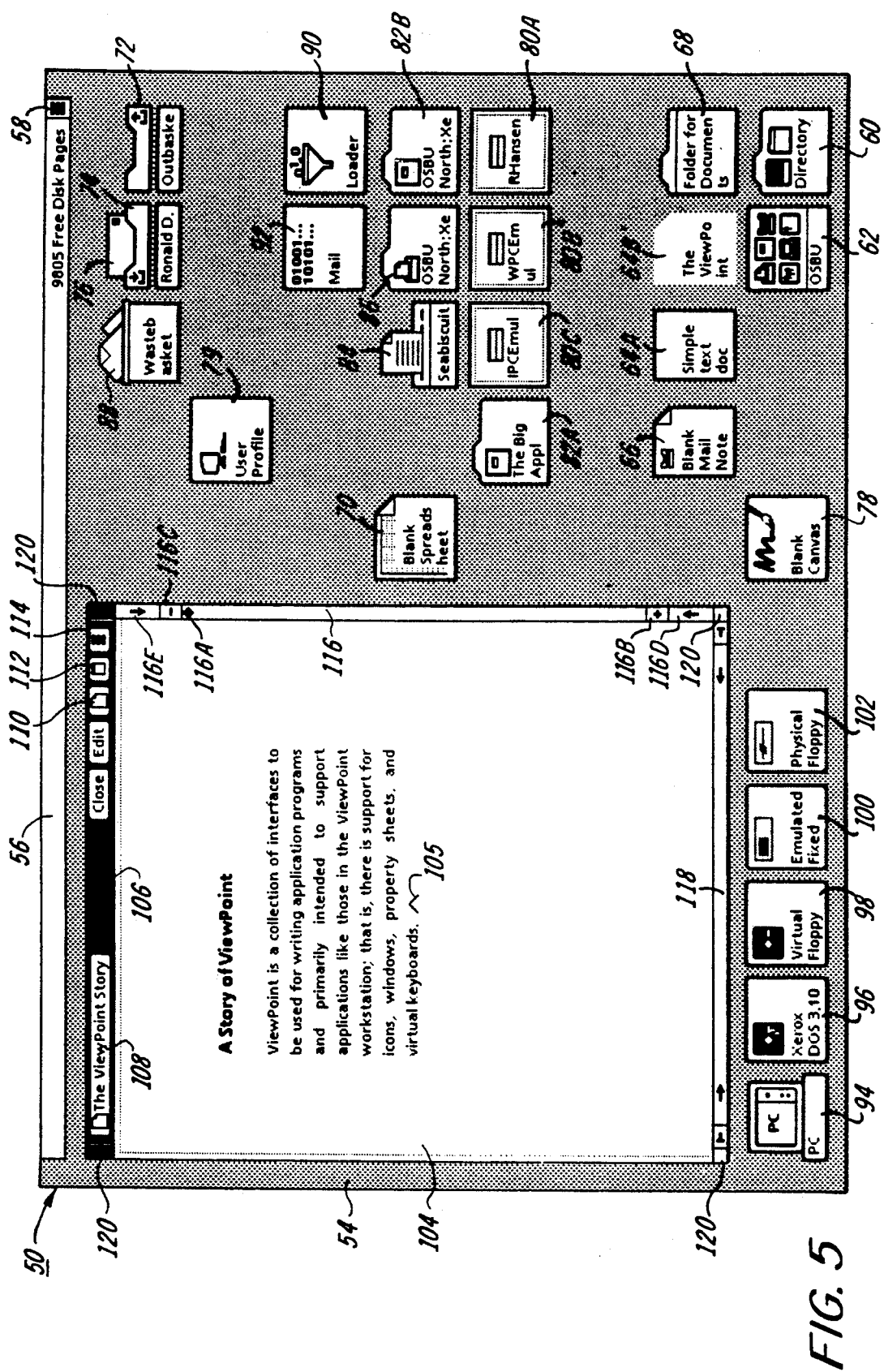
FIG. 5 is a view of FIG. 4 with the document entitled, "The ViewPoint Story" opened and its content displayed on the screen.

Reference is now made to FIG. 5 in relation to the opening of an icon to view its contents. FIG. 5 is basically identical to FIG. 4. In the illustration shown, document icon 64B has been previously selected and then opened. This selection is made by mouse left point button 31 being clicked over icon 64B. The system response to this selection is to cause the icon to be highlighted, in the same way as represented with icon 94' in FIG. 6. Thus, the focus of the attention of the system via desktop 54 has been directed to this particular icon 64B. The next function is to open the icon which in the particular example here is accomplished by pressing an <OPEN> key on keyboard 29 which opens the icon container to reveal window 104 containing the data content of the document, "A story of ViewPoint". At this point, the position for icon 64B' of an opened document. Window 104 overlaps part of desktop 54 but may also be expanded to cover the entire desktop. Other objects may also be opened on the desktop.

Window 104 contains a header 106 which includes a title position 108 for the document, and various window commands. The use of mouse point button 31 over the command. "Close", will close the window to return it to its original icon form on desktop 54. The "Edit" command, when invoked, will permit editing of the document. Command symbol 110 is for pagination, which when invoked divides the document into a series of printable pages, dividing the document text so as to permit a maximum allowed lines of text to appear on each given page. Pagination is necessary particularly when text has been added to or deleted from a document, changing the position of text from page to page in the document. Command symbol 112 is a window manager and triple bar symbol 114 is a pop-up menu with additional commands involving window attributes that may be invoked or changed.

Vertical scrollbar 116 will permit scrolling of the document vertically up or down within window 104. The length of central scrollbar 116 between positions 116B and 116C represents the full length of the document presentable in window 104 while diamond symbol 116A represents the particular page in the document being displayed in the window. Since diamond symbol 116A is at the top of bar 116, the page being displayed in window 104 is the first page of the document. Invoking of mouse point button 31 anywhere along bar 116 will cause the document to be moved to the document page represented at that point along bar 116. Scrollbar portions 116B and 116C permits page by page scroll, respectively, up and down when invoked by mouse point button 31. Scrollbar portions 116D and 116E represent line by line scroll, respectively, up and down when invoked by mouse point button 31. Clicking mouse point button 31 over any control point 120 invokes a top/bottom operation, e.g. where there are a series of overlapping windows on display screen 50, the clicking of the left point button at point 120 will place the invoked window on top of the other windows. Clicking the same point again in the same window will put it beneath the other windows. Pressing point button 31 down and holding it in any control point 120 and moving mouse 27 will move the entire window 104 to another location on desktop 54. Pressing adjust button 33 down and holding it is any control point 120 and moving mouse 27 will resize window 104, i.e. either enlarging or reducing the overall dimensions of the window. Invoking point button 31 over either end of horizontal scrollbar 118 will cause horizontal left or right scrolling of the document.

Reference is again made to FIG. 4 to complete the brief description of icons on desktop 54. The series of icons in the lower left corner of desktop 54 involve the emulated user interface of this invention. Icon 94 is the PC emulator which, when opened presents a display window emulating the display screen of the target system, e.g. the IBM PC display screen. Icons 96 and 98 are virtual floppy icons which besides being objects in the environment of desktop 54 are also insertable representations of floppies that may be inserted into emulated floppy drives of a configured PC emulator represented by icon 94. Icon 96 also contains a version of MS-DOS operating system which may be loaded into an emulated floppy drive of the configured PC emulator 94 from which PC emulator may then be booted. Icon 98 represents another virtual floppy icon which may have a unique name and contain various software programs and applications. Icon 100 is an emulated fixed disk representation which may be configured into the PC emulator. Both virtual floppies 96 and 98 and emulated fixed disk 100 are actually pointer to real disk locations allocated by host system 14 on its rigid disk drive 35. Icon 102 is a pointer to the physical floppy drive 25 of host system 14. Icon 102 may also be configured into the PC emulator so as to be under the control of emulating processor 12. Again, the PC emulator 94 is sharing resources of host system 14 although it believes that these resources are fully under its own exclusive use.

As used above and in this description, the term "emulated" has specific reference to an actual I/O device via emulating software and in this sense is the opposite to physical, which has specific reference to an actual I/O device such as floppy disk drive 25. The term "virtual" has specific reference to the role of some medium such as a floppy disk or diskette via emulating software. As used herein, the term "disk" also has reference to "diskette or disk", as the floppy drives employed may be 3¼", 5" and 8" configuration. The term "configuration" when referenced to the PC emulator has specific reference to the assignment of physical and emulated devices to the PC emulator and these devices will symbolically appear in the PC emulation window when configured. The important functions to understand for the purpose of this disclosure are the icon invoked functions of <OPEN>, <COPY>, <MOVE>, <PROP'S> and <DELETE>. These functions can be invoked via any user input 26 but, as previously explained for the purposes of this particular implementation, are invoked via a selected key on keyboard 29. User 18 can move an object, e.g. an icon or text inside an open window, from one location on desktop 54 to another by selecting it with mouse point button 31 and clicking the <MOVE> key. At this point the cursor shape will change from the arrow configuration at 52 to either a symbol indicating a move selection has been invoked or a tiny representation of the object selected. The originally selected icon also becomes unhighlighted and a message appears in header 56 requesting an indication as to where the object's destination is to be on desktop 54. Destination is indicated by user 18 clicking either mouse button 31 or 33 at the selected desktop destination. The <COPY> function is the same as <MOVE> except the selected object is not deleted from its original location on desktop 54. When user 18 designates the point of destination with either mouse button, the copied object is released at the new destination, the copied object becomes selected and the original object unselected, the latter having not been changed in any way. The invoking of the <DELETE> function will delete the object after confirmation via a message in header 56. Confirmation after the <DELETE> selection can be specified in the user profile found in user profile icon 79 not to be operational. If so, any deleted object will need no confirmation and the deleted object is placed in the wastebasket icon container at 88. All objects on the desktop 54 and bodies of data in objects have properties which may be displayed by pressing the <PROP'S> key after a particular object has been selected. An appropriate property sheet will be displayed for the selected object showing parameters pertaining to the object. These parameters may be altered by edits to parameter locations using mouse point button 31.

Again with reference to FIG. 2, all of these objects on the desktop including desktop 54 are ViewPoint applications 36 comprising active software components connected in a relationship defined by a tree structure hierarchy in NS filing system 40 using generic facilities to perform the various object functions set by location address in BWS 38. Further details concerning these relationships and functionality may be found in the previously mentioned documentation.

III. PC Emulator and Its Configuration and Reconfiguration

Figure 6:
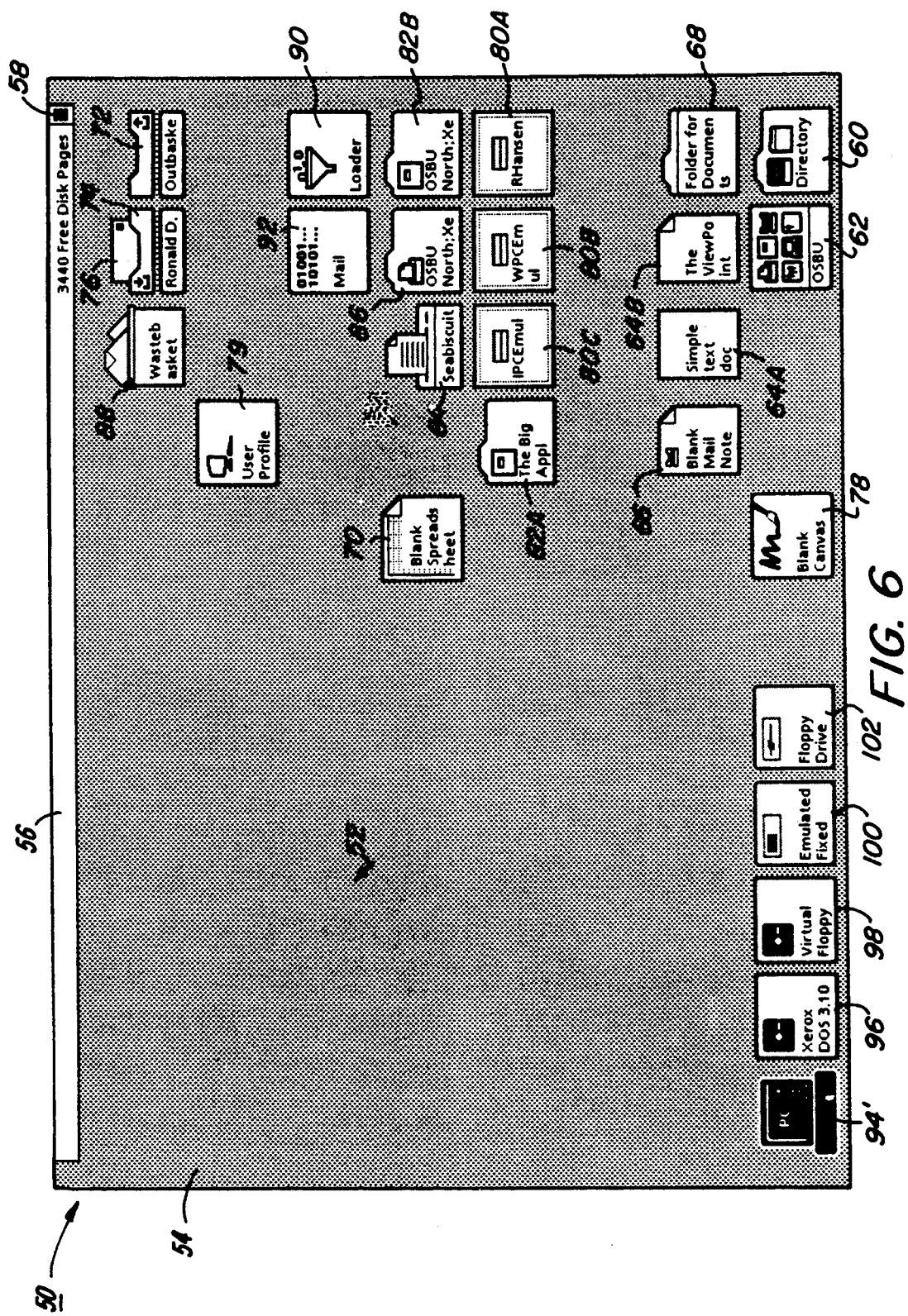
FIG. 6 is the same view as FIG. 4 except with the emulator icon selected.

Explanation will now be directed to configuration of the PC emulator 94 employing also icons 96-102. FIG. 6 is identical to FIG. 5 except that cursor 52 via mouse 27 has been moved over PC emulator icon 94 and mouse point button 31 has been clocked to select icon 94. The system has responded by highlight icon 94, as indicated at 94' in FIG. 6 by reversing the video of the icon.

It is of interest to note that in configuring PC emulation icon 94, or for that matter copying, moving or mailing of icon 94, what is actually being copied is the configuration information stored in memory for the particular instance of the icon and not the emulation per se. Thus, icon 94 is a pointer to a particular configured PC emulator. Two or more copies of PC emulation icon 94 on desktop 54 permits multiple instances of various configurations thereby allowing user 18 to establish alternative configurations prepared in advance. In any case, a PC emulator icon may be preconfigured before booting the PC or may be reconfigured on-the-fly, that is, during a user PC emulation session requiring rebooting of the PC system after reconfiguration.

Figure 7:
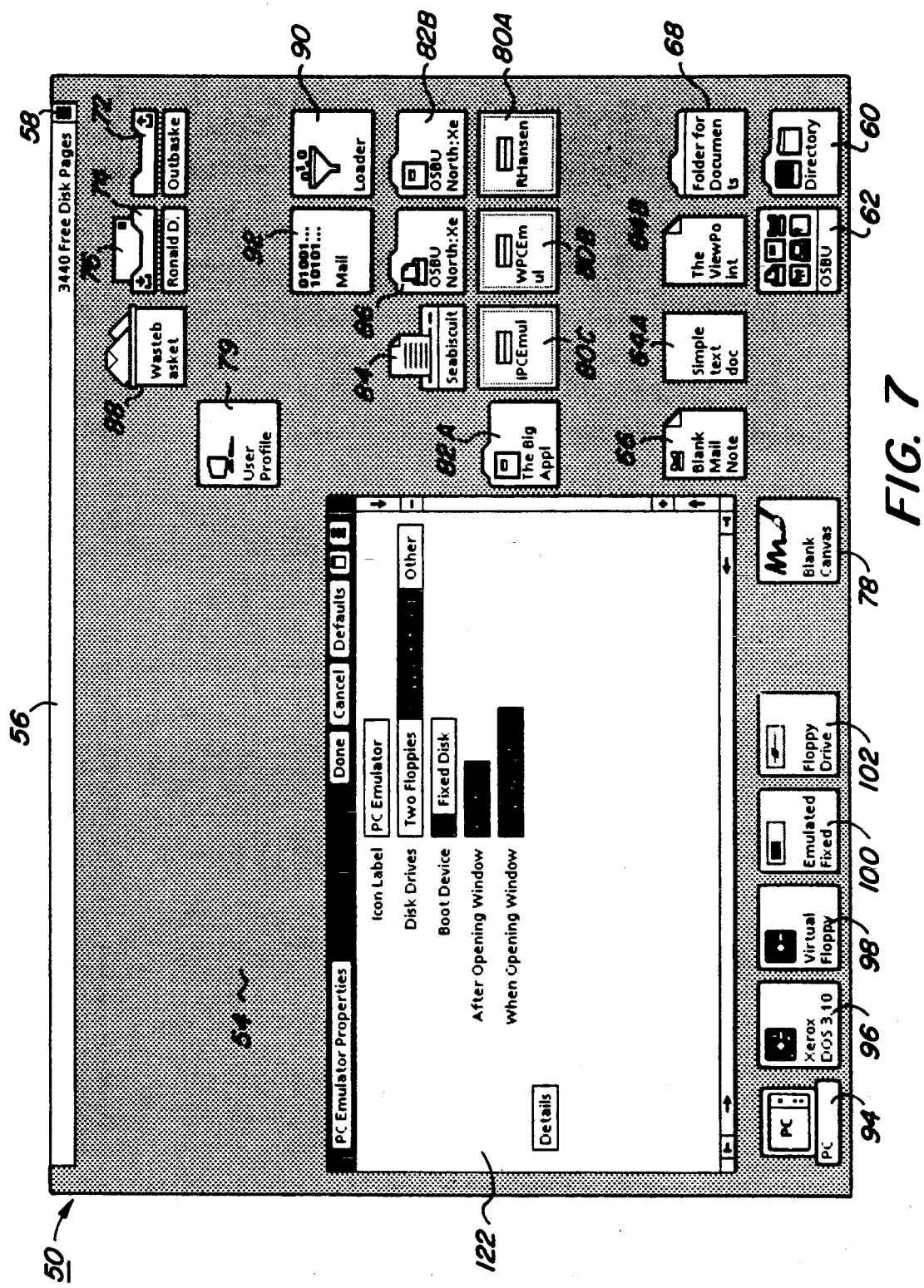
FIG. 7 is the same view as FIG. 4 except with the emulator icon property sheet opened to view for purposes of configuration of the emulator.

With PC emulator icon 94' highlighted, a PC emulation session may be started by pressing the <OPEN> key. Assuming that the emulator has already been preconfigured, the PC emulation window will appear and the system may be loaded and booted. The PC emulator icon may also be preconfigured to immediately boot from memory when the <OPEN> key is pressed at this point. The user may configure the PC emulator by activating the emulator property sheet 122 by pressing the <PROP'S> key. Emulator property sheet 122 is shown in FIG. 7. Sheet 122 is like any other standard window, e.g. window 104, so that further description as to the window header and vertical/horizontal scrollbars is not necessary for this window or later described windows, except in cases of different commands appearing in the window header. Sheet 122 has a header identifying it as the PC emulator properties window and the commands "Done", "Cancel" and "Defaults". The command "Done" in this window, as well as other windows, will cause the changes made initiated in the property sheet to take effect. The command "Cancel" will close the property sheet leaving icon 94 in its highlighted state and not enforcing any parameter changes that may have been selected in property sheet 122. The command "Defaults" causes certain parameters in property sheet 122 to system chosen parameters. Sheet 122 also contains a number of parameters including a label identifier desired for the particular icon container, the number of disk drives desired for the configuration and their combination, whether the emulation will be booted from an emulated fixed disk or from a configured floppy drive, whether the system is to boot upon opening of PC emulator icon 94 and whether display options, i.e. the PC emulation parameters are configured should initially appear upon opening of PC emulator icon 94. The selections are made with the mouse point button 31 and are alternative if there are multiple choices on a given parameter line. The configuration shown in FIG. 7 is the inclusion of a floppy drive and a rigid disk in the popular configuration of the IBM PC-XT. Configuration details are hidden from view but further choices and configuration changes for disk drives can be made by choosing "Other" in the "Disk Drive" configuration line to select a configuration other than the default configuration now shown in sheet 122.

Figure 8:
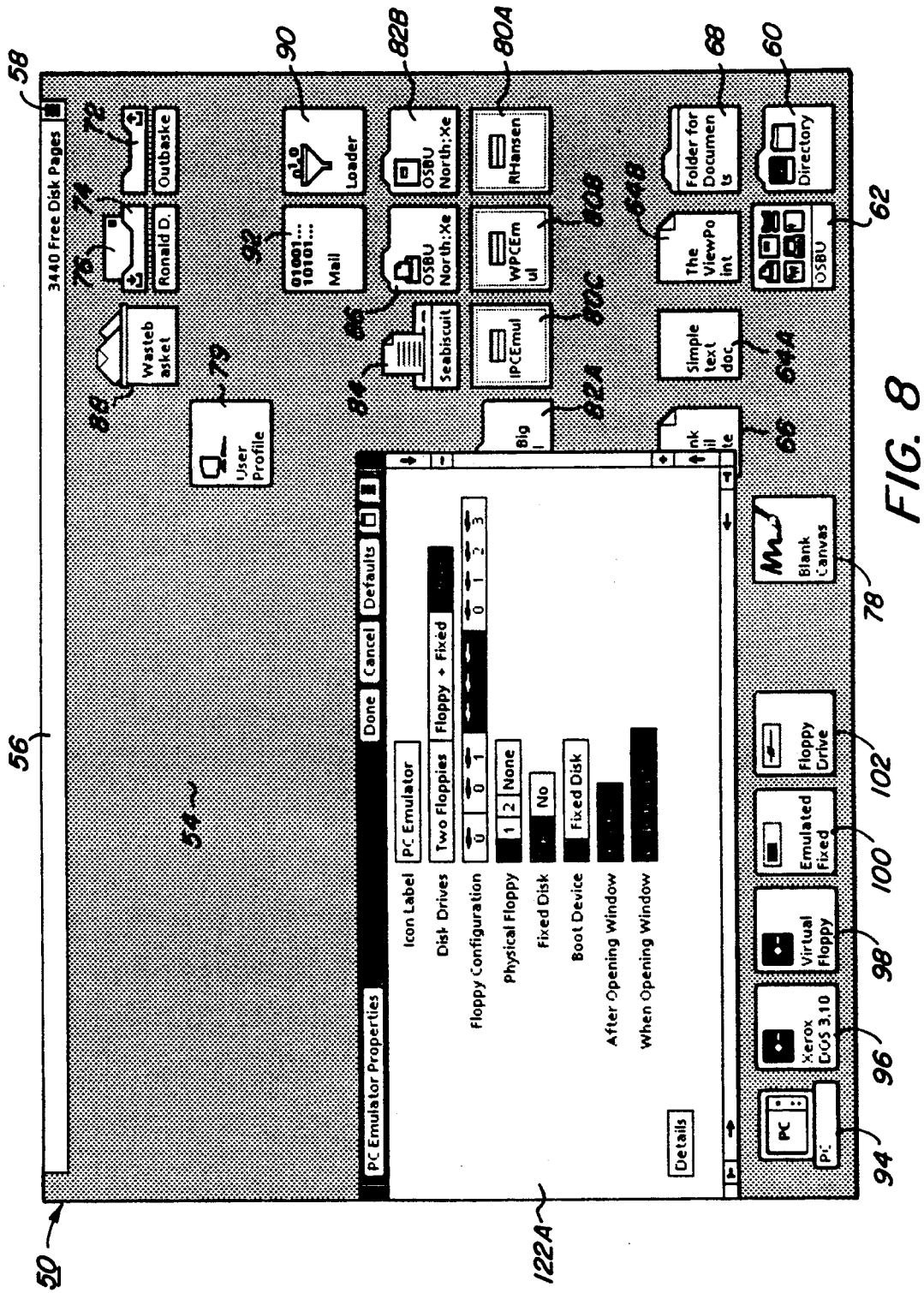
FIG. 8 is the same view as in FIG. 7 with further emulator properties displayed.

The activation of "Other" is shown in FIG. 8, this parameter having been selected, as indicated by being highlighted. This action brings into the configuration selection, the assignment and/or location of emulated floppy drives at the parameter line designated "floppy configuration", Physical floppy drive of system 14 at the parameter line designated "Physical floppy" and the emulated fixed disk at the parameter line designated "Fixed Disk".

Note that property sheet 122A will present only valid choices. If only two drives are in the configuration, the choices 0 and 1 (and none) will appear for physical floppy drive. The section of "emulated floppy drive" is implicit: all drives not designated as physical are assumed to be emulated and will accept virtual floppy disks. If the "Fixed Disk [YES]" choice is invoked, an emulated fixed disk will be bound to the PC emulator. Regardless of MS-DOS assignment of devices to drives, the symbol indicating the presence of the emulated fixed disk always appears to user 18 in location 126E. User 18, of course, has the option of specifying no fixed disk by selecting "Fixed Disk [NO]". No symbol appears at 126E in this case. The desired selection becomes effective upon booting the PC emulation.

If the "After Opening Window [BOOT PC]" parameter is set, the PC emulator will automatically be booted whenever PC emulator window 124 is opened with the preconfigured parameters. If the "When Opening Window [DISPLAY OPTIONS]" is set, an options-while-opening sheet 135, shown in FIG. 12A, will be displayed whenever an <OPEN> function is invoked on PC emulator icon 94. The PC emulation window will not appear until the command "Start" in the command bar of sheet 135 is invoked.

If "Details" in property sheet 122 is invoked as shown highlighted in FIG. 9, the additional parameters shown in property sheet 122B below "Details" will be displayed. These additional parameters are fairly obvious. "AutoRepeat" is a place where timing values may be specified as applicable to keyboard operation. "Initial Repeat Duration" controls in milliseconds the amount of time a key on keyboard 29 must be held down before automatic repetition of that key function begins. "Ensuing Repeat Duration" controls the amount of time in milliseconds between repeating keyboard invoked characters. "Display Adapter" is for the selection of either a Color Graphics display or a monochrome display. "Memory Size" invokes the amount of main RAM memory that is to be allocated by system 14 for use in connection with an emulated device. The memory size shown selected is for 128 kilo bytes of RAM. When the PC emulator is booted, system 14 forces other applications using real memory to be swapped out onto rigid disk drive 35 to acquire the necessary RAM memory. These applications, if active during PC emulation, will continue to operate but more slowly due to their rigid disk drive access. A portion of the allocated memory on boot may also have MS-DOS swapped in from floppy disk drive 25 into allocated RAM memory. "Printer" selection allows either a printer directly attached to the workstation, e.g. physical printer 28 connected to host system 14, or the networked Interpress printer, providing industry standard formatting of electronically held documents for printing. "Page Size" is default at 8.5×11 but may be changed as to page orthogonal orientation or page size as shown.

Additional operational information relative to configuration is discussed in connection with FIG. 19.

Figure 10:
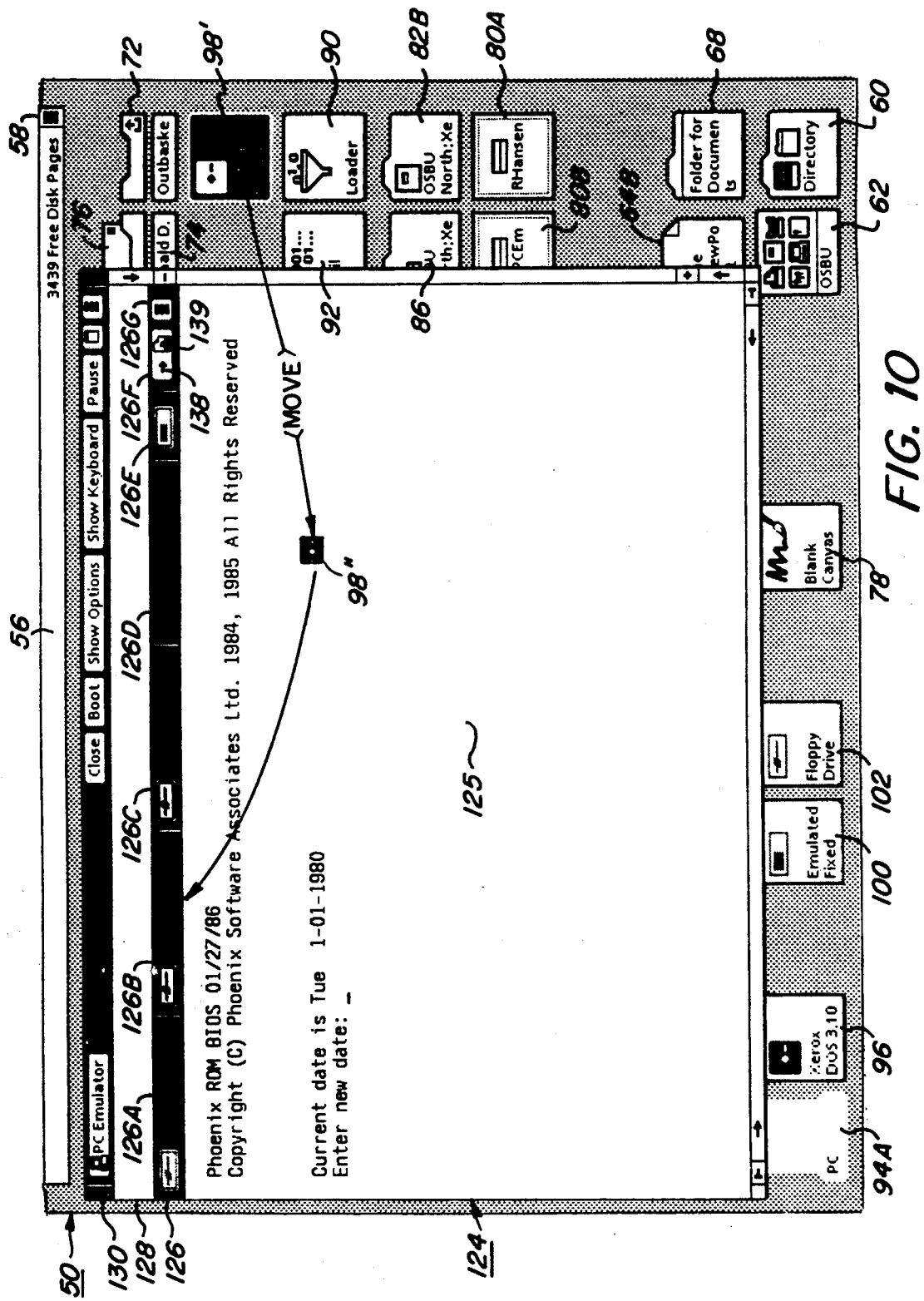
FIG. 10 is the same view as FIG. 4 except with the PC emulator icon opened displaying the PC emulation window.

The parameters having been selected in property sheet 122, the sheet may be disposed of by initiating the "Done" command leaving PC emulator icon 94 in the highlighted form 94' shown in FIG. 6 while also invoking the parameter selections made to PC emulator icon 94. At this point, the <OPEN> key may be pressed, which will open the PC emulator window 124 as shown in FIG. 10, leaving behind an open iconic space 94A visually indicating to user 18 that this icon has been opened.

Window 124 provides an emulated PC screen within which user 18 may interact in the same manner as with an IBM PC. Window 124 includes emulated PC screen 125 through which the user communicates with all PC programs. The PC emulator header involves three components: a device bar 126, a message subwindow 128 and a command bar 130. Device bar 126 represents in symbolic form the physical floppy drive, emulated floppy drives, and emulated fixed disk as these drives have been configured into the PC emulation via property sheet 122. Device bar 126 comprises four different locations from 0 to 3 shown respectively at 126A, 126B, 126C and 126D for up to four emulated floppy drives or three emulated floppy drives and the physical floppy drive. Location 126E in device bar 126 is for indicating the presence of an emulated fixed disk in the configuration. The configuration selected and shown is as highlighted in sheet 122A in FIG. 8 comprising three floppy drives in locations 126A, 126B and 126C with location 126A or position 0 being chosen for the physical floppy drive, representative of system physical floppy drive 25. As shown in FIG. 10, the physical floppy drive is shown in grey outline at location 126A while locations 126B and 126C show in solid outline emulated floppy drives. The configuration is previously set in property sheet 122 includes an emulated rigid fixed disk with its symbolic outline at location 126E with its iconic form shown at 100. However, since the devices represented by icons 100 and 102 are now bound to the PC emulator configuration as booted, the function key for <OPEN> after selection of either icon 100 or 102 on desktop 54 will not be responsive. These devices are only accessible either in system 14 or PC emulator 94 and cannot be accessed concurrently by both systems. Once a session with the PC emulator has been completed and the "Close" command in command bar 130 is invoked, icons 100 and 102 are unbound from the PC emulation and may be opened via desktop 54 using the <OPEN> function. Of course, there icons could also be opened to reveal their content during a PC emulator session if they are not part of the PC emulator configuration in operation.

Message subwindow 128 is where status and error messages are shown to the user in connection with PC emulator operation and running of PC programs. Thus, the subwindow is independent of the global message area of system 14 in header 56.

Reference is now made to other commands in command bar 130 in PC emulator window 124. The "boot" command will cause the PC emulator to be booted if it is not already automatically booted via the parameter set in emulator property sheet 122. If a floppy is currently in drive 0 at location 126A, this drive will be employed as the boot device. Otherwise, the PC emulator will be booted from a partition specified for the emulated fixed disk at 126E, if included in the configuration. In this particular case, MC--DOS is resident at the allocated partition for the emulated fixed disk. If neither floppy drive 126A nor emulated fixed disk 126E can be employed, a message will be displayed in subwindow 128 indicating this fact.

As previously indicated, the "Close" command causes the PC emulation window 124 to return to iconic form 94 after confirmation by the user, terminating PC emulation activity. All devices in the PC emulator configuration are unbound and are available for general purpose use from desktop 54. Also, before closure of PC emulation window 124 can be activated, the PC emulator will require the user to unload any virtual floppy disks still loaded in configured emulated floppy drives at 126B and 126C and to return them to desktop 54.

The "Pause" command is an important command in PC emulator usage in the transfer of data between the PC and ViewPoint worlds as will be explained later. The invoking of "Pause" suspends all PC processor activity as distinguished from a processor being placed in an idle state. PC processor will be in a "frozen" state running a half routine that suspends the execution of code. This frozen state allows the user to select data in PC screen 125 to be copied into a ViewPoint application, such as an opened document icon 64. The data copied can be data displayed on screen 125 since the operation of the PC emulator has been halted. During this frozen state, a "Resume" command replaces "Pause" command in command header 130. When the user wants to continue PC operations, the "Resume" command is invoked permitting the PC emulator to be "thawed" and execute instructions at processor 12 beginning at a point where it left off executing instructions prior to invoking the "Pause" command. These and other possible states of the PC emulator will be discussed in further detail in connection with FIG. 15.

Figure 12:
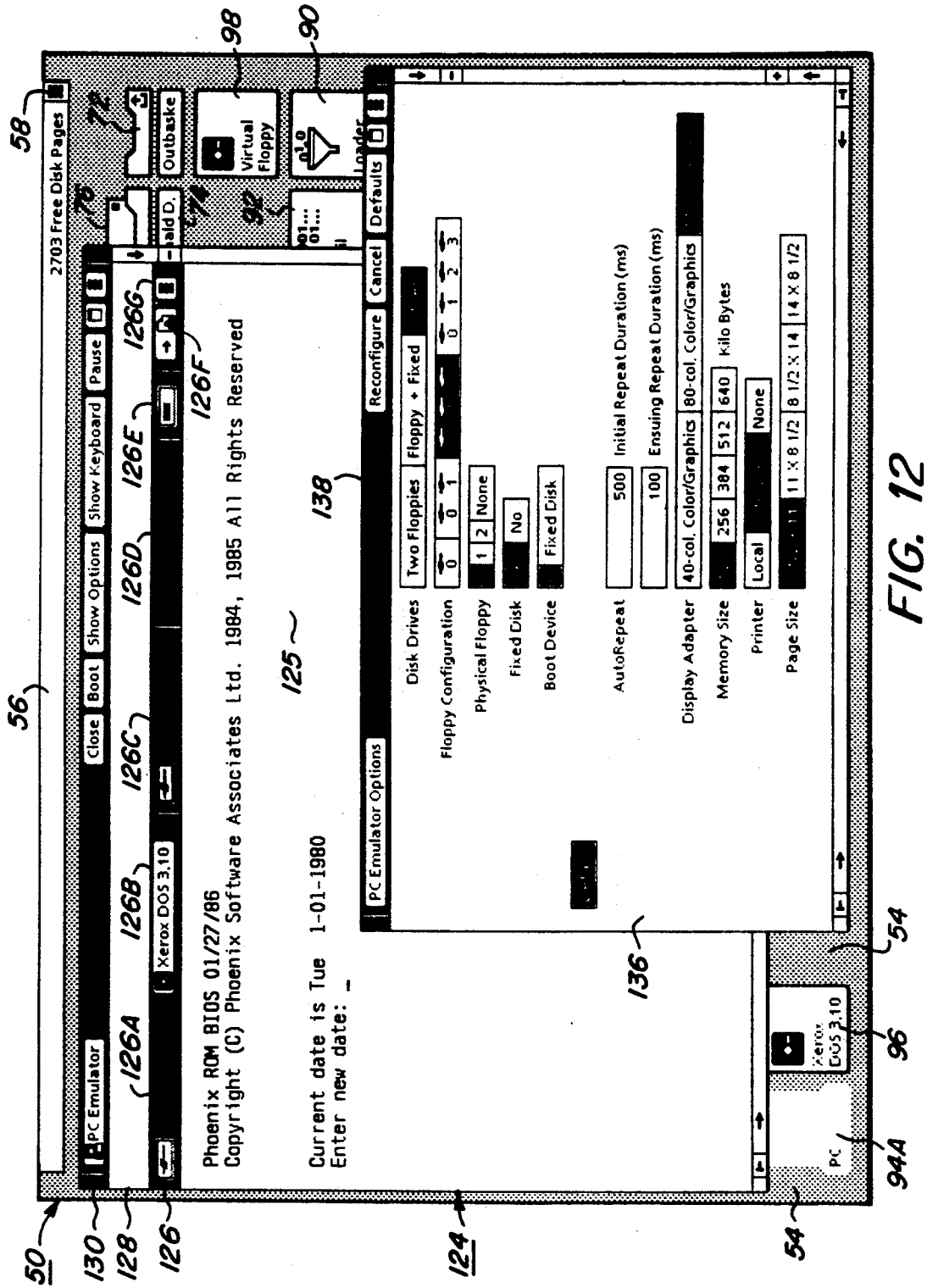
FIG. 12 is the same view as FIG. 11 except with the PC emulator option sheet opened for viewing.
Figure 12A:
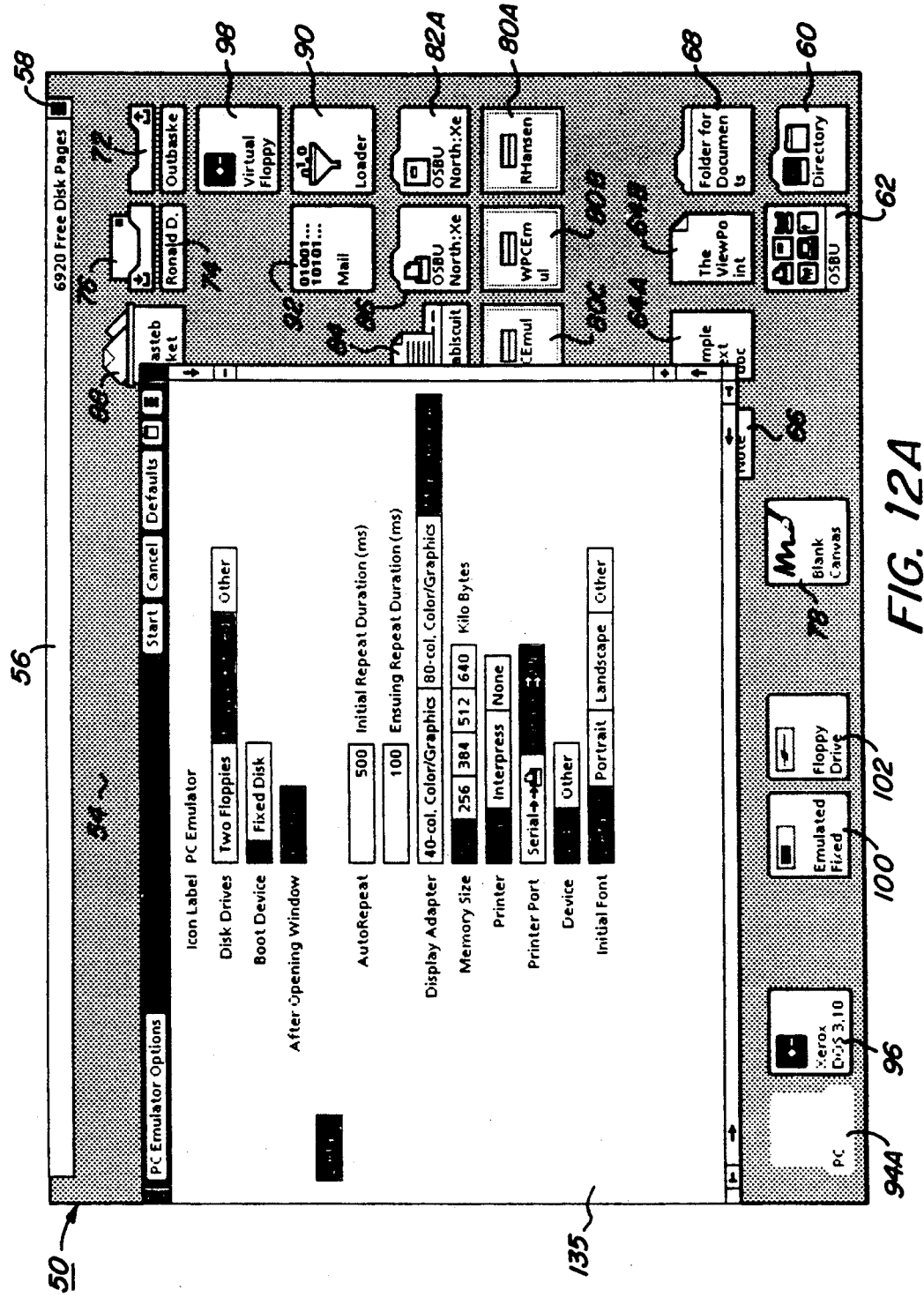
FIG. 12A is a view of the option sheet for the PC emulator when "Display Options" is invoked upon opening of the PC emulator.

The command "Show Options" displays what is termed an option sheet 136 shown in FIG. 12 and has nearly the same contents as found in property sheet 122 when "Other" and "Details" (property sheet 122B in FIG. 9) are invoked. At this point, the user may change the default device configuration as originally set in property sheet 122 as well as the other parameters shown. Beside the commands "Cancel" and "Defaults" in option sheet header 138 as in property sheet 122, there is the command "Reconfigure" which invokes any changes made in the option sheet to be applied immediately to the PC emulator configuration. Changes made will be immediately reflected in PC emulator device bar 126, allowing the user to reboot from the ready state either from emulated fixed disk or perhaps after the user has loaded media, such as the MS-DOS 3.10 virtual floppy 96, into an emulated floppy drive of the reconfigured PC emulator. Reconfigurations require confirmation since there will be an interruption of any running PC program and require rebooting since there has been a change in configuration. If a virtual floppy is present in an emulated floppy drive, such as illustrated in drive 1 at location 126B in FIG. 12 and this drive location is changed to the physical floppy drive or is removed from the configuration, any attempt to reconfigure will be cancelled until the virtual floppy is withdrawn from the floppy drive and return to desktop 54.

It should be noted that any changes made in option sheet 136 are only effective for present PC emulation session and upon ending the current session and closing of the PC emulator window, any parameters changed in option sheet 136 will revert to default settings previously established in the original configuration of the PC emulator property sheet 122.

Additional operational information relative to reconfiguration is discussed in connection with FIG. 20.

Figure 14:
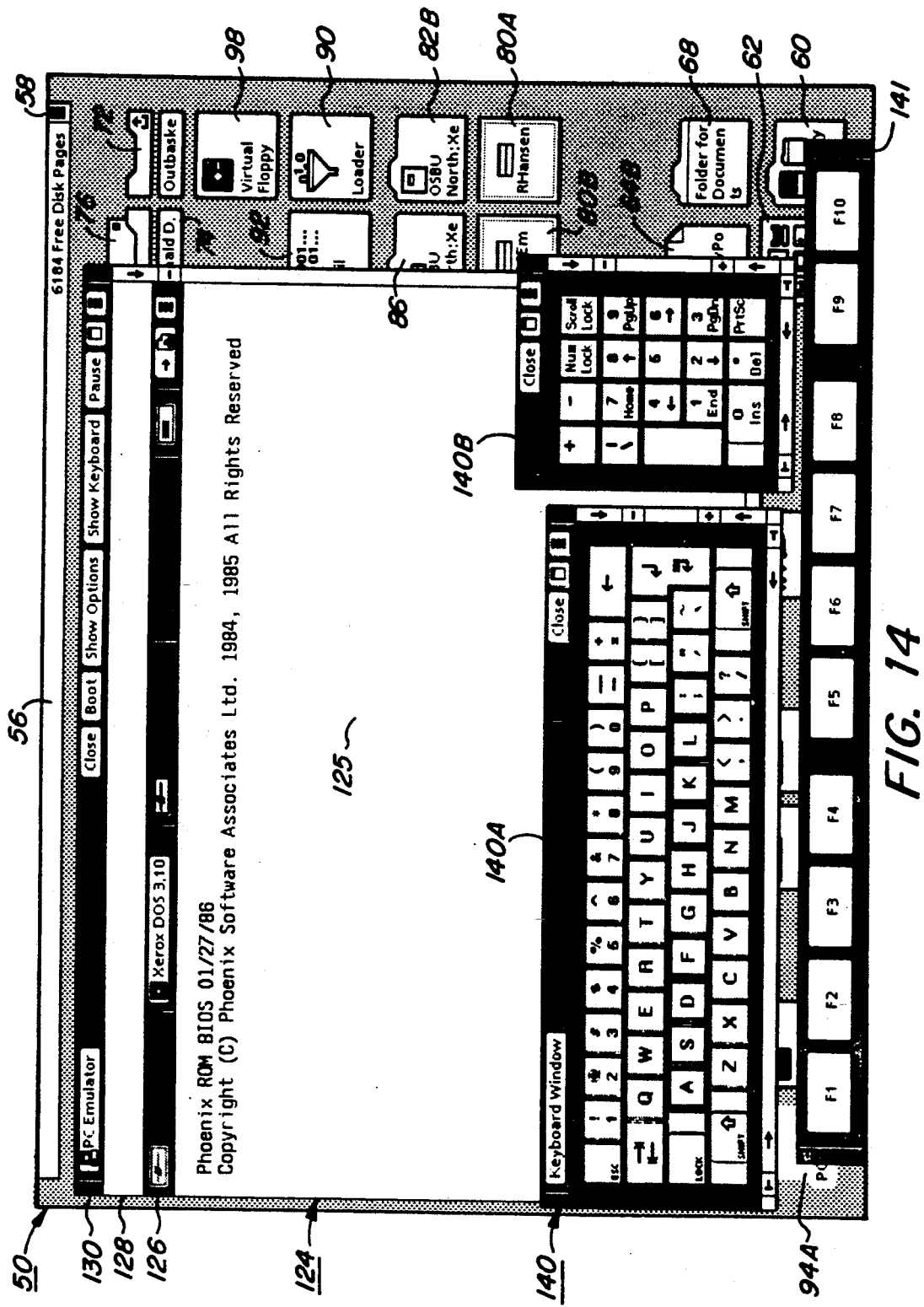
FIG. 14 is the same view as FIG. 11 with "Show Keyboard" selected.

The "Show Keyboard" command causes the PC emulation keyboard 140 to appear on desktop 54 in the lower portion of PC emulator window 124 as shown in FIG. 14. Keyboard 140 comprises the main PC virtual keyboard 140A and the right side virtual keyboard 140B. These is also a function keyboard 141 comprising ten keys for ten corresponding keys present along the top of keyboard 29. These function keys perform special functions such as centering text, text bold, text italics, text underline, text or character superscript and text or character subscript in ViewPoint and become general function keys in PC emulation and are functionally interpreted by the currently running PC program.

It should be noted that keyboard 29 is generally interpreted as the input for ViewPoint applications of host system 14 but whenever the PC emulator is running and whenever the mouse point button 31 is clicked in PC window 124, the input focus for mouse and keyboard input is directed to the PC emulator and keyboard 29 will be interpreted as the virtual PC keyboard directing keyboard input to PC emulating processor 12 in the manner explained in detail in patent application Ser. No. 06/856,126. Thus, user 18 must initially click button 31 in PC emulation window 124 to establish input focus to the PC emulator.

Buy clicking "Show Keyboard" in header bar 130, the virtual PC keyboard will appear so that the overlay of the PC keyboard keys on actual keyboard 29 is visually understood by the user. With input focus in PC window 124, user 18 may type input via keyboard 29 into PC screen 125. Virtual keyboard 140A as displayed in FIG. 14 is also operational via mouse point button 31 by moving mouse 27 to move screen point cursor 52 over selected keys and clicking mouse point button 31. Typed characters will then appear in PC screen 125.

When the input focus has been set to PC window 124 and the PC virtual keyboard is in effect, conversion from host system font characters, also referred to as NS characters, to IBM scan codes is necessary. All keys on keyboard 29 generate their own unique position codes on both down stroke and up stroke of each key. When keystrokes are detected, the scan codes are developed by the ViewPoint PC application 36 and passed through PC "Agent" 34 and handler 32 to PC board 30 where the running PC program interprets them as designed. The conversion from NS characters to IBM scan codes is illustrated in Table I.

TABLE I

| Key | Down Code (Hex) | Up Code (Hex) | Key | Down Code (Hex) | Up Code (Hex) | Key | Down Code (Hex) | Up Code (Hex) |
|---|---|---|---|---|---|---|---|---|
| A | 1E | 9E | 2 | 03 | 83 | Pg Dn | 51 | D1 |
| B | 30 | B0 | 3 | 04 | 84 | Insert | 52 | D2 |
| C | 2E | AE | 4 | 05 | 85 | Delete | 53 | D3 |
| D | 20 | A0 | 5 | 06 | 86 | PrtScr | 37 | B7 |
| E | 12 | 92 | 6 | 07 | 87 | UpCursor | 48 | C8 |
| F | 21 | A1 | 7 | 08 | 88 | DnCursor | 50 | D0 |
| G | 22 | A2 | 8 | 09 | 89 | BackCur | 4B | CB |
| H | 23 | A3 | 9 | 0A | 8A | Fwd Cur | 4D | CD |
| I | 17 | 97 | F1 | 3B | BB | NoOp | 4C | CC |
| J | 24 | A4 | F2 | 3C | BC | — | 4A | CA |
| K | 25 | A5 | F3 | 3D | BD | + | 4E | CE |
| L | 26 | A6 | F4 | 3E | BE | BackSpac | 0E | 8E |
| M | 32 | B2 | F5 | 3F | BF | R/L Tab | 0F | 8F |
| N | 31 | B1 | F6 | 40 | C0 | R Shift | 36 | B6 |
| O | 18 | 98 | F7 | 41 | C1 | L Shift | 2A | AA |
| P | 19 | 99 | F8 | 42 | C2 | . | 33 | B3 |
| Q | 10 | 90 | F9 | 43 | C3 | . | 34 | B4 |
| R | 13 | 93 | F10 | 44 | C4 | / | 35 | B5 |
| S | 1F | 9F | ESC | 01 | 81 | BackSlash | 2B | AB |
| T | 14 | 94 | CTRL | 1D | 9D | ; | 27 | A7 |
| U | 16 | 96 | ALT | 38 | B8 | ' | 28 | A8 |
| V | 2F | AF | Return | 1C | 9C | reversed' | 29 | A9 |
| W | 11 | 91 | Caps Lock | 3A | BA | — | 0C | 8C |
| X | 2D | AD | Num Lock | 45 | C5 | = | 0D | 8D |
| Y | 15 | 95 | ScrollLock | 46 | C6 | [ | 1A | 9A |
| Z | 2C | AC | Home | 47 | C7 | ] | 1B | 9B |
| 0 | 0B | 8B | Pg Up | 49 | C9 | space | 39 | B9 |
| 1 | 02 | 82 | End | 4F | CF | | | |

Figure 11:
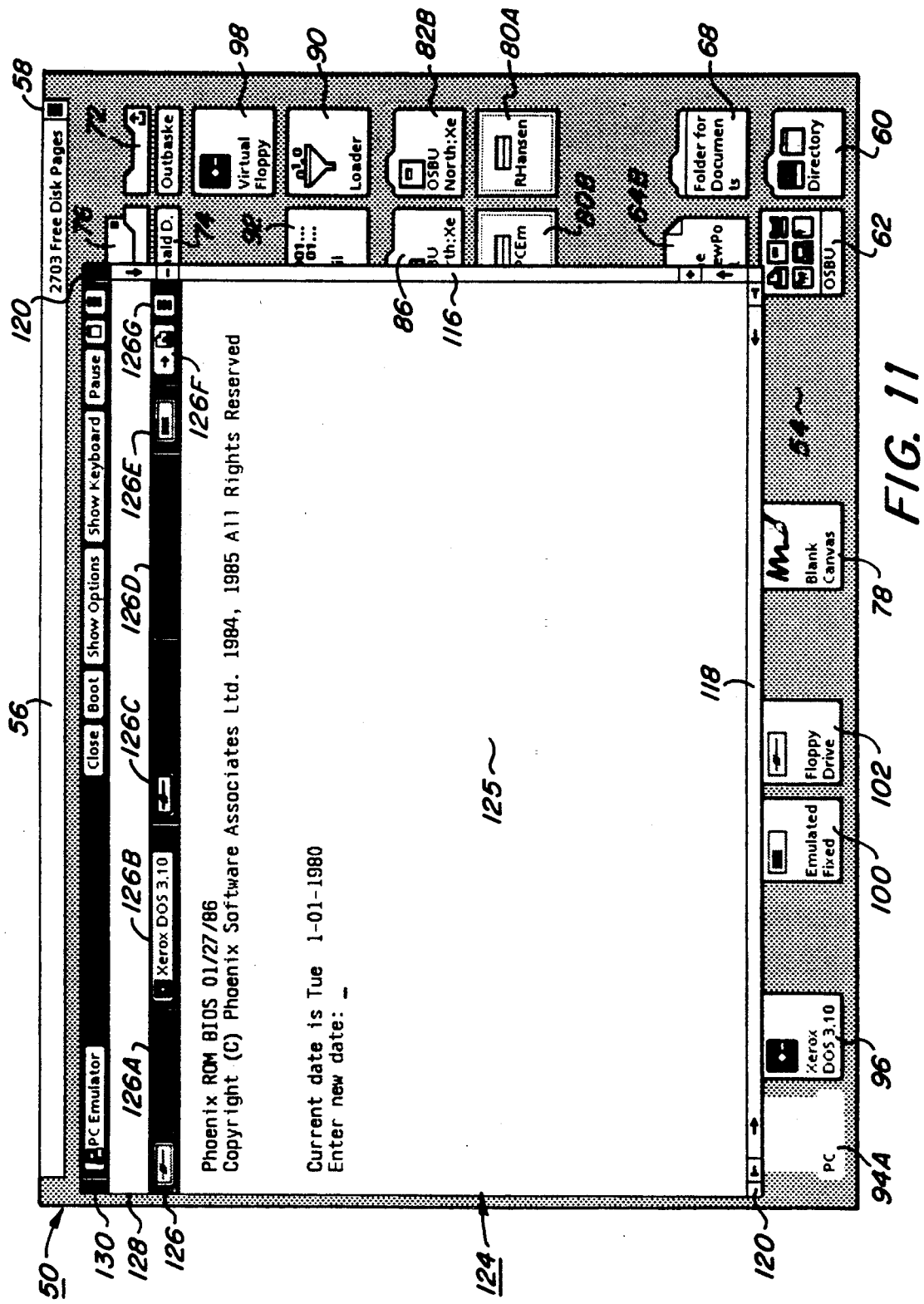
FIG. 11 is a view similar to FIG. 10 except with a virtual floppy disk loaded into an emulated floppy drive in the configured emulation window.

Reference is made now to FIGS. 10 and 11 where in FIG. 10, virtual floppy 98' is shown highlighted because it has been selected. With the <MOVE> function invoked, virtual floppy 98' may be moved via mouse 27 to any emulated floppy drive, e.g. in location 126B or 126C in this illustration. During this movement of the representation of icon 98, cursor 52 takes on the representation of a miniature floppy disk as shown at 98" in FIG. 10. This representation gives user 18 the visual appearance of actually moving a floppy from its original location on desktop 54 to a floppy disk drive in PC emulator 94. Once icon 98" is positioned over the selected emulated floppy disk drive, mouse point button 31 is clicked, dropping floppy 98" "into" the emulated floppy drive at a designated drive location. The result is that the floppy is loaded into the selected drive and user 18 is informed that this has been accomplished by the appearance of the virtual floppy label appearing at the selected floppy drive location. An example of this section is illustrated in FIG. 11 whereby a virtual floppy disk icon 96 labeled "Xerox DOS 3.10" has been copied and inserted in virtual floppy drive 1 at location 126B via a tiny icon 98" and the floppy label appears at that location. It should be noted that virtual floppy disk icon 96 need not be copied; it would normally be moved from desktop 54 to drive location 126B.

Location 126F in device bar 126 of PC emulation window 124 is a printer symbol. Documents or data files accessible in the PC emulator may be directed for printing by clicking the mouse point button 31 over the printer symbol 126F. The data that had been directed by the PC program to the PC printer port of emulating processor 12 will be converted to make an Interpress master (also referred to as a "print format document"), i.e., formatted for printing by an Interpress printer. This conversion occurs when user 18 selects a destination after selection of command 126F via left mouse button 31. An indication that the PC emulator is sending data to its printer port, and hence to the print file, is indicated as in progress by the horizontal oscillation or movement of arrow 138 pointing to Interpress master symbol 139. Interpress printing means that user 18 intends that the ultimate destination of the data to be printed is a laser printer connected to local area network (LAN) 39, such as Ethernet. Interpress printing is based on a "print file" that grows as the particular PC program invoked sends bits through what the PC emulator believes to be a printer port. User 18 causes a file to be converted to an Interpress master by clicking the mouse point button 31 over the Interpress master symbol 139 in device bar 126, whereupon cursor 52 will change to a small Interpress master icon, indicating that the prepared print file may now be dropped anywhere desired on desktop 54 and once dropped, it will be converted from a print file to an Interpress master, including onto an Interpress printer icon 84 which will send the master over LAN 39 to this connected printer, names "Seabiscuit", for print out. Once sent to the printer, user 18 can only suspend printing by opening the printer icon and selecting the document and then clicking with the mouse the "[Suspend]" command in the printer icon window. Any PC application capable of producing an Interpress master may do so leaving the master on a floppy (real or virtual) disk or on the emulated fixed disk for eventual transfer to printer icon 84.

Figure 13:
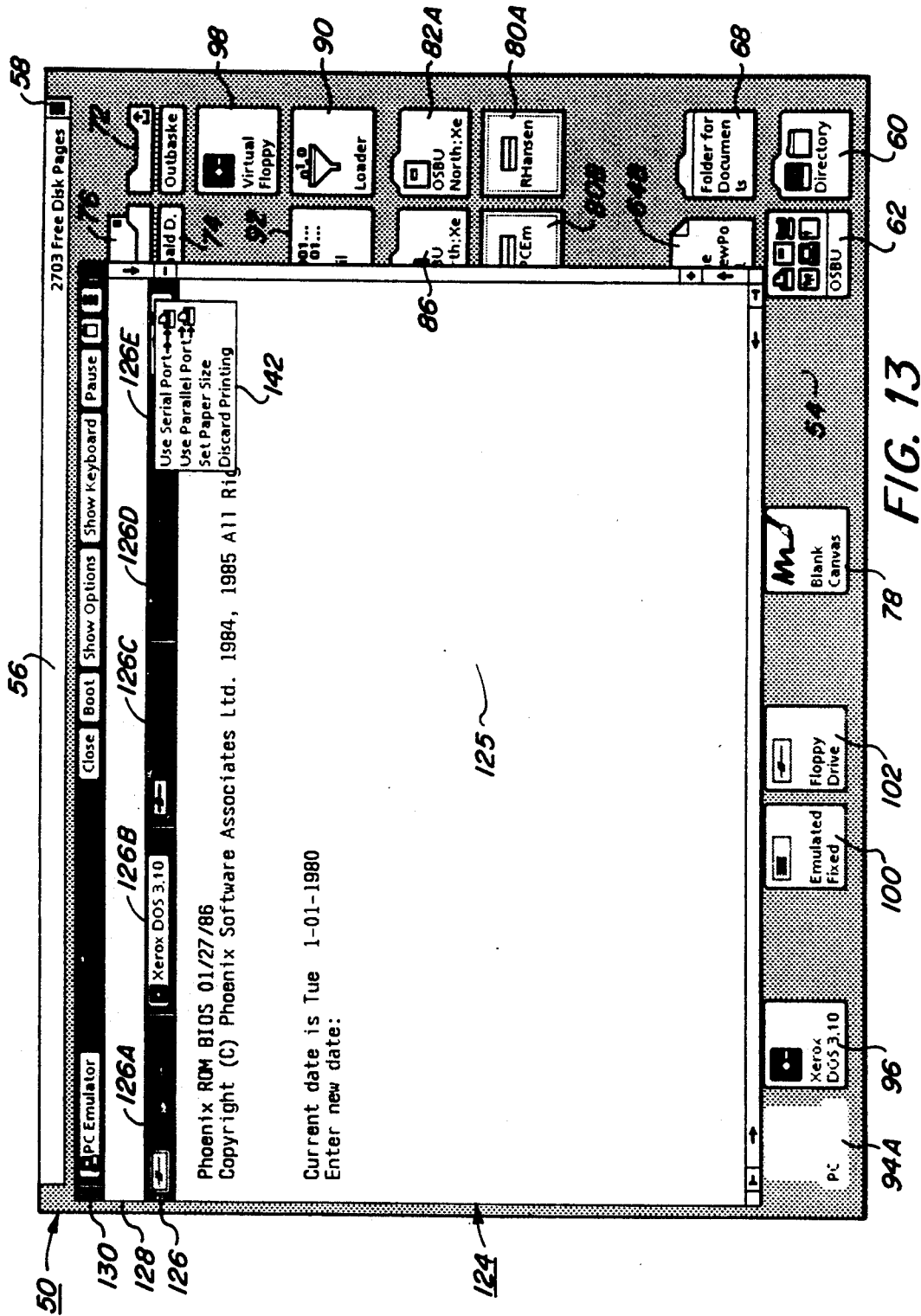
FIG. 13 is the same view as FIG. 11 except with "floating items" in the emulator display pop-up menu displayed.

Location 126G is a triple line symbol representing a pop-up menu which, when invoked via mouse point button 31, produces, as an example, pop-up menu 142 shown in FIG. 13. Menu 124 as shown is when Interpress printing has been invoked. If local printing, either serial or parallel port, has been invoked, the commands for these selections will have been replaced by the command, "Interpress printing", so that it can again be invoked, if desired. The selection of a function in this menu is accomplished by moving cursor 52 over one of four menu functions, mouse point button 31 still being maintained in its down or pressed position, and thereafter releasing button 31 over the function selected. At this point of release, the pop-up menu will disappear and the function selected will be initiated. The functions shown in FIG. 13 all involve printer parameters such as a serial port or parallel port type printer, paper size at the printer and whether bits collected for printing but not yet converted into an Interpress master should now be discarded. Menu 142 is an auxiliary menu for local printing accomplished by local printer 28 of either the serial port or parallel port type. This change from Interpress to local printing is accomplished without requiring the PC emulator to be rebooted. As with any local printer, ti is the user's responsibility to "load" the paper size appropriate for the pages to be printed. The user can override at this point the default set in emulator property sheet 122B by invoking the "Set paper Size" command in pop-up menu 142. This action produces a simple option sheet containing the paper size choices for selection and change. This paper size affects only interpress printing since, as already noted, local printing requires that user 18 load the desired paper manually. The "Discard Printing" command causes the print file in progress to be deleted and will immediately cause the creation of a new print file if bits for printing are still being emitted by the PC program.

When the Interpress implementation determines that there is not enough main disk space for preparation of an Interpress master, the implementation will put the PC emulator automatically into a "Pause" state so that no program can emit any more bits for printing. A message is posted to user 18 notifying this condition. The "Resume" commands is available at this point. User 18 may print the print file immediately, freeing up disk space but risking discontinuous output, or free up file space on disk 35 in some other way.

A typical user action sequence may be as follows:

In the following scenario, user 18 wishes to edit a document using WordStar, printing successive drafts on his local printer until satisfied with the results, then printing a final copy on a network laser printer via icon 84.

From the open PC Emulation Window, user 18 takes the following steps:

1. User 18 invokes pop-up menu 142 in the printer slot 126G of device bar 126 to switch to local printing, either serial or parallel port. Menu 124 at this command position changes to the command, "Interpress printing". After a confirmation, this discards any bytes in the print file that had been previously accumulated.
2. Runs the WordStar application in the PC emulation window 124. User uses WordStar's "print" command, which produces drafts on local printer 28.
3. Ready to print a final copy, user 18 switches to Interpress printing via pop-up menu 124. If user 18 wanted to change the page size to, say, landscape, user 18 would use pop-up menu 142 to bring up the page size options and choose 11×8.5.
4. User 18 then invokes the WordStar's "print" command one last time. The arrow 138 oscillates horizontally to indicate that the PC emulator is sending bits to the print file for printing. Eventually, it stops, and WordStar itself displays a message that printing is complete.
5. Finally, user 18 clicks the mouse point button 31 on the printer symbol 139 in the device bar 126, whereupon the cursor changes to a tiny Interpress master, and the message "Please indicate a destination with either mouse button" appears. User clicks once more on the icon 84 for "Seabiscuit", the closest printer in the building, for example. After several seconds, the print file's conversion to Interpress format is complete and the master is queued for transmission to the "Seabiscuit" printer via icon 84 pointer. The Interpress master is also automatically placed on desktop 54 so user 18 may file it, or mail it, or print it again.

Figure 15:
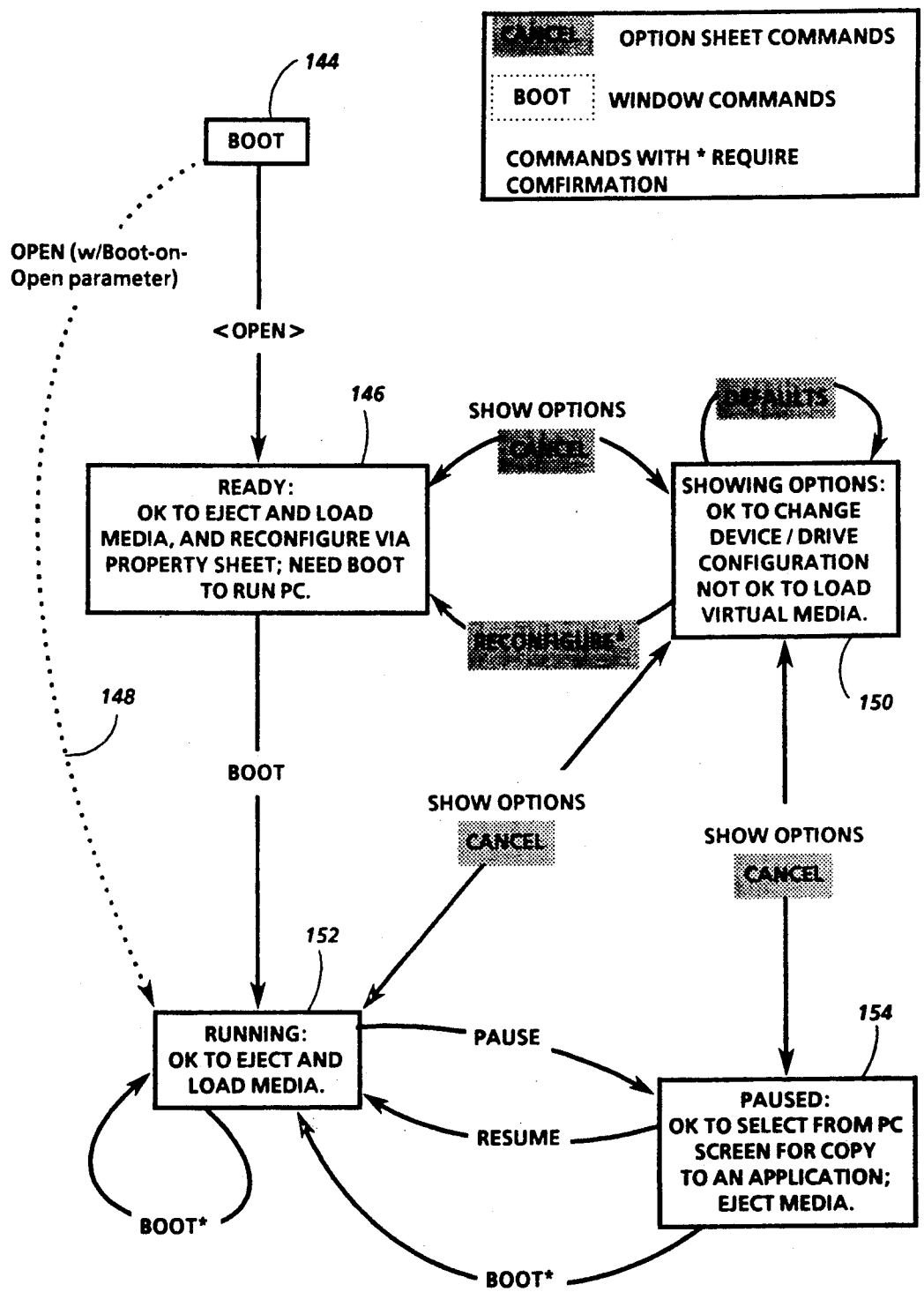
FIG. 15 is a state and transition diagram for operation of the PC emulator via the emulator window.

Having explained in detail the PC emulator interface in the form of PC emulation window 124, reference will now be made to the different PC emulator window states and transitions as illustrated in FIG. 15. FIG. 15 represents in flow form the different modes of operation of the PC emulator via user input.

The PC emulator is, to begin with, considered from its nonactive state and the PC emulation window is closed as indicated at 144. The PC emulator icon 94 has already been preconfigured as previously discussed via its property sheet 122. The PC emulator is made operational by first selecting PC emulator icon 94 and then invoking <OPEN> as previously explained. The PC emulation window 124 will appear. At this point, the PC emulator is in "Ready" state 146. In state 146, icon 94 is open but the PC emulator has not been booted unless the parameter, "After Opening Window [BOOT PC]" has been previously invoked in property sheet 122, and the invoking of this parameter is indicated by dotted line 148 in FIG. 15.

In "Ready" state, the commands "Close", "Show Options", "Boot", and "Show Keyboard" are available. In state 146, invoking "Show Options" permits the parameters in option sheet 136 (FIG. 12) to be changed and applied to the emulation as indicated in "Showing Options" state 150. Changes may be made at this point to the configuration in device bar 126. However, any emulated floppy drive removed by reconfiguration with virtual floppy media in its drive will have to have the floppy media removed before reconfiguration will actually complete. Also while in state 150, it is not possible to load virtual floppy media or to boot the PC emulator.

After reconfiguration, the user invokes the "Reconfigure" command in option sheet 136 which causes the reconfiguration to occur in device bar 126, the option sheet 136 to close and return to "Ready" state 146. As shown in FIG. 12 and indicated in FIG. 15, option sheet 136 may be cancelled. The option sheet disappears and no changes are made.

During a session of PC emulator operation occurring after reconfiguration via option sheet 136 and/or rebooting, the user may return to "Showing Options" state 150 from "Ready" state 146, "Running" state 152 or "paused" state 154, invoke the "Defaults" command to return the reconfigured emulation to the default parameters as originally set in property sheet 122.

In "Ready" state 146, physical floppy or virtual floppy media may be loaded relative to devices at locations 126A, 126B, 126C or 126D. At this point, the PC emulator may be booted to run PC applications, either from the emulated fixed disk, or from MS-DOS loaded via a virtual floppy into an emulated floppy drive, or from a physical floppy disk in physical floppy drive 25.

With the PC emulator booted, the emulator is in "Running" state 152. In this state, PC applications can be loaded and run via the insertion of actual floppy media in physical floppy drive 25 or virtual floppy media into emulated floppy drives bound to the PC emulator configuration, or from the emulated fixed disk.

From the "Running" state 154, the "Pause" and "Show Options" commands are available and a floppy disk may be removed from or inserted into physical floppy drive 25 and read to and written from. Also, a virtual floppy may be removed from or moved into an emulated floppy drive. Data may also be read from and written to the emulated fixed disk. The "paused" state 154 may be initiated by invoking the "Pause" command in command bar 130 of PC emulation window 124. In "Paused" state 154, all data structures in the PC world are intact, but the operation of PC emulating processor 12 has been stopped. It is now possible to select text or graphics displayed in emulation window 125 and copy the same to an opened BWS window on desktop 54. It is also possible to remove floppy media from an emulated floppy drive but is not possible to load such a media because the PC emulator is in its "Frozen" state 154.

In state 154, it si also possible to reconfigure the PC emulator by invoking the "Show Options" command as in the case of "Ready" state 146 and "Running" state 152.

While in "Paused" state 154, the command "Pause" in bar 130 is replaced by the command "Resume" which is a visible reminder that the PC window 124 is frozen. As previously indicated, the loading of floppy media is illegal in state 154, as it could allow apparently instantaneous swapping of disks in this state such that, for example, the PC emulator upon return to "Running" state 152 would permit the PC emulator to seek data on one floppy and then read/write from the other which would destroy previously written data.

After reconfiguration or a selection and copy from PC emulation screen 125 has been accomplished in "paused" state 154, the "Resume" command is invoked, returning the PC emulator to "Running" state 152 and permitting the continuance of PC operations and programming.

It should be noted that the PC emulator may be booted or rebooted from "Running" state 152 and "paused" state 154 and the PC emulation window may be closed in any of the states 146, 150, 152 and 154. Also the "Cancel" command between "Showing Options" state 150 and states 146, 152 and 154 returns the user to the state from which option sheet 136 was invoked without applying any changes to the PC emulations.

FIG. 15 states may be summarized by the following set of rules:

1. The "Close" command is always available. It cancels any changes to the option sheet, stops emulator operation in the "running" state 152 and closes emulation window 124.
2. It is acceptable to eject and load media in "Ready" state 146 and "Running" state 152. Only eject is allowed in "Paused" state 154 and "Showing Options" state 150.
3. The "Show Options" command is always available, except when already in "Showing Options" state 150.
4. The "boot" command is always available, except when in "Showing Options" state 150.
5. The "Cancel" command in the option sheet always returns to whichever of the other states one came from, whether the "Ready" state 146, "Running" state 152 or "Paused" state 154, and simply causes option sheet 136 to disappear.
6. Any command that is about to discard the current boot session requires confirmation. This includes: "close" and "Boot" while in "Running" state 152 or "paused" state 154, and "Reconfigure" and "Close" while "Showing Options" state 150 if arriving at that state from "Running" state 152 or "Paused" state 154.
7. The invoking of the "pause" command will freeze the operation of the PC emulator preventing further input to PC emulation window 124. The "Pause" command changes to the "Resume" command. When the "Resume" command in invoked, the PC emulator commences operation at the point where it left off in the execution of instructions and input to PC emulation window 124 is possible.

IV. Emulated Fixed Disk (EFD) Icon

Figure 16:
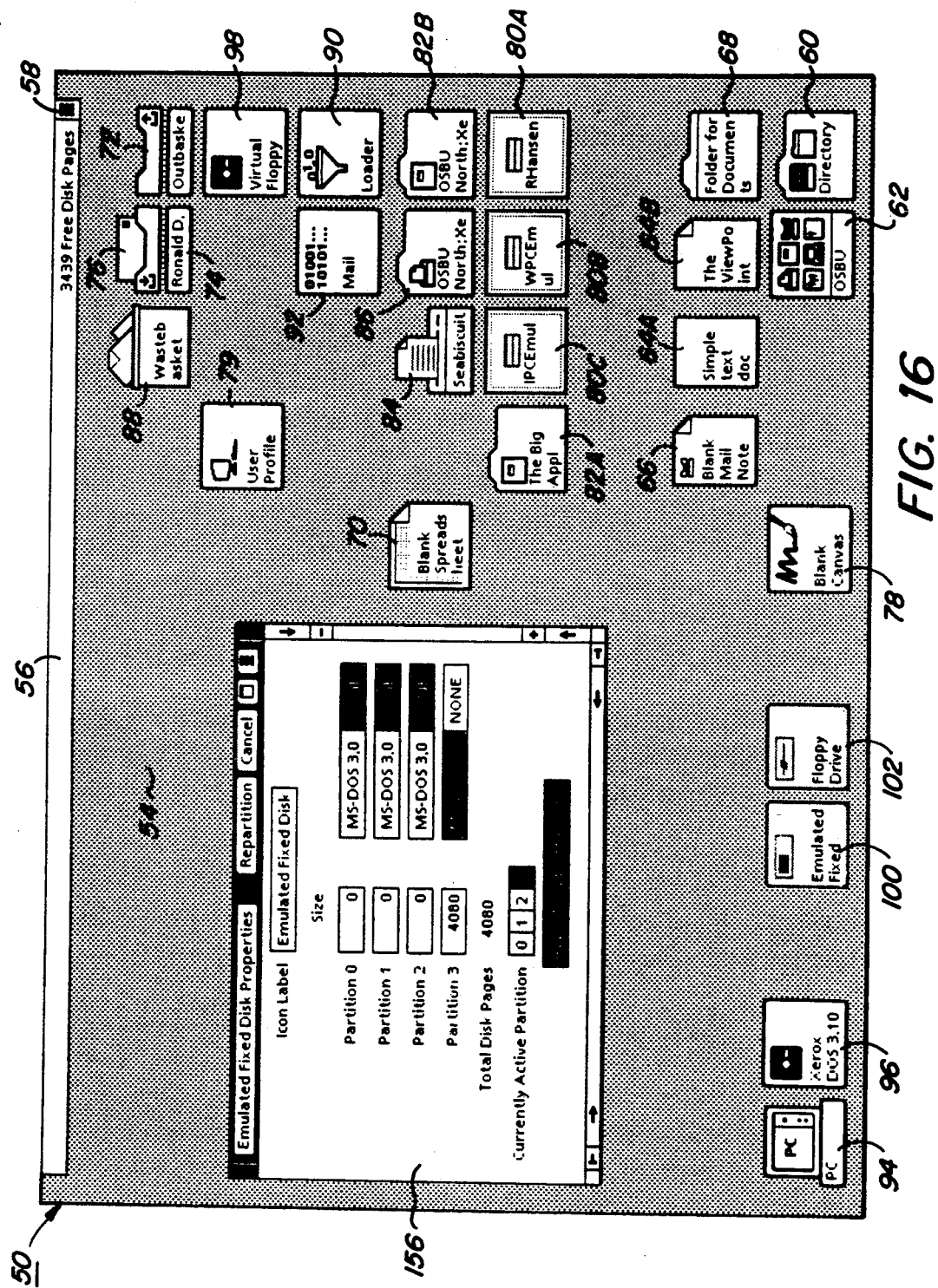
FIG. 16 is a view of the emulated fixed disk property sheet when activated.

Reference is now made to FIG. 16 which shows desktop 54 with emulated fixed disk (EFD) icon 100 having been previously selected and the <PROP'S> function invoked activating and displaying on desktop 54 emulated fixed disk property sheet 156. The emulated fixed disk represented by icon 100 is in reality reserved or allocated space on rigid disk drive 35 and is accessible from either desktop 54 or from PC emulation window 122. EFD icon 100, therefore, represents a pointer to that file space on drive 35. Although a user may make or have as many copies of icon 100 as desired, they will all be pointers to this same allocated disk space. There may be several desktop configurations on the same workstation, only one of which may be in use at any one time, and the reserved disk space in drive 35 for emulated fixed disk 100 will be shared by all desktops on the same workstation. The icon may be deleted by invoking the <DELETE> function with confirmation. However, this action will have no effect on the actual storage of any data in the PC reserved disk space on disk drive 35. After icon 100 deletion, a new EFD icon 100 can easily be retrieved via directory icons 60 and 62 and the new icon 100 would already have a pointer to the same reserved or allocated disk drive space. The associated property sheet 156 for icon 100, when activated, would also show the partition size parameters established. Icon 100 may be moved or copied via <MOVE> or <COPY> functions to a folder, file drawer or outbasket icon. However, since icon 100 is actually a pointer to reserved memory space on disk drive 35, filing or mailing of icon 100 serves little purpose. The operation <OPEN> may be invoked on icon 100 revealing an open BWS window showing its file contents on disk drive 35. These files may be copied to desktop 54 as data structures, e.g. documents, or transferred to file drawers 80 or to media in physical floppy drive 102 via the <COPY> or <MOVE> function.

EFD property sheet 156 in FIG. 16 allows the user to establish partitions in the reserved disk space of EFD icon 100 into four partitions as illustrated. This must be accomplished before EFD can be utilized. Changes to the partitions can be made also when EFD has been bound to location 126E in the PC emulator. The user specified in sheet 156 the number or disk pages to be reserved and the desired file system for each partition invoked, for example MS-DOS 3.0 or Unix. As shown in sheet 156, only partition 3 has been activated for MS-DOS and the total page size of the fixed disk reserved space of 4,080 pages has been set in partition 3. There must be already be a sufficient number of pages left on disk drive 35 to accommodate this total reserved space.

The file system established in each partition may contain program or data files. However, the partition will not contain a normal boot sector nor will it contain the system files to boot MS-DOS but a partition can be made bootable by running an appropriate PC utility.

The active partition of EFD icon 100 is in use when icon 100 is opened, is the recipient of an object moved or copied to icon 100 when closed, or is the partition booted by the PC emulator. The user can change the active partition in property sheet 156 since this action does not actually affect the data area of the emulated fixed disk.

The "Allow Size Changes" parameter in sheet 156, when activated, permits changes in partition size parameters. If this parameter is not active, the "Repartition" command will not appear in the header of sheet 156 but rather the "Done" command. With "Allow Size Changes" invoked, the user can edit the parameters of sheet 156 and reconfigure the partitions. Invoking the "Repartition" command destroys all data on the emulated fixed disk and establishes the new partitions. When repartition is complete, property sheet 156 automatically closes. All data formerly on the emulated fixed disk is now lost and each partition is initialized with an empty, and hence nonbootable, file system of the specified type, e.g. MS-DOS. It should be recalled that to make the EFD icon 100 accessible to the running of PC programs, the user must select the "Fixed Disk [Yes]" parameter in the emulator property sheet 122 or option sheet 136 prior to booting or rebooting.

PC utilites are available which install bootable file systems in fixed disk partitions of EFD icon 100. Once this has been done, the PC emulator will boot from the emulated fixed disk following the PC convention, i.e. when no real or virtual floppy is loaded in drive 0 in location 126A and the active partition of EFD icon 100 has been properly chosen.

Figure 16A:
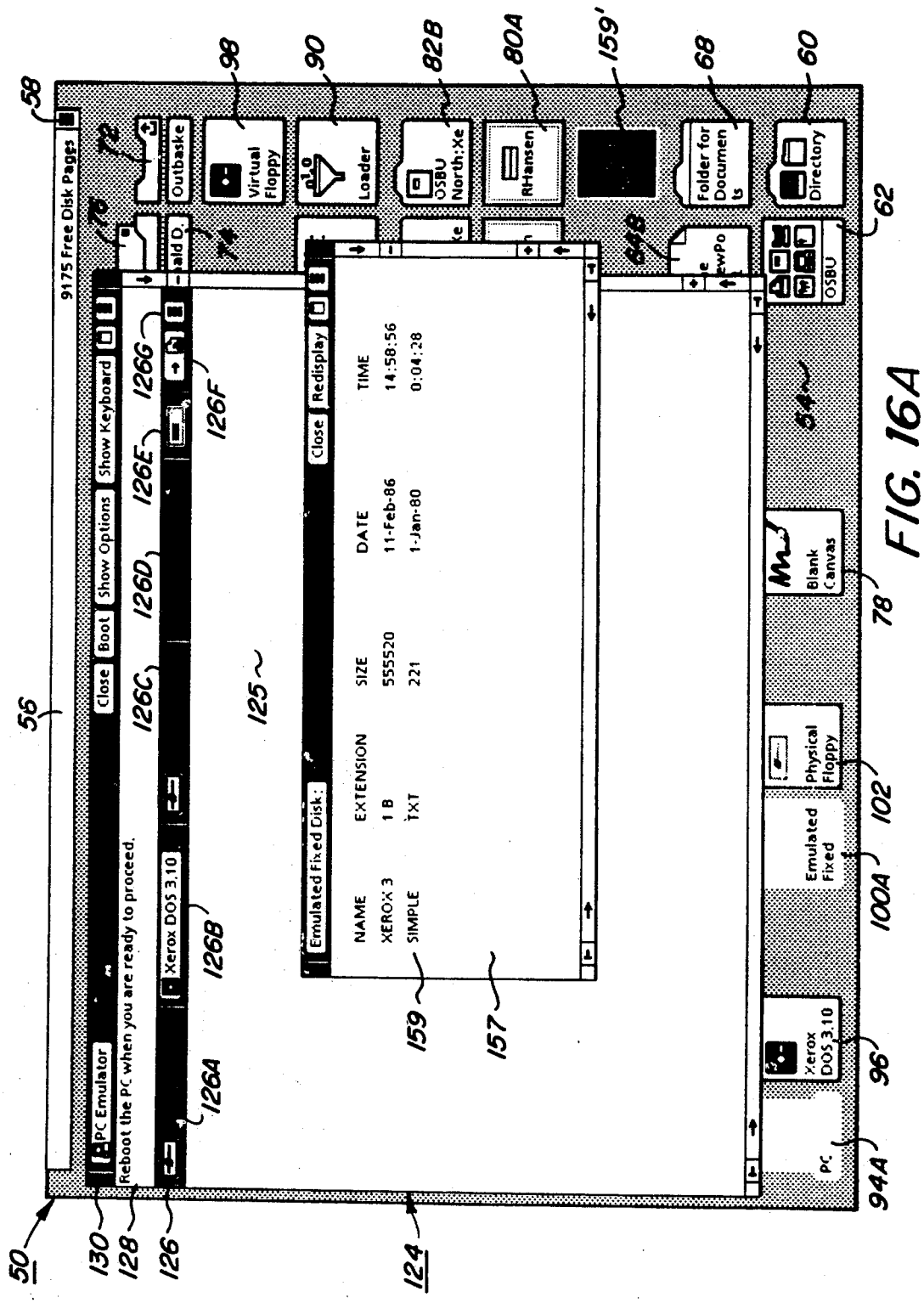
FIG. 16A is a view of the emulated fixed disk opened to reveal its directory of data files.

As previously indicated, while the emulated fixed disk is part of the PC emulator configuration, attempts to open EFD icon 100, show its property sheet, or move or copy a file to EFD icon 100 will not be possible. Conversely, an attempt to include the emulated fixed disk in the PC emulator's configuration while EFD icon is open or displaying its property sheet 156 will not be possible. If user 18 wishes to access the contents of the emulated fixed disk from desktop 54 while the PC emulation window 124 is open, it is necessary to remove the emulated fixed disk from the PC emulator configuration via option sheet 136 in "Showing Options" state 150 and the "Reconfigure" command. Upon reconfiguration, the EFD symbol will disappear from device bar 126 and the EFD on desktop 54 may now be opened. When icon 100 is opened, as exemplified in FIG. 16A, the directory window 157 of EFD icon is revealed and user 18 can select any of the data files in the container, move or copy them to selected designations, as previously explained, or delete the files from the container. In FIG. 16A, the file "Simple.txt" listed at 157 has been selected in directory window 159 and copied to desktop 54, as shown at highlighted document icon 159'.

V. Virtual Floppy Disk Icon.

Figure 17:
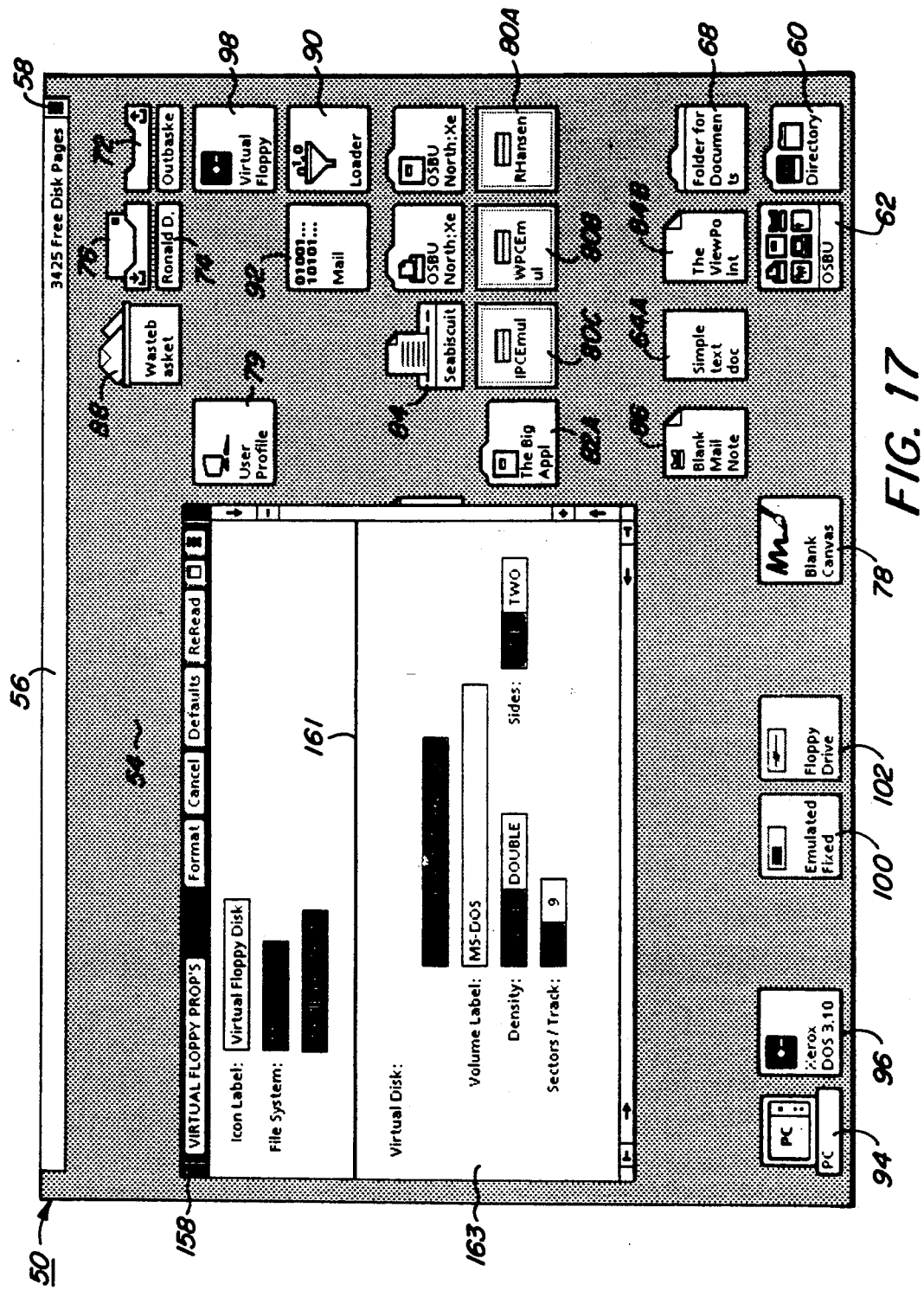
FIG. 17 is a view of the virtual floppy disk property sheet when activated.

Reference is now made to FIG. 17 which shows desktop 54 with virtual floppy icon 96 having been previously selected and the <PROP'S> function invoked, displaying on desktop 54 virtual floppy disk property sheet 158. If "allow Format Changes" has not been activated, the portion 163 shown below this parameter will be visually present but cannot be changed by user 18. The virtual floppy disk represented by icon 96 (or by icon 98) is in reality reserved or allocated space on rigid disk drive 35 and is accessible from both desktop 54 and from PC emulation window 122 when the disk has been inserted into an emulated floppy drive at, for example, location 126B (drive 1) in window 122. A blank virtual floppy icon 98 is available via the <COPY> function from directory divider 60. The space on disk drive 35 allocated for virtual floppy 98 is set dynamically when the floppy is formatted.

Virtual floppy disk icon 96 or 98 can be opened, moved or copied. When a virtual floppy icon container is moved to a PC emulated drive in the PC emulation window 122, there is no virtual floppy icon representation remaining on desktop 54, i.e., icon 98 disappears from desktop 54 and therefore cannot be open or selected by user 18 and can only be accessed via the PC emulator drive where it has been inserted.

A virtual floppy disk represented by icons 96 and 98 may be formatted or initialized either by a PC application or by a ViewPoint application.

When a virtual floppy disk icon is opened from desktop 54, the listing of files is revealed and the files in this container may be moved or copied to other similar PC containers or to desktop 54 as a data structure, e.g. a document icon similar to copying files from a real floppy disk in physical floppy disk drive 25. Other files compatible with MS-DOS may be copied into a virtual floppy disk. FIG. 17B shows the directory window 165 for Xerox DOS 3.10 virtual floppy icon 96 opened via the <OPEN> function showing the list of files on this particular disk.

When a virtual floppy disk icon is on desktop 54, it behaves like a data structure container, such as a file folder icon, allowing user 18 to select data objects from within its open window. Thus, in FIG. 17B, a listed file can be selected and moved or copied from the directory to desktop 54. Moving or copying this icon is like moving or copying a folder in that the data within the container and present on the system main disk drive 35 is directly affected, and deleting a virtual floppy disk icon causes all of its contained files to be deleted from disk drive 35.

The contents of a virtual floppy disk icon container may be moved or copied to the appropriate partition of EFD icon container 100 when the latter is on desktop 54 and not bound to the PC configuration. A virtual floppy disk icon or its individual contents may be moved or copied to any ViewPoint container, including an NS structured floppy disk present in physical floppy drive 25. Conventional PC commands may be employed to perform a complete bit for bit copy of a file from a virtual floppy disk inserted in an emulated drive in device bar 126 to a physical floppy present in drive 25 bound to the PC emulator via physical floppy drive icon 102. On the other hand, a file in a virtual floppy disk icon container, formatted for MS-DOS, on desktop 54 may be opened and the file transferred to a physical floppy, formatted for MS-DOS, present in physical floppy drive 25 via the <MOVE> or <COPY> function to the opened window of physical floppy drive icon 102. Also, one may move and copy files from a Xerox (ViewPoint) formatted physical floppy in drive 25 to an MS-DOS virtual floppy, or from an MS-DOS physical floppy to a Viewpoint virtual floppy, since both kinds of media, here, are formattable in a way that is recognizable to the current system state. More on format compatability and file extension determination will be said later.

Virtual floppy disk property sheet 158 in FIG. 17 allows user 18 to change the icon label (title) or to change to another available file system, such as UNIX. The parameters include its density, the number of sectors and tracks, the file system, and whether the disk is write protected. The number of available pages on a particular virtual disk is the same volume allocated space on disk drive 35 so that the space allocated to a virtual floppy disk is the same, whether this container is empty or contains many data files.

Figure 17A:
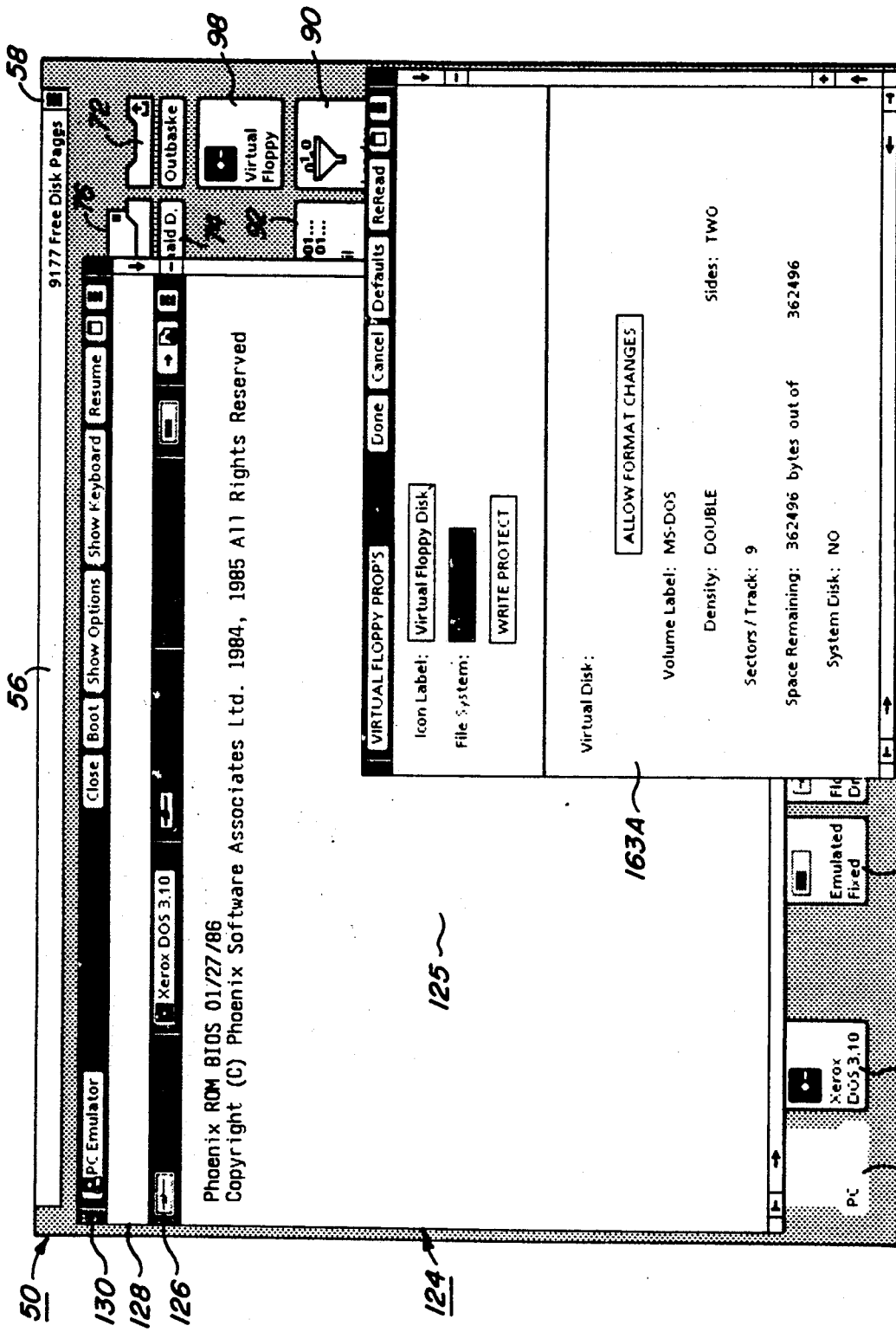
FIG. 17A is a view of the virtual floppy disk property sheet when the command "ReRead" has been invoked.

The "Reread" command in the header of sheet 158 initiates an attempt to interpret the contents of the virtual floppy using the specified file system. If this interpretation is successful, the bottom portion 163, "Virtual Disk" of sheet 158 below line 161 will disappear and then reappear as shown in FIG. 17A with file system specific parameters shown as originally initialized including an indication of available remaining space and whether the virtual floppy disk is a system disk or not. The information shown in bottom portion 163 or 163A may be different for other file systems.

Activating "Allow Format Changes" in property sheet 158 shown in FIG. 17A makes the bottom portion 163 of the sheet shown below line 161 appear, replacing bottom portion 163A if present.

When the virtual floppy icon properties are first displayed, or when the command "Reread" is invoked, it is possible that the file system actually on the virtual floppy will not match the icon properties. This will always be the case for a virtual floppy icon freshly copied from a directory 60. In this situation, "Allow Format Changes" will be automatically invoked to permit the user to format the virtual floppy. The invoking of the command "Format" in the header of property sheet 158 causes the virtual disk to be reformatted according to the specific parameters set in the bottom portion 163 of the sheet, provided that the "Write Protect" option in sheet 158 is deactivated. Also, activating "Write Protect" prevents the PC emulator from writing on the virtual floppy disk, though it may still read from the floppy disk.

If the virtual disk icon has been previously formatted, reformatting via the "Format" command requires explicit confirmation, via a prompt in header 56, because this action will destroy any data stored on the disk. Host system 14 allocates enough disk space at drive 35 to accommodate the requested format for a double sided, double density disk of nine (9) sectors per track. This amounts to 720 pages of data, plus 14 pages of system overhead. If there is not enough system disk space, user 18 can try again with a smaller format configuration, or take action to increase available disk space in drive 35.

Table II shows the amount of disk space required by the various possible disk formats.

TABLE II

| Sides | Sectors/track | Pages Required |
|---|---|---|
| 1 | 8 | 334 |
| 1 | 9 | 374 |
| 2 | 8 | 654 |
| 2 | 9 | 734 |

Once formatted via property sheet 158, virtual floppy disks may contain any PC program or data files but do not contain an MS-DOS boot record or system files and, therefore, cannot be used to boot the PC emulator. Virtual floppy disks intended for such use should be formatted and initialized using PC utilities.

In the header of virtual floppy property sheet 158, the "Defaults" command sets the parameters invoked in the bottom portion 163 of the sheet as follows: "Allow Format changes" set to off, "Volume Label" becomes blank, "Density" is [double]" and "Sides" is "[Two]" and "Sectors/Track" is "[9]".

As previously indicated, user 18 loads a virtual floppy disk icon, such as floppy disk icon 96 or 98, by moving the icon, via selection with mouse point button 31 and the <MOVE> function, to any emulated drive symbol (locations 126A–126D) in device bar 126 of PC emulation window 122. This action makes data files and programs in the floppy disk accessible to run-time PC programs that expect to read and write to the specified emulated drive. While the floppy disk is in the emulated floppy drive, the PC emulator's specified file system format may be changed via a PC program or utility so that the file system specified in the floppy disk icon's property sheet 158 may not match the file system actually recorded on the virtual floppy disk.

A PC program that formats floppies may fail for virtual floppies if the program formats larger-than-usual tracks and there are not a sufficient number of rigid disk pages available.

User 18 may remove or "eject" a virtual disk floppy from an emulated disk drive by clicking the mouse point button 31 over the emulated disk drive symbol and cursor 52 will revert to virtual floppy disk symbol 98'. The user may than be moving mouse 27 correspondingly move symbol 98' to an acceptable desktop destination, such as an open desktop space or a file folder icon on desktop 54, and drop the virtual floppy disk icon by clicking again either mouse point button 31 or adjust button 33. With the virtual floppy icon on desktop 54, the contents of the floppy disk icon can be accessed from desktop 54 via the <OPEN> and <COPY> or <MOVE> function as previously explained.

Figure 24:
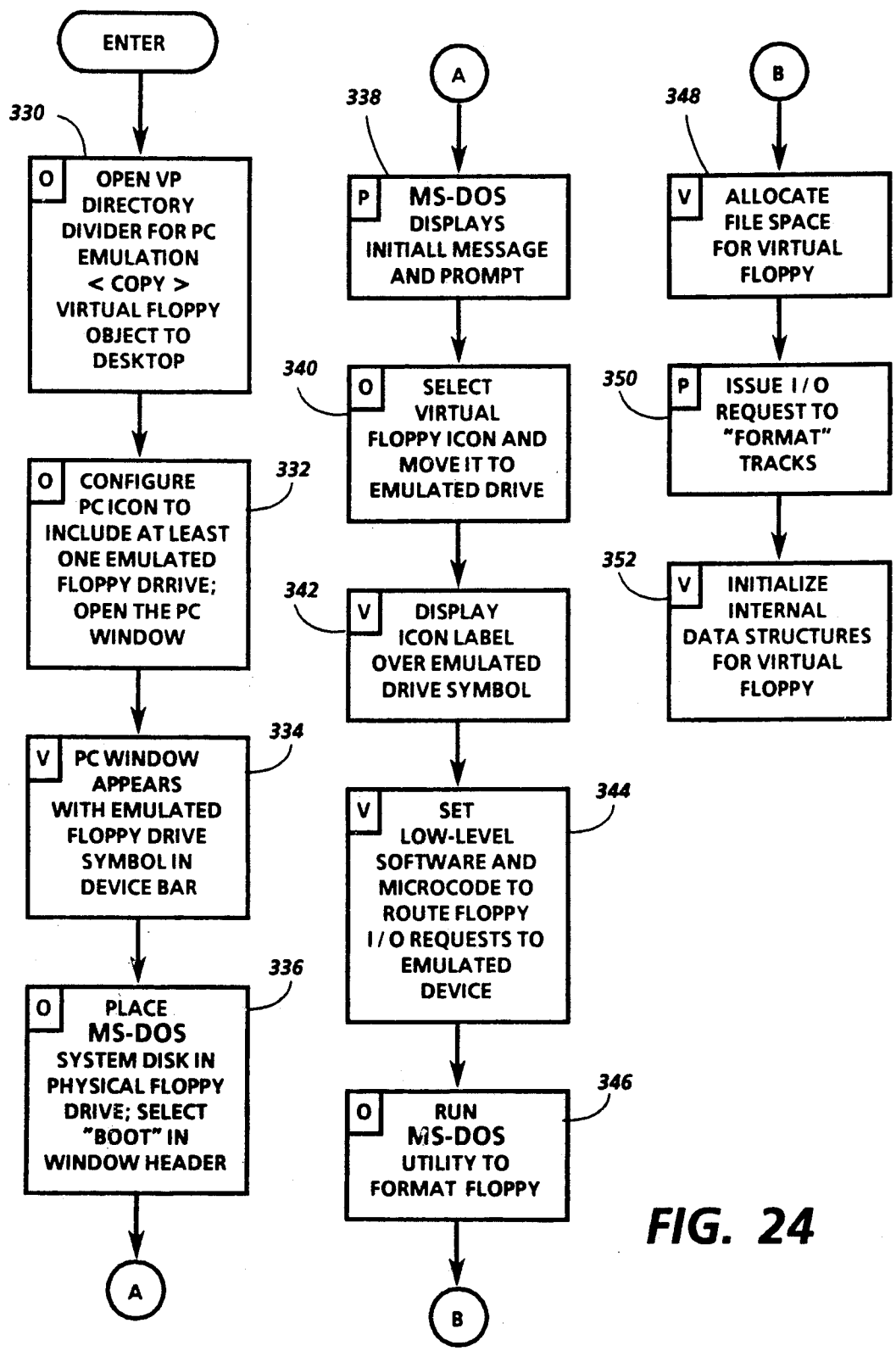
FIG. 24 is a flow chart illustrating the setup and initialization of a virtual floppy disk.

Reference is now made to the flowchart in FIG. 24 concerning the configuration and initialization of virtual floppy icon when bound to the PC emulator. In this flowchart, as well as flowcharts of later described figures, the small boxes in the upper left hand corner of the larger operational boxes denote by a letter in the box the action being taken by host system 14, PC emulating processor 12 or user input. Thus, the inclusion of box like that below denotes a host system, ViewPoint action:

The box below denotes a PC emulator action:

The box denotes an operator or user input action:

As indicated at box 330, the user 18 may obtain a virtual floppy icon by opening a ViewPoint directory divider, such as directory divider icon 60, that includes objects used for PC emulation. Having opened this divider, user 18 may select any of the objects for PC emulation out of the divider by invoking the <COPY> function, one of those objects being virtual floppy icon 98, and transferring the copied object to desktop 54, as already shown for example relative to floppy icon 98 in FIG. 6. User 18 configures the PC to include at least one emulated floppy drive, then opens PC emulation window 124, as per box 332. As indicated at box 334, the PC window 124 appears with the emulated floppy drive symbols in the device bar 126. User 18 may then place a MS-DOS system disk into physical floppy drive 25 and select the "Boot" command in header bar 130 to boot the PC emulator. These operations are indicated at box 336 in FIG. 24. The PC emulator would display the initial message and cursor prompt after having been booted, as per box 338, and user 18 may then select virtual floppy icon 98, as indicated selected at 98' in FIG. 10, and move this floppy via small floppy icon cursor 98' to the emulated floppy drive such as at location 126B as per box 340. The dropping of the miniature icon 98' on the drive at location 126B will cause the display at location 126B of the icon label for the particular virtual floppy so installed. This action also sets low level microcode routing of floppy I/O requests to the software emulator for the emulated floppy disk drive at location 126B. These functions are all sequentially indicated via boxes 342 through 344.

At this point user 18 will want to run a MS-DOS utility to format the virtual floppy disk inserted into an emulated floppy drive, as indicated at box 346. As a result, host system 14 will allocate file space on rigid disk drive 35 for virtual floppy 98 as indicated at box 348. Also, emulating processor 12 will issue I/O requests to format each track of the virtual floppy for the selected MS-DOS filing system and verify the same and host system 14 will initialize internal data structures for virtual floppy 98. These functions are carried out respectively by PC emulating processor 12 and host system 14 per boxes 350 and 352 in FIG. 24. There is on initialization, a list of the location of the tracks for each sector and for each track a pointer to each page on which a particular sector/track will reside and sector identification and size.

VI. Physical Floppy Drive Icon

Figure 18:
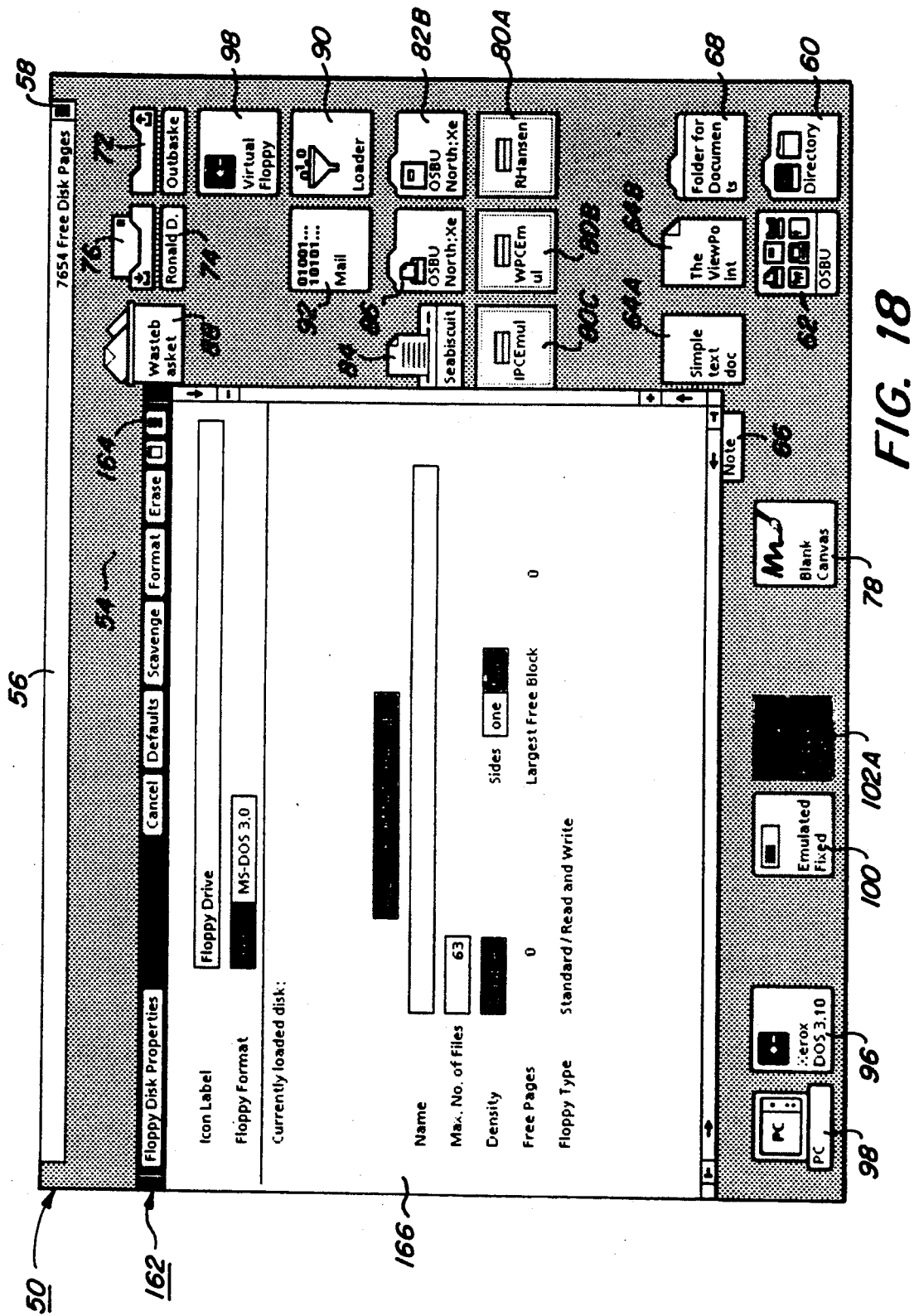
FIG. 18 is a view of the physical disk drive property sheet when activated.

Reference is now made to FIG. 18 which shows desktop 54 with physical floppy drive icon 102A having been previously selected and the <PROP'S> function invoked activating and displaying on desktop 54 physical floppy drive property sheet 162. Icon 102 is available from directory 60 and represents, via its data structure as a ViewPoint application, the physical floppy drive 25 of host system 14. User 18 may have or make as many copies of icon 102 as desired, but each such icon is a pointer to the same physical floppy drive 25. The deleting of icon 102 via the <DELETE> function has no effect on any data because the icon is a pointer to drive 25. Icon 102 may be moved or copied to a folder or file drawer container or to an outbasket, although such an action has no effect on data contained on any physical floppy disk.

Floppy drive icon 102 may be opened via the <OPEN> function, revealing the contents of an actual physical disk currently in drive 25. FIG. 18B displays such a file content in directory window 167 for an actual disk present in drive 25. User 18 may move or copy data files and icon objects to or from floppy drive icon 102 in the same manner as a file drawer icon 80. In FIG. 18B, the file "Diskcopy.com" has been shown selected as highlighted at 169 and may be copied or moved to desktop 54 via either the <COPY> or <MOVE> function.

Hose system 14 supports different file systems present on floppy disks, two of which are exemplified in FIG. 18 in property sheet 162: the file systems of Xerox and MS-DOS. The user can select the file system expected to be read or written by selecting either "[Xerox]" or "[MS-DOS]". The preferred mode of operation is that the user have more than one copy of floppy drive icon 102 present on desktop 54 and set the properties of each icon to a particular and different file system.

A "Reread" command will appear upon invoking the popup menu at triple line symbol 164 in a manner previously explained. Invoking this command will cause an attempt to interpret the parameters of an actual floppy disk present in drive 25. The invoking of this command would be usually done after changing the file system parameter or after replacing the floppy disk in drive 25 with a different disk.

Parameters specific to a particular file system occupy the bottom portion 166 of property sheet 162. In the case of FIG. 18, the parameters for the Xerox file system are shown. When user 18 selects "Allow Format Changes", the parameters displayed in portion 166 may be edited and the "Format" command appears in the header of sheet 162 in place of the "Done" command. The "Format" command formats and initializes the disk as set by the user in sheet portion 166, after which the "Done" reappears in the header of sheet 162 and "Allow Format changes" is dehighlighted or deactivated. At this point, the parameters in bottom portion 166 again cannot be edited. The user can place new physical floppies in drive 25 to being about formatting changes in the manner just explained. Invoking either the "Done" command or the "Cancel" command will remove physical floppy disk property sheet 162 from view.

Figure 18A:
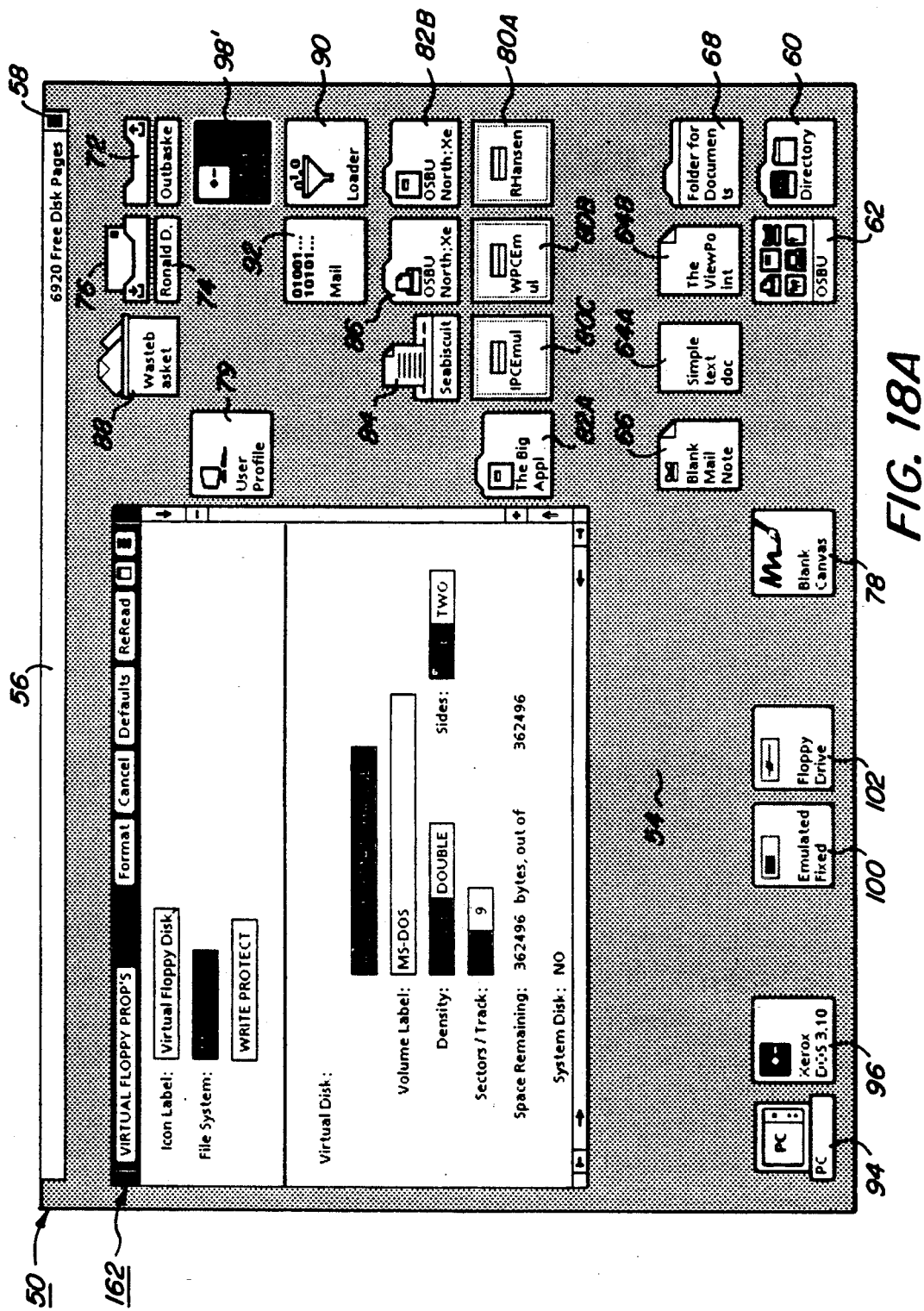
FIG. 18A is a view of the physical disk drive property sheet when activated with the [MS-DOS] file system specified.
Figure 18B:
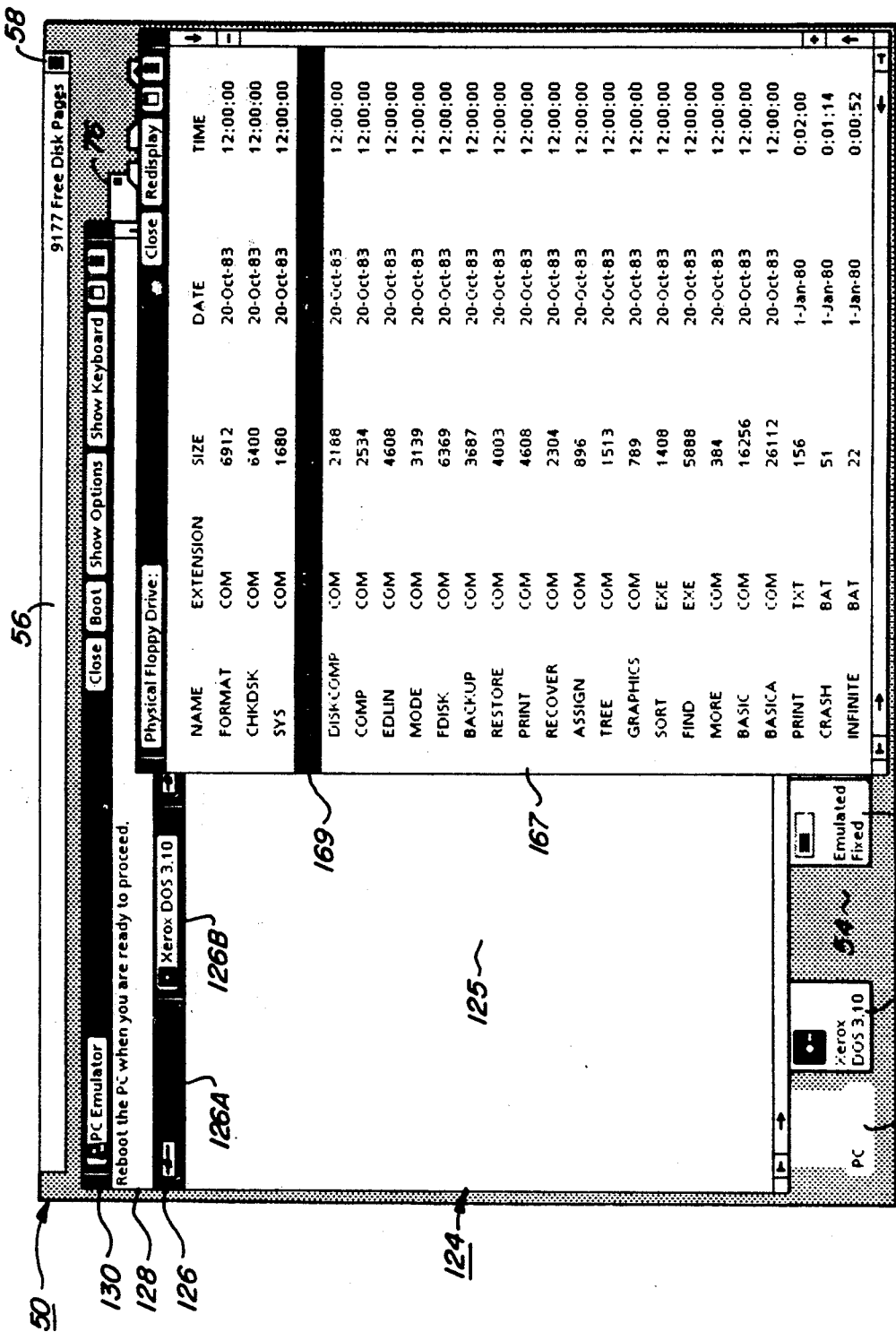
FIG. 18B is a view of a directory of an actual floppy disk in the physical floppy drive opened via the physical floppy drive icon.

FIG. 18A shows virtual floppy disk property sheet 162 when the user specifies the "[MS-DOS]" file system. All the commands previously explained in connection with FIG. 18 are the same here. As previously indicated, FIG. 18B shows an example of the file content of an actual floppy formatted to MS-DOS in disk drive 25 and when a floppy disk icon 102 is selected and the <OPEN> function is invoked. Window 167 will open if the actual floppy disk is a properly formatted MS-DOS. Hidden files, system files, and subdirectories not belonging to the top level directory will not appear in window 167. However, a user may open an MS-DOS file identified as a subdirectory, "<DIR>", by selecting it with mouse point button 31 and invoking the <OPEN> function, at which point the subdirectory contents will be shown in window 167. In FIG. 18B, the file "Diskcopy.com" is shown selected (highlighted) at 169.

MS-DOS files, such as those shown in window 168 except for subdirectories, may be moved or copied to ViewPoint containers, such as a folder icon or to desktop 54 as a data icon, e.g. a document icon. A ViewPoint name will be generated and appear in the format: [NAME.EXTENSION]. Also an NS file type will be determined and other attributes will be set to default values.

MS-DOS files may also be moved or copied to other MS-DOS icon containers, such as MS-DOS formatted virtual floppy disks 98 or the emulated fixed disk icon 100. All directory information of the transferred file will be transferred too.

Figure 18C:
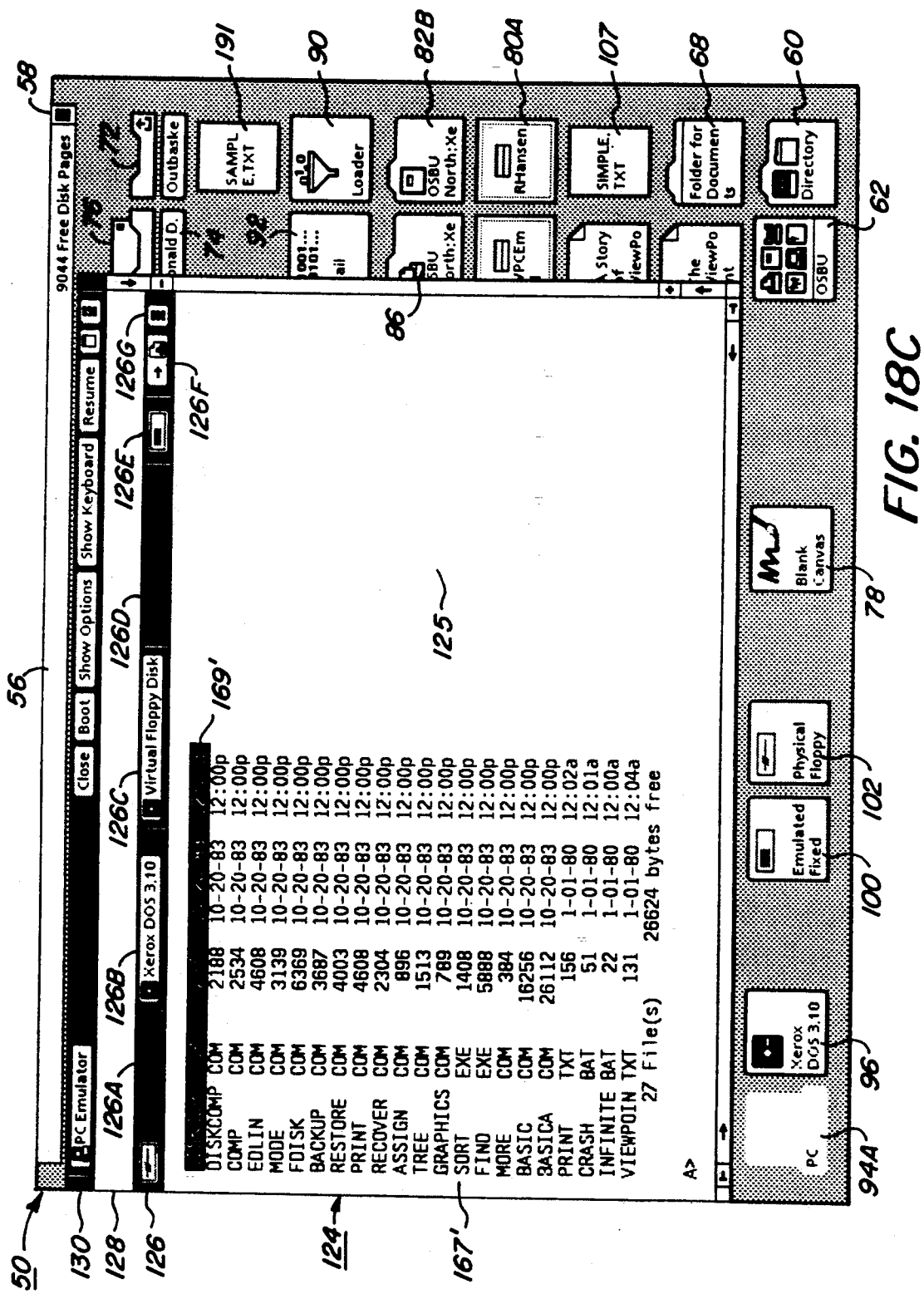
FIG. 18C is a view of the same directory as shown in FIG. 18B but accessed via the PC emulation window on a <DIR> prompt.

FIG. 18C shows PC emulation window 124 opened and configured to include physical floppy drive 25 at location 126A with a MS-DOS command "DIR" having been accomplished to show the directory 168' of the disk in drive 25 which is "A" drive, and which is the same disk and disk directory shown in FIG. 18B but being accessed now via PC emulation window 124. The PC emulator is in the "Pause state and the file "Diskcopy.com" shown in screen 125 has been selected (highlighted) at 169'. Thus, the file directory of a physical floppy in drive 25 may be accessed in the ViewPoint world or in the PC world. File access depends, of course, upon floppy format.

An important point is that when physical floppy drive icon 102 is assigned or configured to the PC emulator, it is inaccessible from desktop 54 and the only way to access the data on a physical floppy in drive 25 is visa PC utilities to perform a transfer of data, including a transfer of a file or PC display screen data to the ViewPoint world.

VII. MS-DOS and ViewPoint File Names and Type

Table III below summarizes the foregoing MS-DOS window operations.

TABLE III

| | Destination Container | | |
|---|---|---|---|
| Source Object | Emulator Window | ViewPoint (VP) Container (including desktop 54) | None |
| MS-DOS File | MOVE/COPY | MOVE/COPY | DELETE, PROP'S |
| MS-DOS directory | NOT ALLOWED | NOT ALLOWED | DELETE, OPEN, PROP'S |
| VP non-container | MOVE/COPY | MOVE/COPY | DELETE, OPEN, PROP'S |
| VP container | NOT ALLOWED | MOVE/COPY | DELETE, OPEN, PROP'S |

A specific set of ViewPoint objects can be moved or copied to an opened virtual floppy window or to its closed icon on desktop 54. When the physical floppy drive is configured and in use by the PC emulator, its icon on desktop 54 cannot be opened. Deletion of physical floppy drive icon 102 on desktop 54 has no effect on the symbol at location 126A in device bar 126. If user 18 wishes to make physical floppy drive 25 accessible to PC programs, of course its corresponding icon 102 must be included in the PC emulator's disk configuration via its property sheet 122 or option sheet 136. If user 18 wishes to access a disk in physical floppy drive 25 from desktop 54 rather than from the PC emulator while the PC emulation window 124 is open, it is necessary to remove the floppy drive icon 102 from the PC emulator's configuration via option sheet 136 and to invoke the "Reconfigure" command.

When moving data files back and forth between the ViewPoint world and the MS-DOS world, it is useful to preserve as much information as possible in the interpretation of the contents of a file. In ViewPoint files, the file system stores this information along with the file as a "file type" which manifests itself to user 18 as an icon picture. MS-DOS keeps track of this information using a file name extension. For example, an application may, by convention, give all loadable binary programs the extension "COM", all ASCII files the extension "TXT" and all Interpress masters the extension "IP". The rules to follow for file name conversion and keeping within the conventions of the target filing system are as follows:

1. Never create a file name which is illegal in the target file system.
2. Make the name as similar as possible to source name.
3. For a specified list of situations, force the extension to match the file type and vice versa.

A ViewPoint system data file, for example on desktop 54 in the MS-DOS system, will carry the following extensions. If the ViewPoint file type is ASCII, its MS-DOS extension is "TXT". If it is a word processor file originally created on the 860 word processor, its MS-DOS extension is "860". If the ViewPoint file is an Interpress master, its extension is "IP".

When transferring a file from MS-DOS file system to the ViewPoint file system, the file name is passed verbatim, and the file type is set as exemplified in Table IV below. If the MS-DOS extension matches a table entry file type shown in Table IV, it gets that file type, otherwise the file type is set to a specific value that means "unspecified".

When transferring a file from the ViewPoint file system to the MS-DOS file system, a long file name must be compressed. The compression, for example, may be an eight-character name and a three-character extension as allowed in the PC filing systems. Examples of file type compressed name conversions are illustrated in Table IV. The procedure for compression is as follows. Take the leading characters until either (1) eight legal characters have been accumulated or (2) a period (.) is encountered for the MS-DOS file name; then take the MS-DOS extension as per Table IV.

TABLE IV

| NS Name | NS File Type | MS-DOS Name | Extension |
|---|---|---|---|
| HowToGoPupless.ip | Interpress | HowToGoP | ip |
| HowToGoPupless | Interpress | HowToGoP | ip |
| HowToGoPupless (interpress) | Interpress | HowToGoP | ip |
| Gray's.Template | Unspecified | Gary's | Tem |
| XWS | ASCII | XWS | txt |
| PRMODEL1.DIF | Unspecified | PROMODEL1 | DIF |
| PRMODEL1DIF | Unspecified | PROMODEL1 | DIF |
| PRMODEL1xDIF | Unspecified | PROMODEL1 | xDI |
| name.with.twoperiods | Unspecified | namewith | two |
| name.with.twoperiods | 860 Document | name | 860 |
| Has+]illegalchars.*X | 860 Document | HasIlleg | X |
| FS/ESCN Templete | ViewPoint Document | (illegal file type) | |

The system also recognizes one file type not found in Table IV, i.e. the special one meaning "unspecified". In this situation, the name and extension are formed as follows. Starting at the far end of the ViewPoint file name, a scan is made backwards until a period (/) is encountered. At this encounter, the three characters to the right of the period are taken as the file extension. For the MS-DOS file name, the leading characters of the file name are taken until either (1) eight legal characters have accumulated or (2) the same period (.) that delineated the extension is encountered. In the situation where a ViewPoint filename contains no period, the first eleven characters are taken, the first eight being taken as the filename and the last three as the extension. See Table IV and file name conversions for PRMODEL1DIF and PRMODEL1×DIF as an examples of this selection.

Table V below summarizes error conditions and handling. "PS" means "property sheet" and "OS" means "option sheet". The host system will report disk errors with the most accurate message possible based on the status returned from the operating system. Categories of errors are (1) the disk is physically unreadable, (2) the required implementation has not been loaded and (3) a specified file system implementation cannot recognize the format of a disk.

TABLE V

| | Operation | | |
|---|---|---|---|
| | PROP'S | OPEN | MOVE/COPY to closed icon |
| Specified file system implementation recognizes format of disk (i.e. no error) | PS appears with bottom section properly filled in. | Window opens & displays contents. | Selected ViewPoint object transferred if legal to do so. |
| Specified implementation not loaded | PS appears with bottom section blank, available choices plus the highlighted unavailable one are displayed; message "Specified file system application not loaded" in System Attention Window. | Message "Specified file system application not loaded" in System Attention Window. | Operation cancelled. message "Specified file system application not loaded" in System Attention Window. |
| Specified file system implementation cannot recognize format of disk | PS appears with bottom section blank; message "File system on disk doesn't match icon" in System Attention Window. User can change file system or disk and press [Re-Read]. User can also select [ALLOW FORMAT CHANGES], in which case bottom section of PS appears, filled in with default values. | OS appears; message "File system on disk doesn't match icon" in System Attention Window; user can change file system or disk and press [Start] or else [Cancel]. | Operation cancelled. message "File system on disk doesn't match icon" in System Attention Window. |

VII. Flowchart Exemplication of PC Emulator Configuration and Reconfiguration

Figure 19:
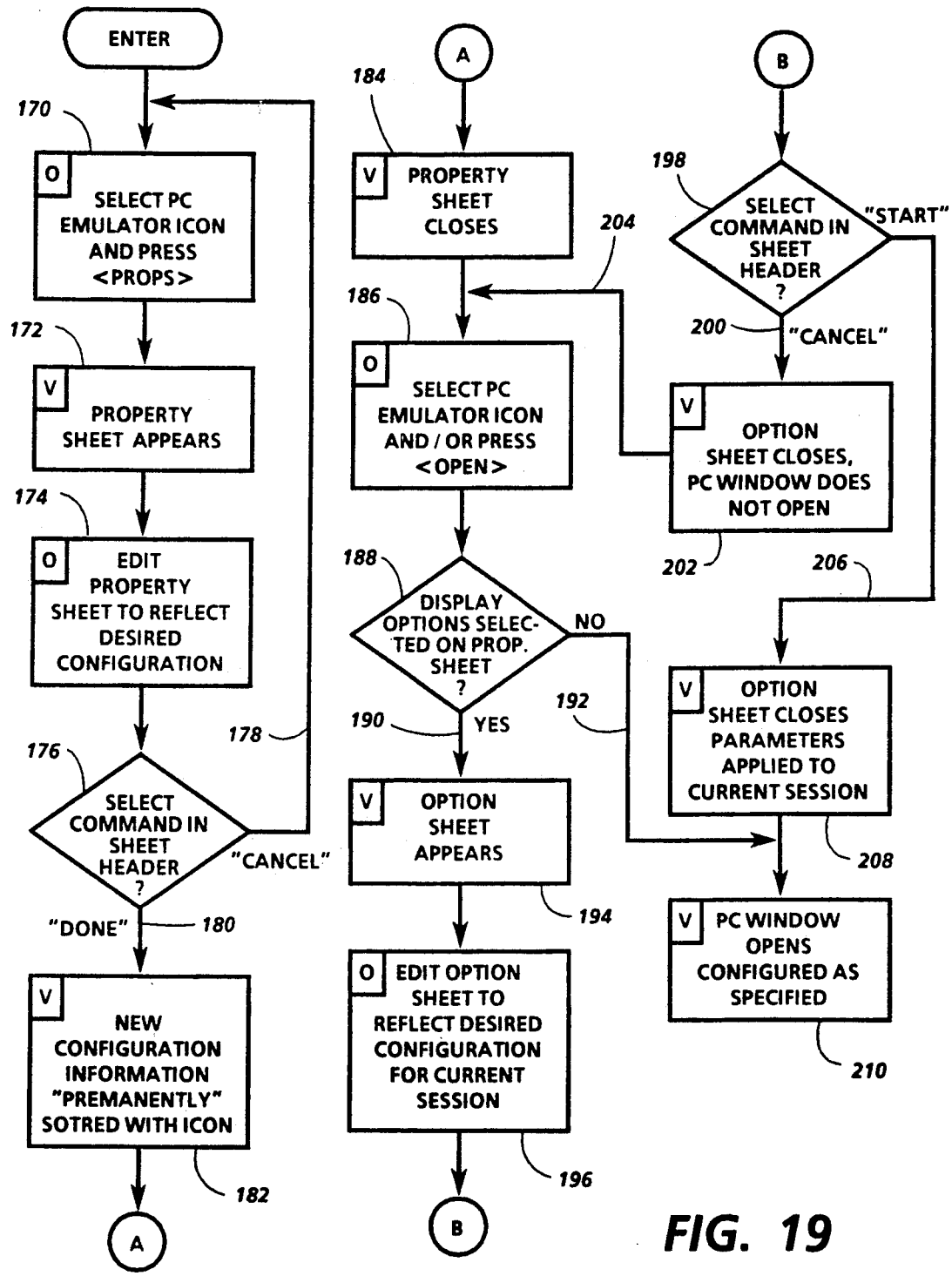
FIG. 19 is a flow chart illustrating configuration of the PC emulator via its property sheet (FIGS. 7, 8 and 9).
Figure 20:
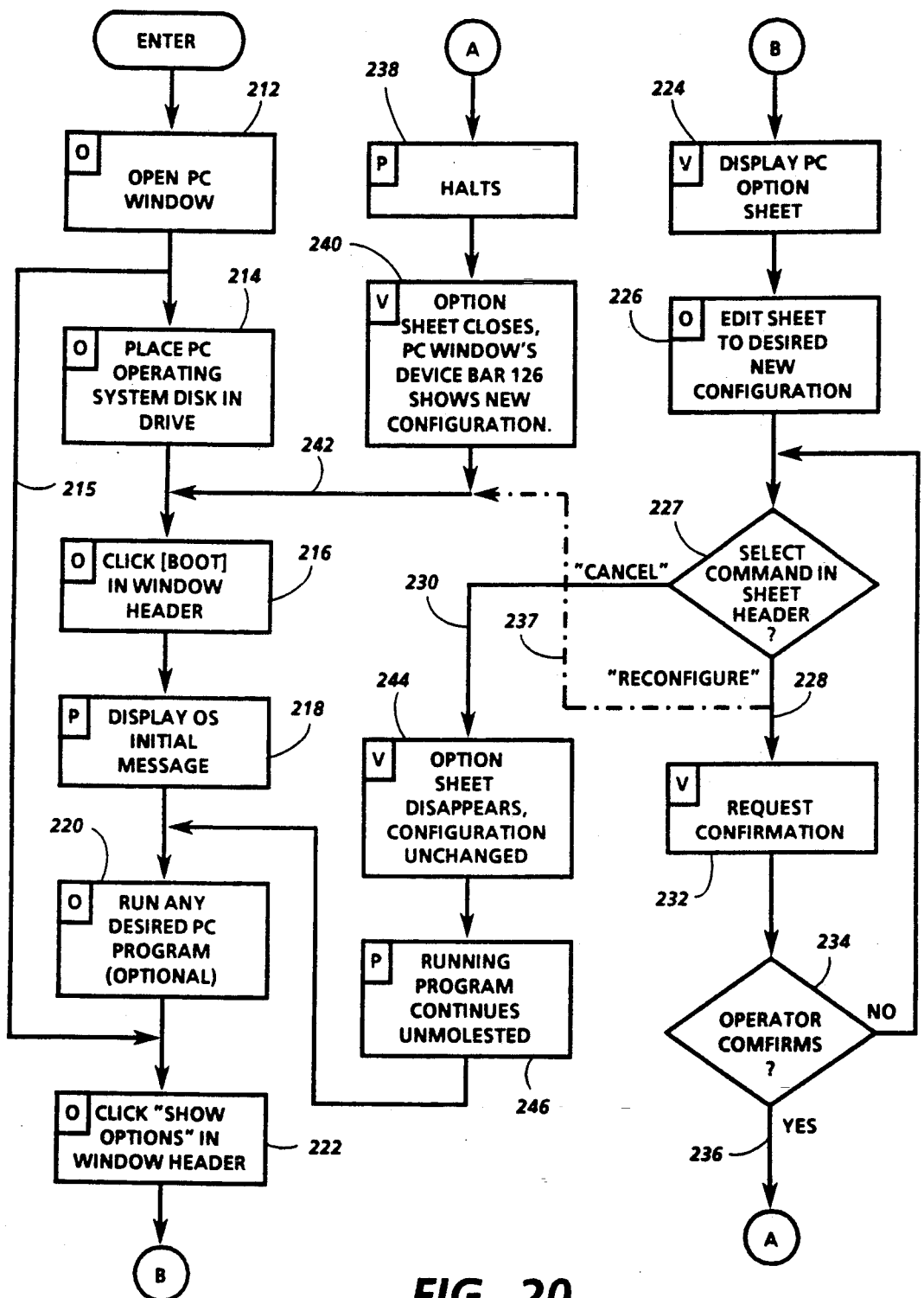
FIG. 20 is a flow chart illustrating reconfiguration of the PC emulator via its option sheet (FIG. 12).

Reference is now made to the flowchart in FIG. 19 for explanation of configuration of the PC emulator via property sheet 122 and the flowchart in FIG. 20 for explanation of reconfiguration of the PC emulator via option sheet 136. As previously indicated relative to these flowcharts, the "V" box notation denotes a host system (ViewPoint) action, the "P" box notation denotes a PC emulator action and the "O" box notation denotes an operator or user action.

To configure the PC emulator via property sheet 122, user 18, indicated at box 170, selects PC emulator icon 94 and invokes the <PROP'S> command.

Upon invoking of the <PROP'S> command, property sheet 122 will appear, as indicated by box 172. At this point, user 18 may edit property sheet 122 to reflect the desired device configuration, as indicated in box 174. After the selection of the desired configuration has been accomplished, user 18 can either select the "cancel" command in the header of property sheet 122 or the "Done" command. If cancel is invoked at 176, line 178 is followed: the property sheet 122 is closed and the PC emulator icon is left in its highlighted state as shown in FIG. 6 at 94'. If "Done" is invoked at 176, the new configuration selected by the user will be invoked as per line 180 to box 182. As indicated by box 182, the new configuration information is permanently stored for icon 94 and the parameters as set represent the default conditions for the configured PC emulator of this particular PC emulator icon.

At the same time that the new configuration is permanently stored, property sheet 122 closes as indicated by box 184. As indicated by box 186, the next function is a user action which calls for selection of PC emulator icon 94 and invoking the <OPEN> function. As indicated at decision 188, options-while-opening sheet 135 (FIG. 12A) is displayed if "Display Options" had been chosen in property sheet 122. If this choice had not been elected in property sheet 122, a decision path via line 192 is to box 210 with the ViewPoint application for the PC emulation window 124 being opened as previously configured. However, if this display option for sheet 135 has been invoked, the decision path via line 190 is taken, and the option sheet 135 will be displayed as indicated in box 194. At this point, user 18 may edit option sheet 135 to reflect a desired change in configuration as indicated in box 196. After accomplishing any desired changes in the previously set configuration, the user must select either the "Cancel" command or the "Start" command in the header of option sheet 136. If in making decision 198, the user invokes the "Cancel" command per line 200, option sheet 135 will close per box 202 and the PC emulation window 124 will not open. The return path is via line 204 which is back to the point of box 186 permitting the user again to select the PC emulator icon 94 and invoke the <OPEN> function if so desired. On the other hand, if user 18 has invoked the "Start" command, the path of operation is via line 26 to box 208 wherein the changes in parameters made via option sheet 136 are applied directly to the current session and the PC emulation window 124 will open configured as specified via option sheet 136. It is of interest to note at this point that when the current session of the PC emulator is terminated via the "Close" command, the changes made to any parameters via option sheet 136 will be discarded and the default set of parameters originally configured at box 182 and permanently stored with the configured icon 94 will be restored. Upon invoking the <OPEN> function again via box 186, the PC emulator will be configured as indicated at box 182.

The flowchart in FIG. 20 represents the choices for reconfiguration when PC emulation window 124 has opened. In this connection, box 212, in essence, represents all the actions carried out via the entire flowchart shown in FIG. 19 up to and including box 210 wherein the PC emulator window opens configured as specified via either property sheet 122 or option sheet 136. In order for PC emulation to take place, it is necessary to boot the system. This booting can take place via a PC utility file for booting present as a virtual floppy in an emulated floppy disk drive or via the emulated fixed disk, or from a physical floppy disk in drive 25.

Box 214 in FIG. 20 illustrates booting of the system via a PC operating system present on a physical disk placed in the physical floppy disk drive 25 which has been bound to the PC emulator configuration. At this point the user next clicks mouse point button 31 to select the "Boot" command in header bar 130 of the PC emulation window 124. At this point, the PC emulator will display the initial message on screen 125 indicating to the user the booting of the system as well as revealing a proprietary notice for that particular operating system. This is indicated by box 218 in FIG. 20.

It should be noted that if the "After opening Window [Boot PC]" option has been selected, the box 214 action would actually precede the box 212 action in FIG. 20. Booting from a virtual floppy in this case is not possible because the virtual floppy disk can be moved into an emulated drive only after PC emulation window 124 has been opened.

At this point in operation, user 18 may run any desired PC program on the booted system, although this is not necessary or may be considered optional as indicated at box 220. User 18 also at this time may click in header bar 130 the "Show Options" command as indicated by box 222. The invoking of this command will display the PC option sheet 136 as indicated at box 224. As previously explained in connection with FIG. 19, and as indicated in connection with box 226, user 18 may edit option sheet 136 to make changes to the PC emulator configuration. In other words, the function of the user at box 226 is the same as the function of the user at box 196 in FIG. 19, the difference being that at box 226, the PC emulator has already been booted and at box 196 the PC emulator has not been booted. The same is true in connection with decision 227 which is essentially the same as decision 198 in FIG. 19 except this time the choices are "Cancel" or "Reconfigure" instead of "Cancel" and "Start". this reminds user 18 that the PC emulator has already been configured and started. After changes have been made to the PC emulator configuration, user 18 is left to select, via the command header in option sheet 136, either the "Cancel" command or the "Reconfigure" command. If the user selects the "Reconfigure" command via line 228, the system will request a confirmation from the user in message subwindow 128, as indicated in box 232. If user 18 at this point confirms at decision 234 the changes to the configuration, operation of the PC emulator is halted via line 236, as indicated by box 238, in order that the configuration changes can be made via host system 14. After the configuration changes have been accomplished as per changes in option sheet 136, the sheet will close and the PC emulation window device bar 126 will show the new configuration. At this point, the flowpath via line 242 is such that the user may continue a session by again invoking the "Boot" command in the command header 130 of window 124 and run a desired PC program as previously indicated in connection with box 220.

It should be noted that prior to booting, user 18 may select "Show Options" via line 215, reconfigure the PC emulator via line 228, which then would not require a confirmation, since the PC emulator has not been booted and the Halts action at box 238 is inappropriate. This is shown by dotted bypass line 237 which returns user 18 to a state for booting the PC emulator at box 216.

Reverting again back to the operation confirmation via decision 234, if user 18 has confirmed a "No" decision at this point, user 18 has the option of either "Cancel" command or the "Reconfigure" command. As indicated via the "Cancel" command at line 230 in FIG. 20, option sheet 136 will disappear and the previously set configuration as per box 212 will remain unchanged, as indicated by box 244. As a result, any program that had been running as optionally selected by user 18 via box 220 will continue to run unmolested as indicated at box 246 and user 18 can continue the current selection and make use of a running PC program as previously indicated at box 220.

IX. Data Transfer Between PC World and ViewPoint World

Reference is now made to the several techniques in which information may be transferred between the PC emulation window 124 and a text application, such as of a ViewPoint document. While it is possible to transfer text from a BWS window to another BWS window on desktop 54, the transfer of text relative to PC emulation window 124 represents something different in that the text transferred is being handed from the control of one system over to the control of another system via a user interface shared by both systems.

Figure 21A:
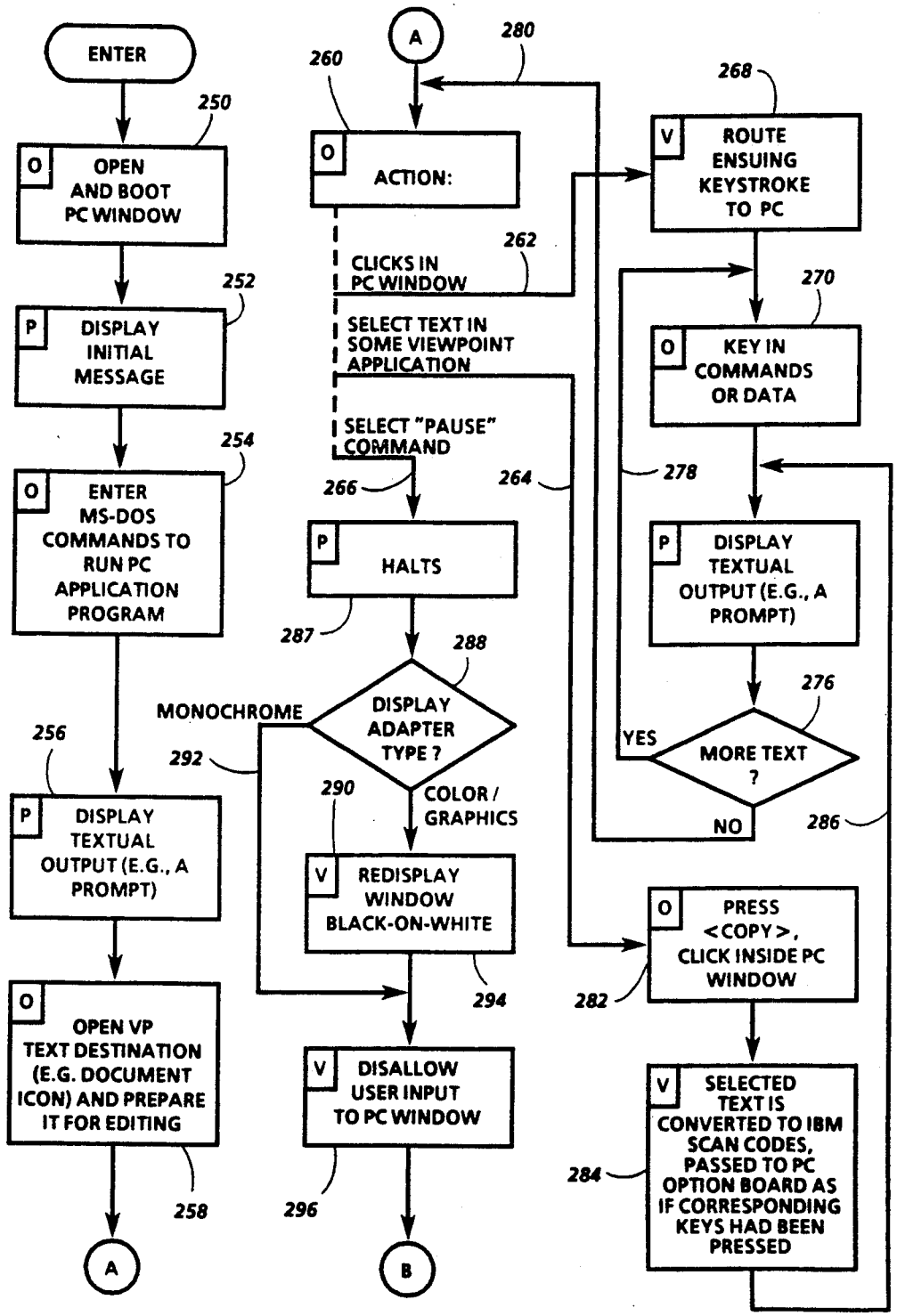
FIGS. 21A and 21B are flow charts illustrating transfer of data between the PC emulator window and a BWS window.
Figure 21B:
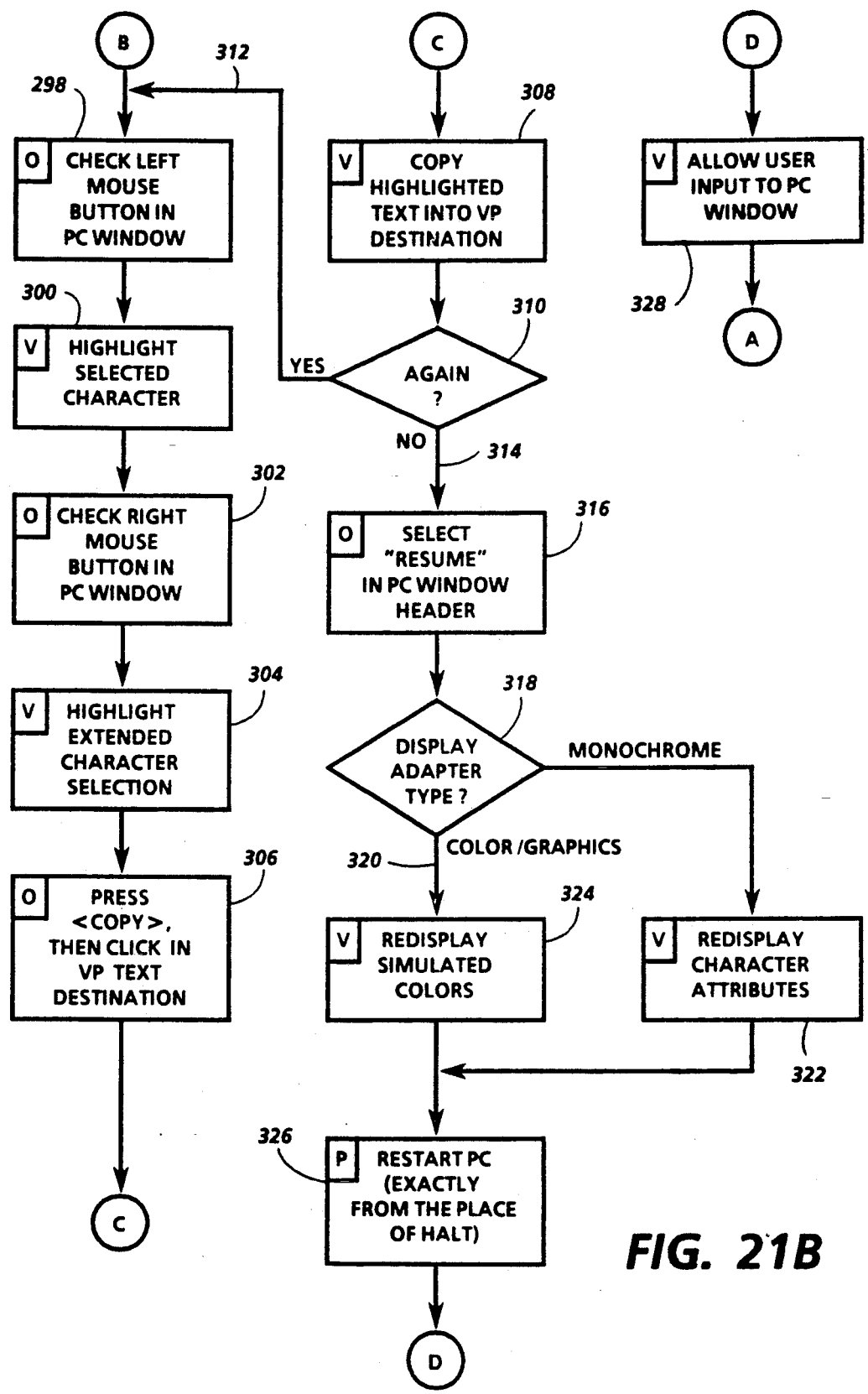

FIGS. 21A and 21B relate to a first data transfer technique for the transfer of data between PC emulation window 124 and ViewPoint applications on desktop 54. Input of data, such as text, to PC applications is limited to whatever can be "typed" either directly by user 18 or by copying strings of text and converting the text strings into simulated PC keystrokes. The characteristics of the particular characters transferred from one system to another, such as the character font, size, etc., are ignored during such a copy or move transfer. The user selects the text to be copied from a BWS window, invokes the <COPY> function, moves the copy cursor to a point anywhere in the PC emulation window 124 and then clicks the mouse point button 31. Text characters will be copied into the emulation window 124 from the BWS window in a manner as if the user had actually input the same text string via the corresponding keys on keyboard 29. The particular location clicked within the PC emulation window 124 to transfer text to this window is immaterial since the PC program that is in operation during such a transfer will have control over the contents of the PC display screen. The character conversion will be as per Table I previously set forth. Characters not valid on the IBM PC will be translated to the sequence AltDown 177 AltUp, which the PC interprets as ASCII B1$_{16}$, which is a half-grey rectangle meaning that the character is not interpretable. The <MOVE> command is handled in the same manner as a <COPY> command except that the source selection will be deleted from the BWS window.

Referring now to FIG. 21A, the operations relative to boxes 252-254 are synonymous with the operations relative to the sequence of boxes 212 through 220 in FIG. 20. As indicated by box 250, the PC emulator window 124 has been opened and the system booted so that the display now reveals the initial display message and proprietary notice, as indicated in box 252. In this connection, see FIG. 22A wherein PC display screen 125 shows an example of such initial messages. At this point, user 18 may have entered the appropriate MS-DOS commands to run the chosen PC application program per box 254, although this is not necessary for the transfer of data to screen 125. Transferring text to a ViewPoint text location is illustrated beginning at box 258, where user 18 has opened a data icon, such as document icon 64B, and prepared it for editing by invoking the command "Edit". At this point, as illustrated at box 260 in FIG. 21A, user 18 may enter keystrokes to the running PC program in PC emulator screen 125, or select text in a ViewPoint window and transfer it via <MOVE> or <COPY> to the PC emulator screen 125, or use the "Pause" command to halt the PC program and select text from PC emulator screen 125 for transfer via <COPY> to a ViewPoint text destination, such as window 104 in FIG. 22A.

In order to invoke the function of typing to the PC display screen 125, user 18 clicks the mouse point button 31 in the area of PC emulator window 124. This action is indicated at line 262 in FIG. 21A. The ensuing keystrokes from keyboard 29 entered by user 18 will be routed to the PC emulator processor 12, as indicated at box 268, with keystrokes interpreted as per Table I. Appropriate keying in of commands and data can be continued by the operator as per box 270. As a result, the text entered by user 18 will, typically, be displayed in the screen area 125 of the PC emulation window 124. The entering of text will continue as noted in connection with decision 276 via affirmation on line 278, since the input focus for text has been initiated previously by the action of user 18 in initially clicking the mouse point button 31 within the PC emulation window 124. If at this point (decision 276), there is no more text intended for the PC emulator screen 125, as indicated at line 280, user 18 may take an alternative course of action of either (1) selecting with mouse point button 31 some other point on desktop 54 or (2) selecting the "Pause" command in command bar 130 of PC emulation window 124, freezing further operation of the PC emulator and turning the input focus of PC display screen 125 over to the control of host system 14. These two alternatives just expressed are, respectively, user actions via lines 264 and 266.

Figure 22A:
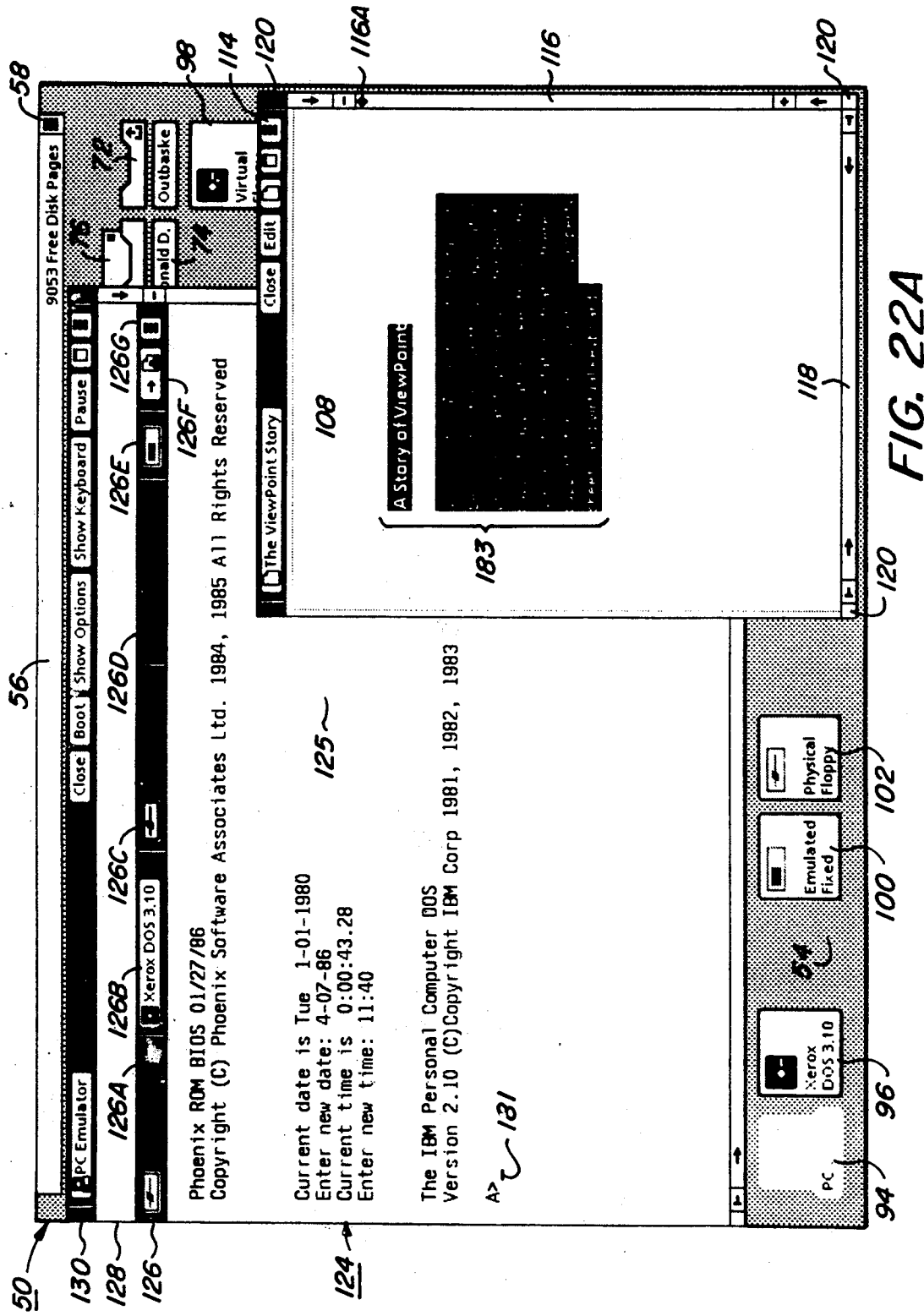
FIGS. 22A and 22B are views of the user interface display for the purposes of illustrating a transfer of text or data to the PC emulation window from a BWS window.
Figure 22B:
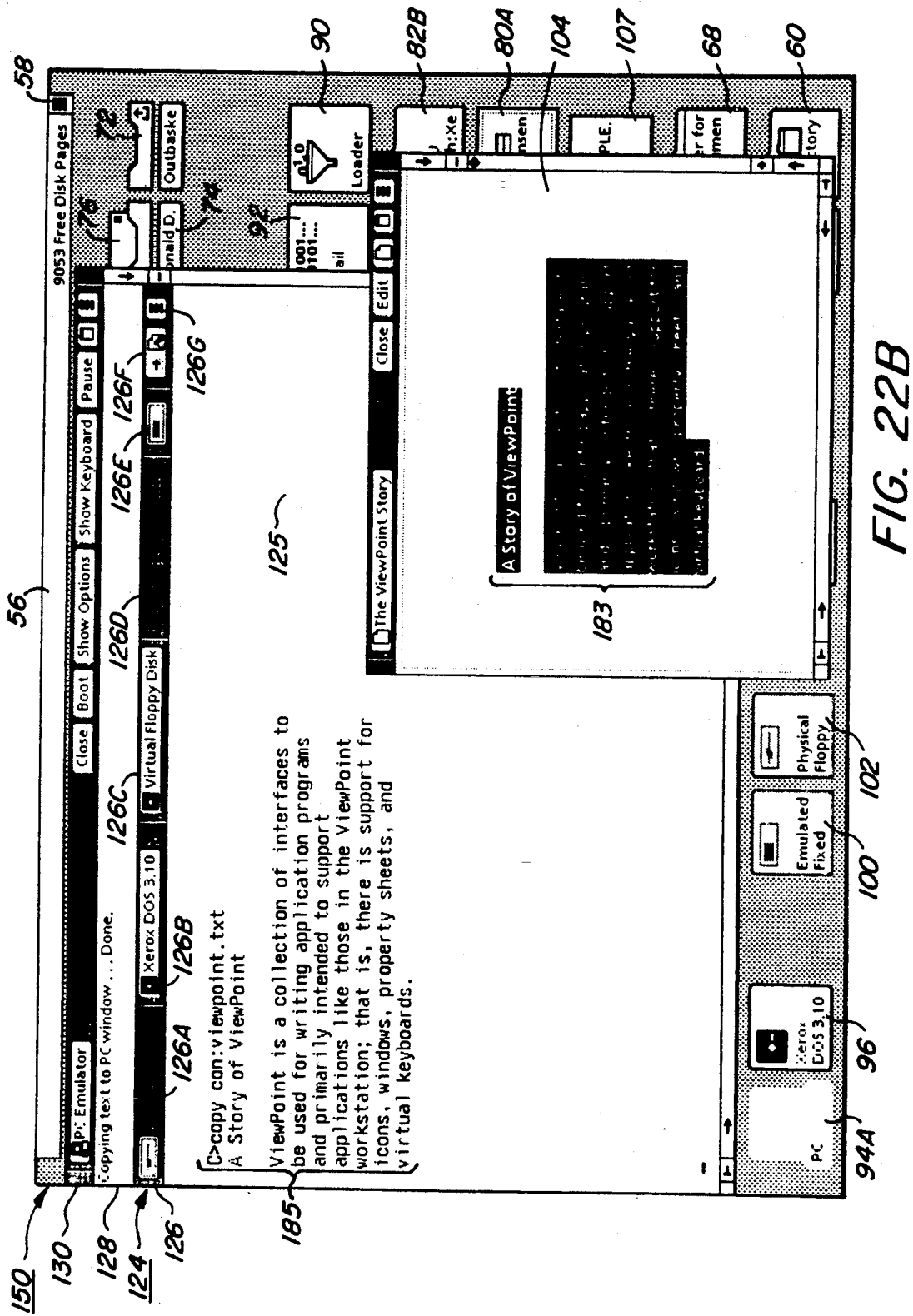

For the transfer of text from a ViewPoint application to PC screen 125, user 18 selects with mouse point button 31 some other ViewPoint application and a text string at that selected application per line 264 for the purposes of copying this text from the application into screen 125. This selection of text to be copied to screen 125 is indicated at 183 in FIG. 22A, shown highlighted with the use of mouse buttons 31 and 33 in a manner as previously explained. The next function performed by user 18 is to invoke the <COPY> function on the text selected in a ViewPoint application, such as an open ViewPoint document. After selecting the text and invoking the copy function, user 18 then moves the mouse cursor 52 within the boundary of screen 125 and clicks mouse point button 31, as indicated at box 282. See PC cursor at 181. This action will cause the transfer of the selected text from the ViewPoint application into the screen area 125. As indicated by box 284, the selected test from window 104 is converted to IBM scan codes as per Table I, as previously described, and these keystroke conversions are passed to PC option board 30 via its keyboard input. The actual manner in which this conversion to IBM scan codes and operation via PC board 30 and the handling of the display of these characters as per line 286 for textual output display in the PC emulation window screen area 125 are accomplished via ViewPoint application software. During the transfer operation, message subwindow 128 indicates to user 18 that the transfer is taking place with the message, "Copying text to PC window". The transfer of selected text at 183 in window 104 to screen 125 is completed as shown in FIG. 22B at 185 and its completion is acknowledged to user 18 via message subwindow 128 and the message "Done".

For the transfer of text from the PC emulation window screen area 125 to a ViewPoint application, the path via line 266 is followed in FIG. 21A. In this connection, reference is made to FIG. 23A wherein there is shown PC emulation window 124 having text in display screen 125 relating to "A Story of ViewPoint". Also, present on desktop 54 is an opened and empty document window 187 with a title, "A story of ViewPoint".

Figure 23A:
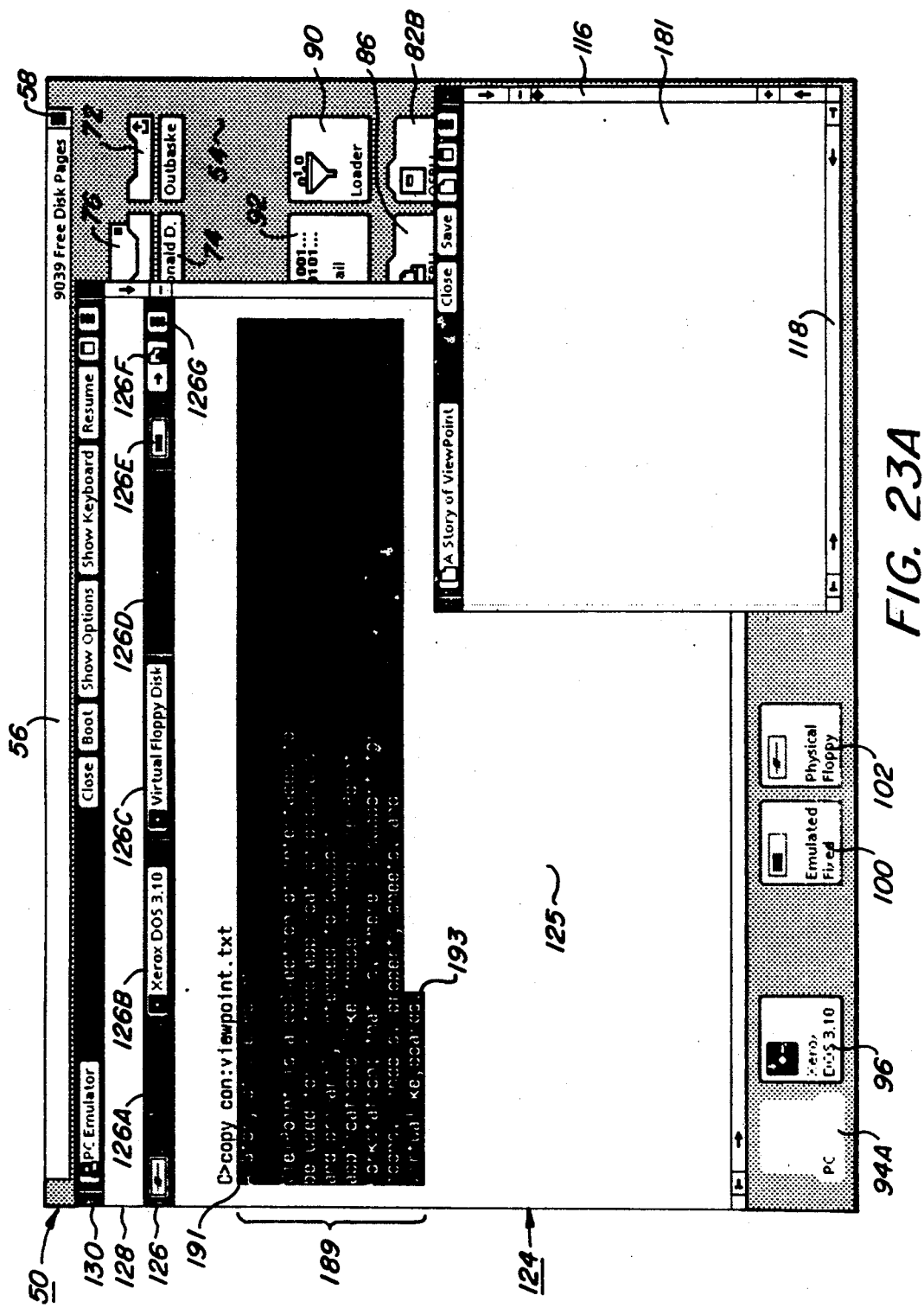
FIGS. 23A and 23B are views of the user interface display for the purposes of illustrating a transfer of text or data to a BWS window from the PC emulation window.
Figure 23B:
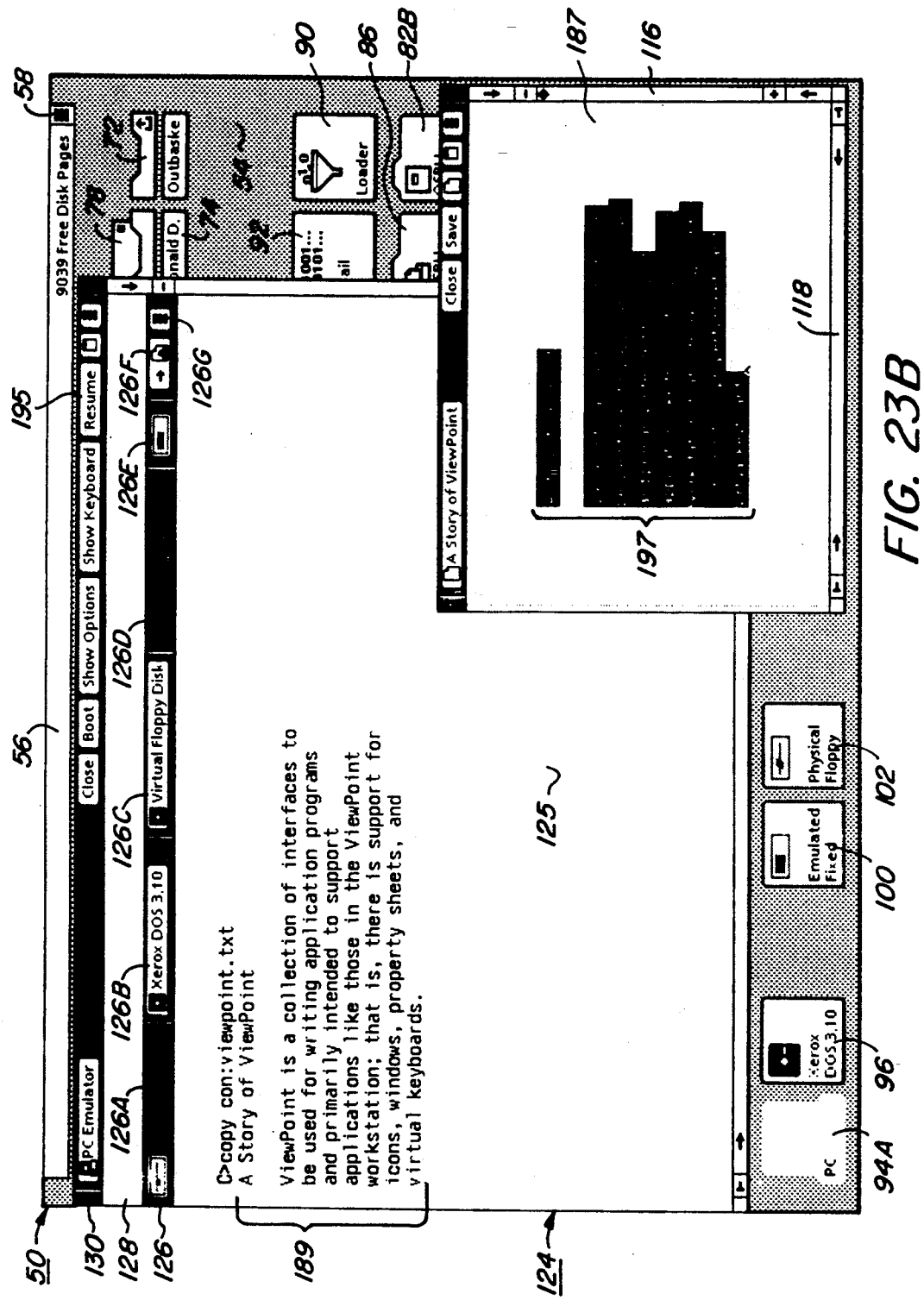

The appropriate user action, indicated at box 260, is the selection of the "Pause" command bar 130 or PC emulation window 124. This action institutes a routine called "Halt" discontinuing the operation of emulating processor 12 as indicated at box 287. At this point, the functional operation of PC emulating processor 12 is halted and its state of operation is frozen. Also, as shown in FIG. 23A, the "Pause" command changes to the "Resume" command in command bar 130. If the display adapter type at decision 288 is Color/graphics via line 290, then the PC window will invert its video to redisplay the window content as black-on-white (box 294), instead of normal simulation of colors via grey shades. If the display adapter type at decision 288 is Monochrome via line 292, then any special cases of displayed text in screen 125 not presently normal black-on-white, such as inverted (e.g. selected) characters, underlined characters, blinking characters or bold text, will be displayed as normal black-on-white. The purpose of this invert function is to permit the selection of data within screen 125; otherwise the black background used in the Color/graphics mode or in Monochrome mode with reverse video (highlighted) text may obscure the position of screen cursor 52. Also, host system 14 will disallow user 18 from any further input via keyboard 29 or mouse 27 to PC emulation window 124, as indicated at box 296.

With the operation of the PC emulating processor 12 frozen, user 18 then clicks the mouse point button 31 in PC emulation window screen 125 to select the text that is to be transferred to a ViewPoint application as indicated at box 298 in FIG. 21B. This selection and the boundaries of the text selected are indicated to the user by reverse video or highlighting of the beginning character of text to be selected. This is indicated at box 300. In FIG. 23A, this may, for example, be the character "A" at 191. The selection of text is accomplished by the clicking of the right or adjust button 33 of mouse 27 in a manner previously explained in PC window screen 125. In FIG. 23A, continuing with the same example, this would be selection with mouse right adjust button 33 at position 193. This user action is indicated at box 302. This user action results in the highlight extension of the original point 191 of selection made relative to box 300 to the last character selected at 193 in the extension as indicated in box 304 and shown highlighted at 189 in FIG. 23A. At this point, user 18 may invoke the <COPY> function and thereafter click mouse point button 31 in the previously prepared ViewPoint destination, i.e., in window 187, these functions being indicated at box 306. Host system 14 will then initiate the transfer of the highlighted text 189 in screen 125 into the ViewPoint destination at window 187, as indicated at box 308. It should be noted that only the <COPY> function, and not the <MOVE> function, can be invoked for transferring text from PC window screen 125. This is because under normal PC operation, there may result confusion relative to a previously running PC program as to the present status of displayed information, which would not be present if moved during the "Pause" state, upon return to the "Running" state.

If user 18 has not copied all display text in screen 125 or wishes to make more copies of the same text, a decision at 310 can be invoked to repeat the functional operations outlined in boxes 298 through 308 to move additional text to the designated ViewPoint text destination. However, if further text is not to be copied to the designated ViewPoint destination, user 18 may then invoke the "Resume" command at 195 in command bar 130 of PC emulation window 124 to return the P/C emulator to normal operations activity, i.e. "Running" state 152 (FIG. 15), as indicated at box 316. Depending upon the display adapter chosen at decision 318, whether it be Color/graphics via line 320 or Monochrome via line 322, the operation of PC emulating processor 112 will restart in "Running" state 152 state executing code from the point where previous operation had been halted, as indicated at box 326. If the PC emulator had been in the Monochrome mode, any monochrome text characters that have had special attributes, such as inverted or underlined or blinking or bold characters or text, will be redisplayed as indicated at box 322. If the PC emulator had been in the Color/graphics mode, the text and/or graphics will be redisplayed in simulated colors previously incorporated as indicated at box 324.

With operation of the PC emulator returned to "Running" state 152, user 18 is again allowed to input into PC window 124 via any of the three possible user actions previously discussed in connection with box 260 in FIG. 21A.

Figure 25:
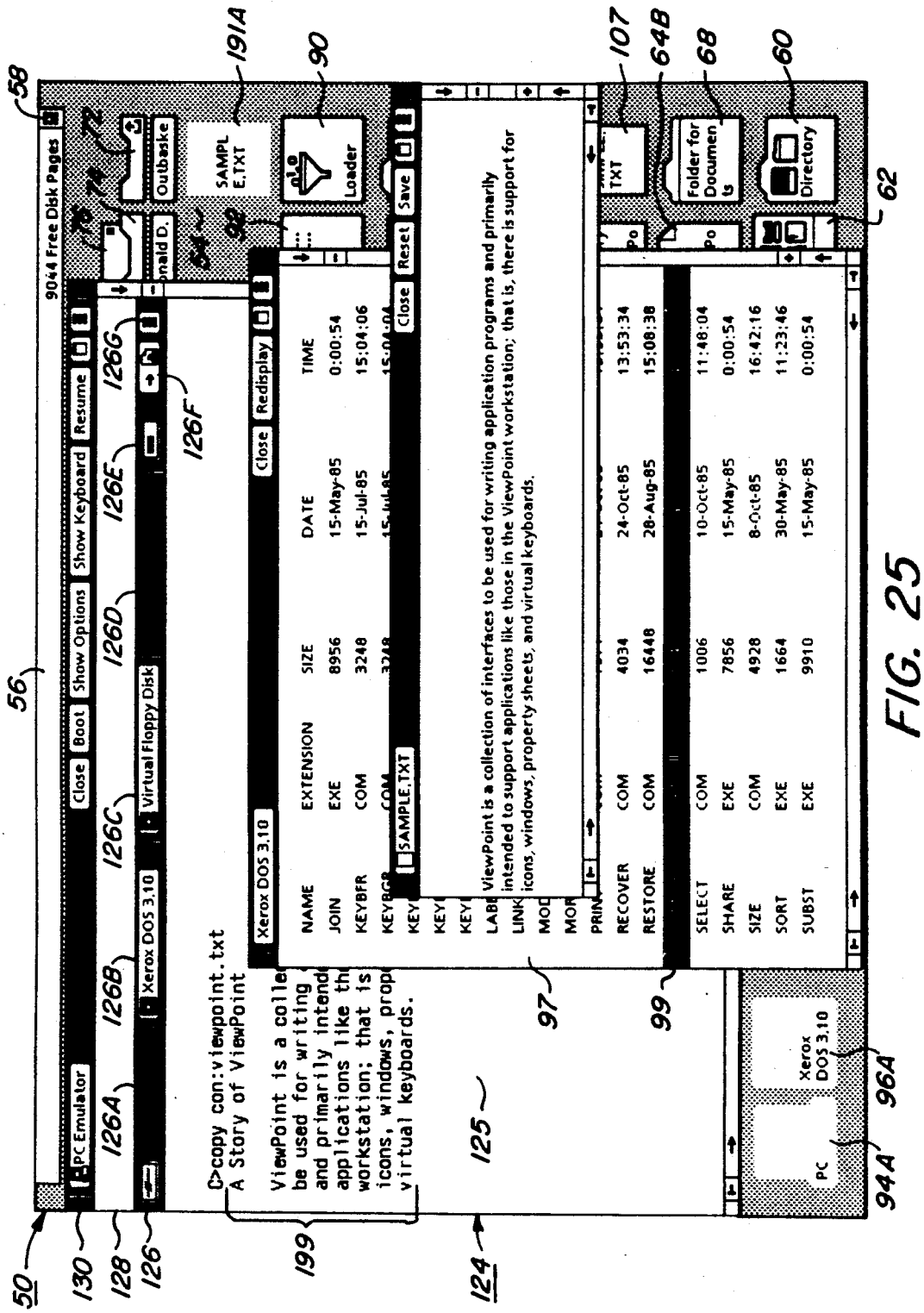
FIG. 25 is a view illustrating access to the content of a virtual floppy disk via the BWS desktop.

Reference is now made to FIG. 25 which relates to a second transfer technique for the transfer of a block of data corresponding to a virtual floppy disk by transferring control of the virtual floppy disk icon to either emulating processor 12 or hose system 14. In FIG. 25, virtual floppy icon 96 entitled, "Xerox DOS 3.10" is shown selected as a ViewPoint object at 96A and opened via the <OPEN> function to show the list of contained files contained in this container in window 97. Any one of the files listed may be selected and copied onto desktop 54 and opened (if appropriate) via the <OPEN> function to reveal the data content of the file. The illustration of this access is shown in FIG. 25 by the selection of the file, "Sample.txt" at 99 in virtual floppy window 97, invoking the <COPY> function to create the data icon 191 on desktop 54 and subsequently invoking the <OPEN> function on this icon as indicated at 191A to reveal its content in window 192. The virtual floppy disk icon 96 has also been copied and, as copied, moved into emulating device at location 126B. This provides access via the PC emulator wherein the device B at location 126B may be accessed and the file "Sample.txt" typed on command and displayed via emulating processor 12 in PC display screen 125 as shown at 199. Thus, there is access of the same data from a single data container which selectively may be displayed either via the PC emulator or via a ViewPoint application or both.

Figure 26A:
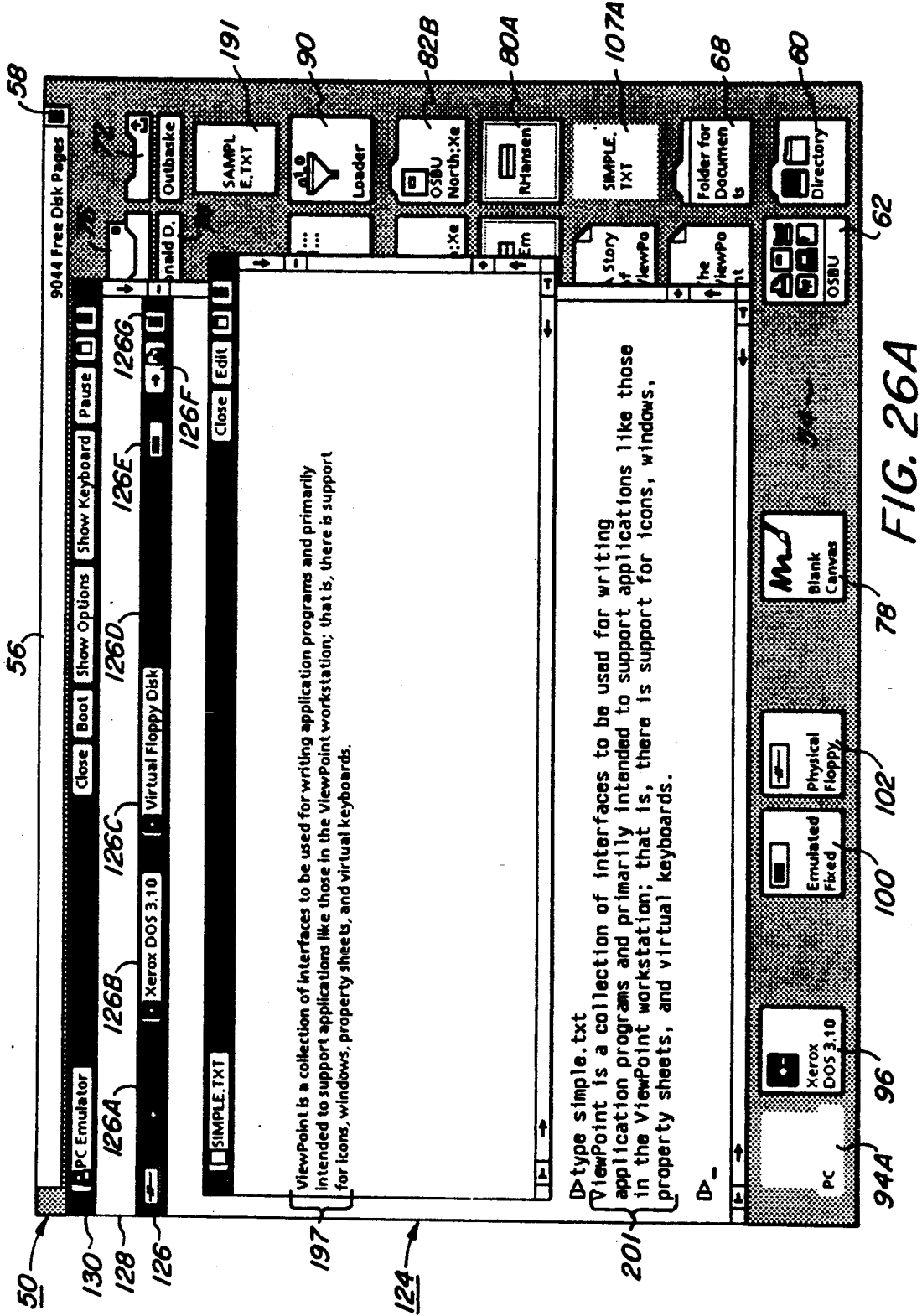

Reference is now made to FIGS. 26 and 26A which relate to a third data transfer technique for the transfer of a block of data, via a real floppy disk loaded in physical floppy drive 25 and accessed by either host system 14 or emulating processor 12, and for the transfer of a block of data, via the emulated fixed disk which may be opened on desktop 54 as a ViewPoint application or may be configured into the PC emulator at location 126E and the data displayed on PC display screen 125. Reference has already been made to the former transfer situation in connection with FIGS. 18B and 18C. As to the latter transfer situation, reference is made to FIG. 26 wherein emulated fixed disk icon 100 has not been configured into the PC emulator. This is readily apparent since there is no emulated fixed disk symbol appearing at location 126E of PC emulation window 124. Since icon 100 is not bound to the PC configuration, the <OPEN> function may be invoked on icon 100, as indicated at 101A in FIG. 26, revealing its file content in BWS window 101. Two files are shown present in this icon container and the file "Simple.txt" is shown selected (highlighted) at 103. This file has been copied to desktop 54 at 107 (FIG. 25) via the <COPY> function and thereafter opened via the <OPEN> function, as indicated at 107A, displaying its content in window 197.

In FIG. 26A, emulated fixed disk icon 100 has now been bound to the PC emulator configuration as can be seen by the emulated fixed disk symbol at location 126E. With emulated fixed disk icon 100 bound to the PC configuration, its contents are not now accessible directly from desktop 54. Instead, its contents are accessible to PC programs running under the control of emulating processor 12. This location is device D (location 126E) for the particular configuration shown since positions A, B, and C in device bar 126 comprise the physical floppy drive (location 126A) and two emulated floppy drives (locations 126B and 126C). As shown in FIG. 26A, device D has been invoked and the command to type file "Simple.txt" has been invoked resulting in the display on screen 125 via emulating processor 12 of the text of this file at 201.

Figure 27:
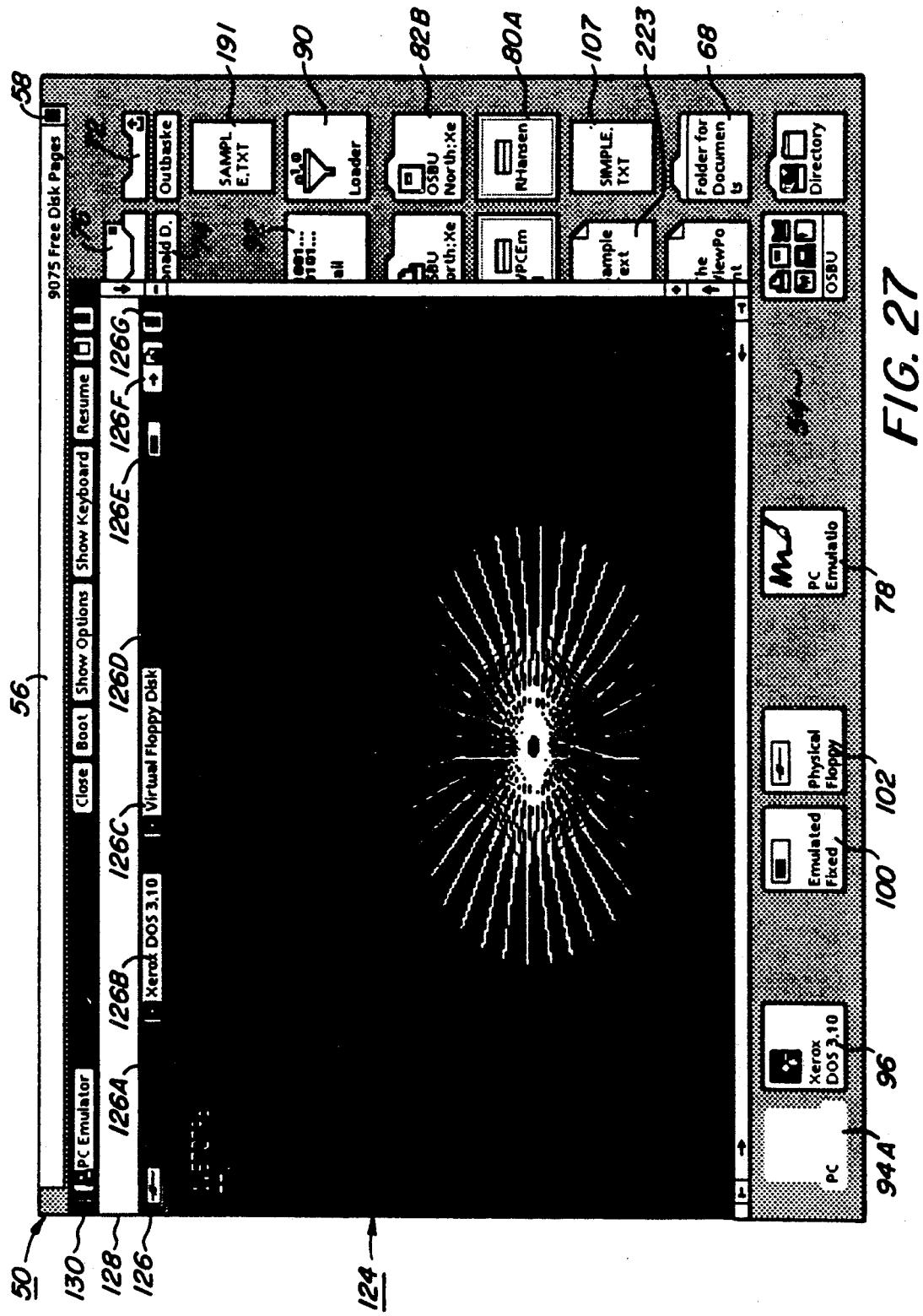
FIGS. 27-27D are views illustrating transfer of data, either graphics or text, from the PC emulator window to a BWS window.
Figure 27A:
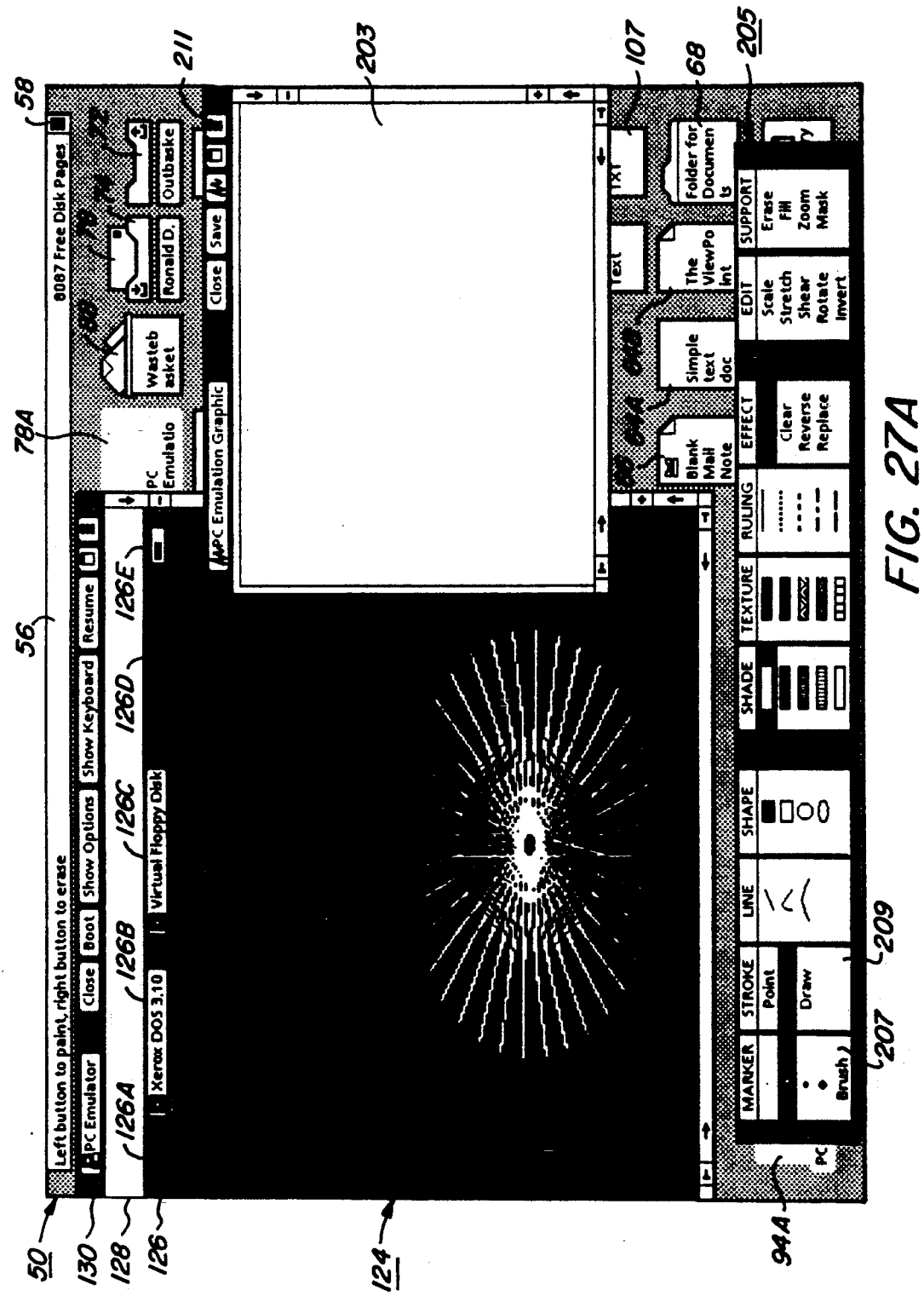
Figure 27B:
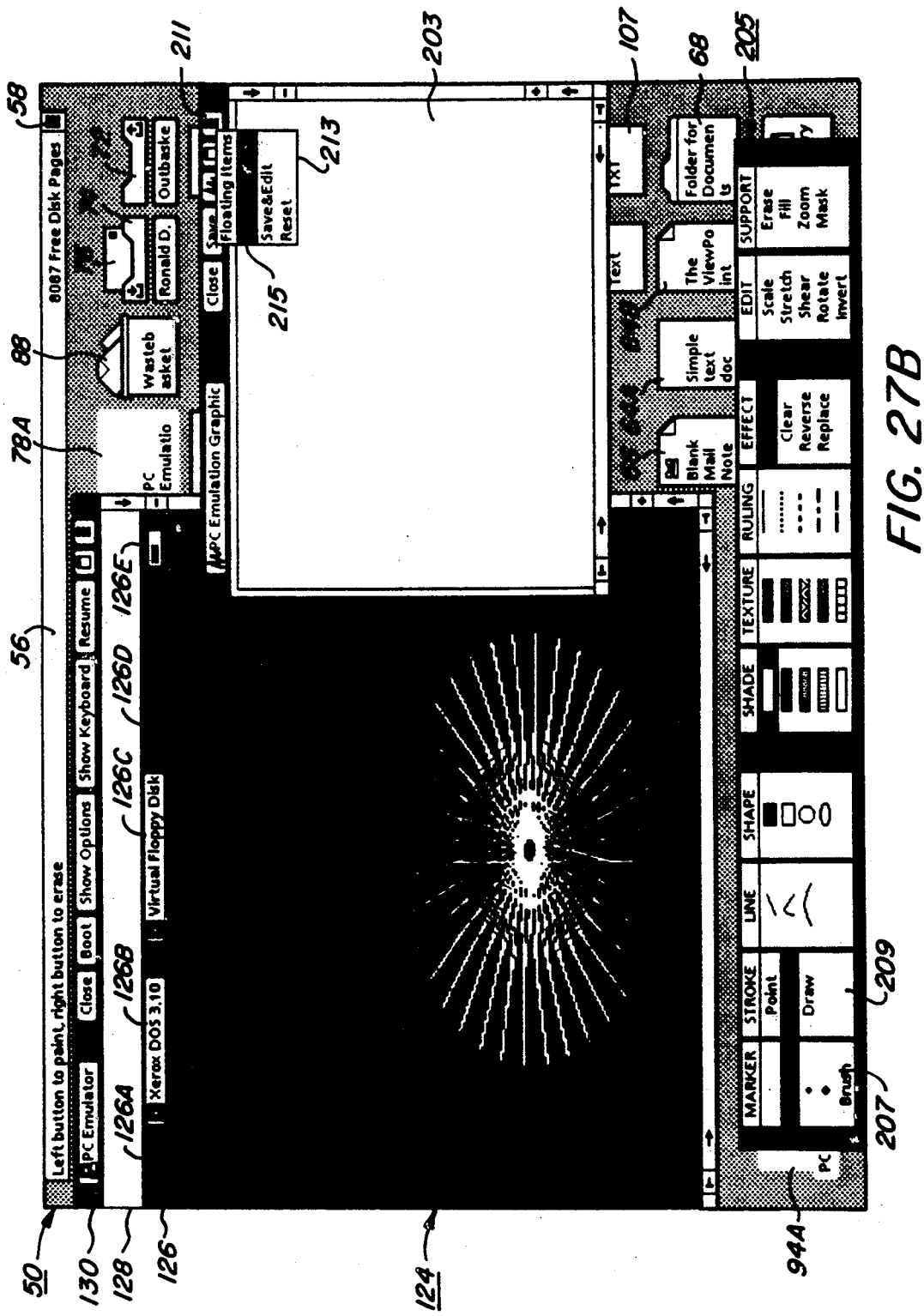
Figure 27C:
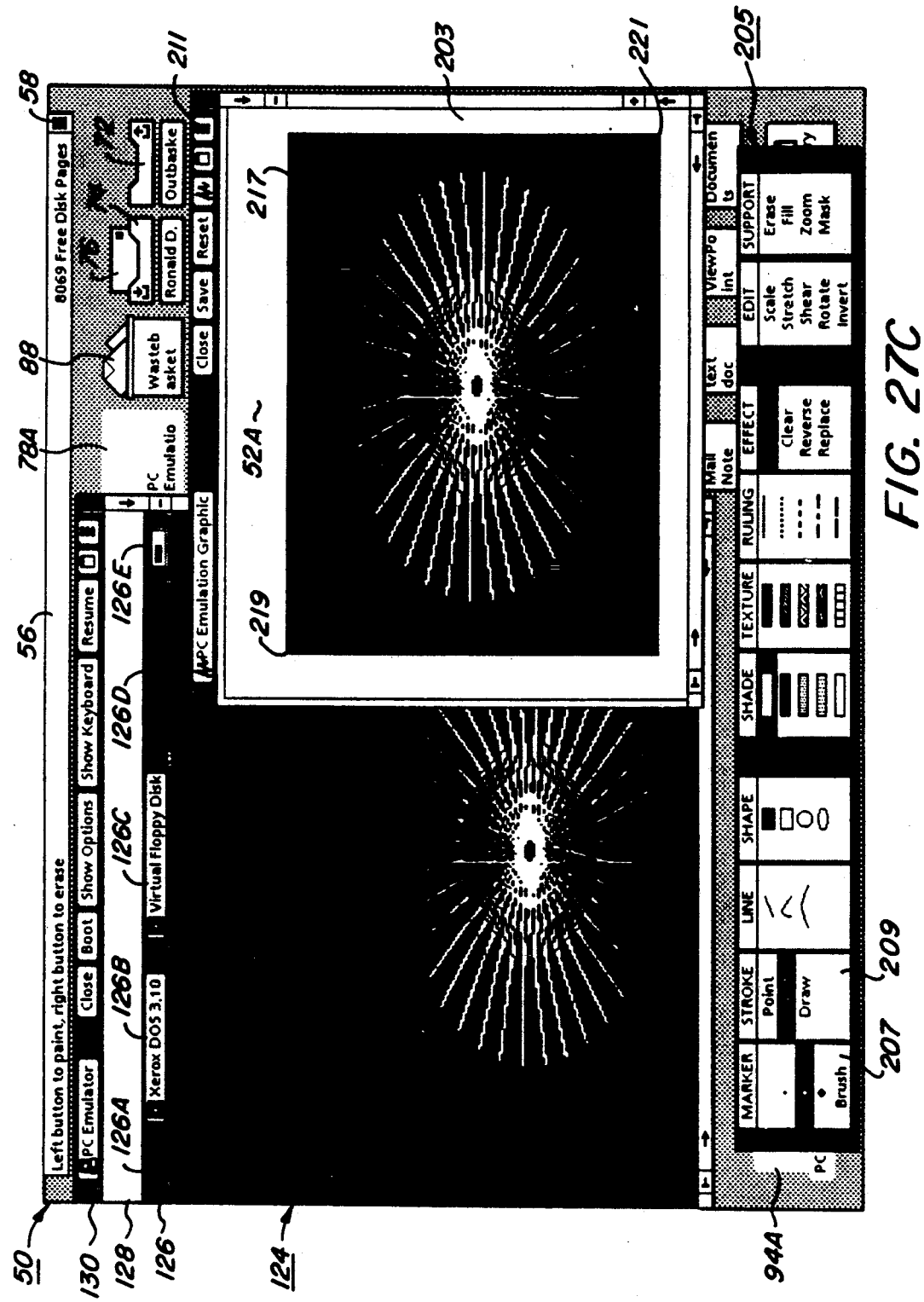
Figure 27D:
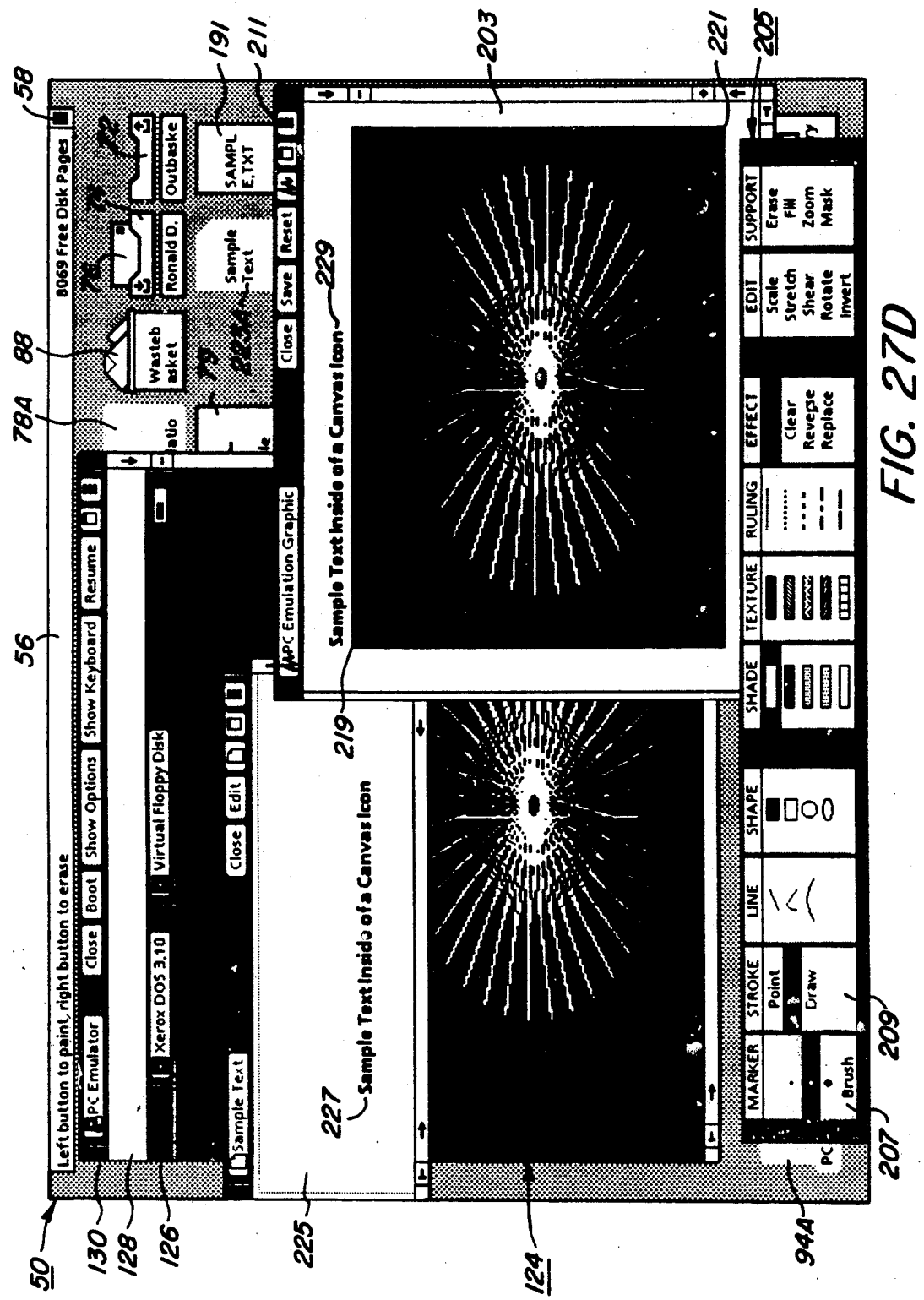

Reference is now made to FIGS. 27–27D which relate to a fourth data transfer technique for the transfer of data in the form of an actual bitmap of a selected part of the PC emulation window to a ViewPoint destination, e.g. a BWS window using a ViewPoint application called "Freehand Drawing" available with the 6085 workstation. Freehand Drawing provides a canvas for drawing lines and shapes freehand in a variety of line thicknesses, rulings, shadings and textures via canvas icon 78 and a virtual keyboard available with this icon by invoking the <KEYBOARD> function from keyboard 29. Using mouse 27, user 18 can draw straight, curved and free form lines. Any area of the canvas containing data, whether graphics or text, can be selected as a "brush" for drawing. The selected brush can also be modified by using various editing functions. Any area of display 50, including PC display screen 125 or any part of PC emulation window 124, can be copied into canvas window 203 of canvas icon 78.

The transfer of data by this method of copying is handled at the level of display bitmap memory. Selection of all or any portion of the display present on screen 50 is captured as a bitmap representation directly from the display bitmap memory and copied, as selected, into main memory and held for re-entry into bitmap memory and display upon user invoked commands.

In FIG. 27, a graphics program has been loaded for running in the PC emulator via the physical floppy drive 25 bound to the PC configuration at location 126A. Display screen 125 illustrates a single view from this graphics program which comprises a spoke wheel representation. The PC emulator is operating in the Color/graphics mode so that the spoke wheel is shown white on a dark background. As noted in FIG. 27, the PC emulator has been placed in "Pause" state 153, the "Resume" command appearing in command bar 130 of this Figure.

In FIG. 27A, he <OPEN> function has been invoked on icon 78 with the title "PC Emulation Graphics", as indicated at 78A, revealing canvas window 203. Icon 78 has been moved to another location on desktop 54 to be visible for purposes of illustration in FIG. 27A. Also shown in this Figure is the softkey keyboard or menu 205, detailed explanation of which is not necessary since the use of this menu is not necessary for the transfer of data under this technique. It is of interest to note, however, that the menu "Marker" column 207 provides selections for the shape of the cursor to be used in freehand drawing. Also, the selection of "Brush" in this menu column would permit selection of any rectangular portion of data within canvas window 203 to be used as a paint brush and cursor movement by user 18 would function to paint in canvas window 203 with this image cursor. In this connection, it will be noted that the "paint" command has been selected in the "Stroke" column 209 so that the area selected in screen 50 functions as the user paintbrush per se.

In order to copy the spoke wheel in screen 125 into canvas window 203, the following procedure is used. First, the pop-up menu symbol at 211 of window 203 is invoked revealing pop-up menu 213 as shown in FIG. 27B. Next, user 18 selects the "Copy Screen" command in menu 213, which is shown selected (highlighted) at 215. At this time, the cursor 52 changes to an upper left corner angle bracket similar to the symbol, "Γ". Next, user 18 positions this bracket cursor at the upper left corner of the spoke wheel in screen 125 and clicks left point button 31 of mouse 27. This point having been selected, the cursor will take the appearance of a lower right corner angle bracket similar to the symbol, "⌐". Next, user 18 positions this bracket cursor at the lower right corner of the spoke wheel and clicks the mouse right adjust button 33. Thus, these two bracket cursor selections encompass the area of the spoke wheel representation indicating to system 14 the selection of this area as stored in the display memory of system 14. User 18 then moves the cursor 52A into canvas window 203 and clicks mouse left point button 31 within the frame of window 203 thereby placing the image of the spoke wheel area copied on the canvas in window 203. The result of this function is illustrated in FIG. 27C wherein the copied image of the spoke wheel appears at 217 in window 203. The previous upper left corner bracket selection would be at position 219 while the previous lower right corner bracket selection would be at position 221. Thus, an image of data graphics produced via operation of emulating processor 12 has been captured and copied to a ViewPoint destination under the control of host system 14 by placing the PC emulator in its "Pause" state and copying the selected content of frozen screen 125 into canvas icon 203. As illustrated in FIG. 27D, data in the form of text may also be transferred from a document icon to canvas icon 78. In FIG. 27D, a document icon 223 entitled, "Sample Text" has been opened, as indicated at 223A, and its content, the message, "Sample Text Inside of a Canvas Icon" appearing in its window 225 at 227 has been transferred via the "Copy Screen" command at pop-up menu 211 into location 229 of window 203 in the manner as previously explained for the spoke wheel representation. Of course, any text present in PC display screen 125 may be copied to a canvas window in the same manner using the "Copy Screen" command.

X. Monochrome and Color/graphics Display Modes for PC Emulator

Reference is now made to display screen 125 of PC emulation window 124 and the Monochrome and Color/graphics display modes. Data in the form of both text and graphics is supported in these modes.

As a monochrome display, screen 125 supports 25 rows of 80 characters each. The characters are roughly twice as high as they are wide, and are not changeable by a PC application program. These PC characters are emulated by a ViewPoint PC character font of 8×16 pixels per Table I. Display screen 125 will appear with dark characters on a white background. unless user 18 has inverted the display to be white-on-black via a menu command at pop-up menu at 58.

Attribute values for monochrome text are the same as for color/graphic text: foreground color, background color, foreground blinking, and foreground intensity. Blinking and intensity are interpreted in a normal way. Color attributes for monochrome characters are interpreted as shown in Table VI. "Normal" in Table VI means a black character on a white background.

The NS character set of host system 14 is extended to provide for IBM character semantics not previously represented, such that character codes exist for the full 256-character "IBM ASCII" set. The PC fonts are 8×16 bitmaps for the full default 256-character "IBM ASCII" set. The advantage of using 8×16 bitmaps is that the screen remains the same size for both the Monochrome mode and for Color/graphics mode.

TABLE VI

| Background color | Foreground (text) color | | | |
|---|---|---|---|---|
| | black | blue | white | all others |
| black | hidden | underlined | normal | normal |
| blue | normal | underlined | normal | normal |
| white | inverted | underlined | normal | normal |
| all others | normal | underlined | normal | normal |

An important aspect of the PC display is the size of the PC pixels in relation to the size of ViewPoint NS character pixels. Color/graphic display pixels are approximately twice the height of NS character pixels. Therefore, there are two NS character pixels, one above the other, for every PC pixel in order to achieve the same size. In other words, each PC display scan line will require two rows of pixels on display screen 125. The overall aspect ratio will be subtly different from that of the target PC display.

PC applications can choose to operate the color/graphics display in either text mode or graphics mode. There are two modes of text available for the color/graphic display: 40 column and 80 column as illustrated in Table VII. On the PC, characters for both these modes are formed from an 8×8 bitmap with hardware determining the size and shape of the resulting displayed character. On the host system display, a 40-column-mode character will be simulated by a 16×16 pixel box, and an 80-column-mode character will be simulated by an 8×16 pixel box. Since the 80 column mode has twice as many characters as the 40 column mode with each at half the width, the display resolution on the host system display is the same, i.e. 640×400 pixels, in either case.

TABLE VII

| | PC Emulator Display | | Host System 14 Display [pixels are half as high as PC pixels, so 2 are required to achieve the same height] | |
|---|---|---|---|---|
| | | Width  Height | | Width  Height |
| Character size (in pixels) | 40 col.: | 16 × 8 | 40 col.: | 16 × 16 |
| | 80 col.: | 8 × 8 | 80 col.: | 8 × 16 |
| Display size (in pixels) | 40 col.: | 640 × 200 | 40 col.: | 640 × 400 |
| | 80 col.: | 640 × 200 | 80 col.: | 640 × 400 |

Associated with each character is a set of attributes. The attributes on the PC emulator specify (1) whether or not the character is blinking, (2) any of eight colors for the background, that is the area surrounding the character, (3) any of eight colors for the foreground, that is the character itself, and (4) the intensity of the foreground color, which is medium or bright. All of these attributes may be provided in various combinations. For example, one may have a blinking red character on a blue background. When color/graphics mode is disabled, the only attributes available are reverse video comprising white characters on a black background, blinking, and intensity. It should be noted that a value at particular location can be set to indicate that the foreground-blinking attribute for each character should be used to instead determine the background intensity, thereby making it possible to provide sixteen background colors.

Any scheme of representing colors on the host system black-and-white display should have the following characteristics: (1) legibility when foreground and background are different colors, (2) invisibility when foreground and background are the same color, (3) background color invariance, i.e., the same color code produces the same gray pattern everywhere, and (4) foreground color invariance.

Figure 31A:
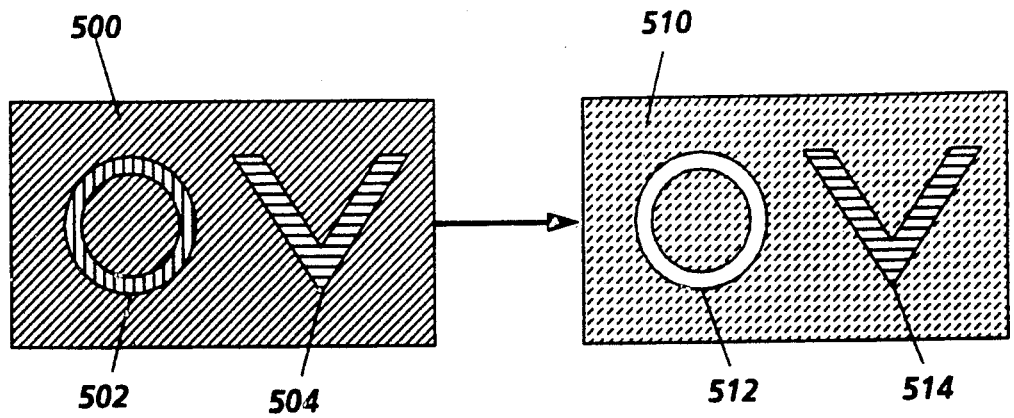
FIGS. 31A, 31B, and 31C illustrate three mappings from color character attributes to pixel patterns on a monochrome display.
Figure 31B:
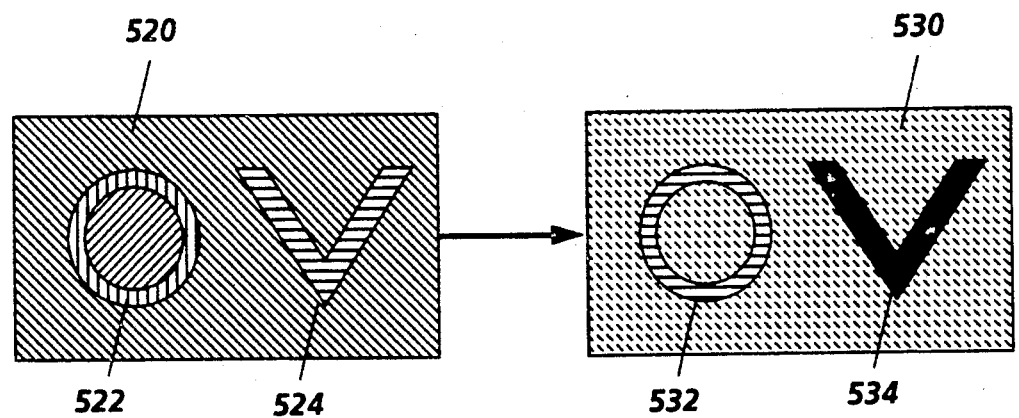
Figure 31C:
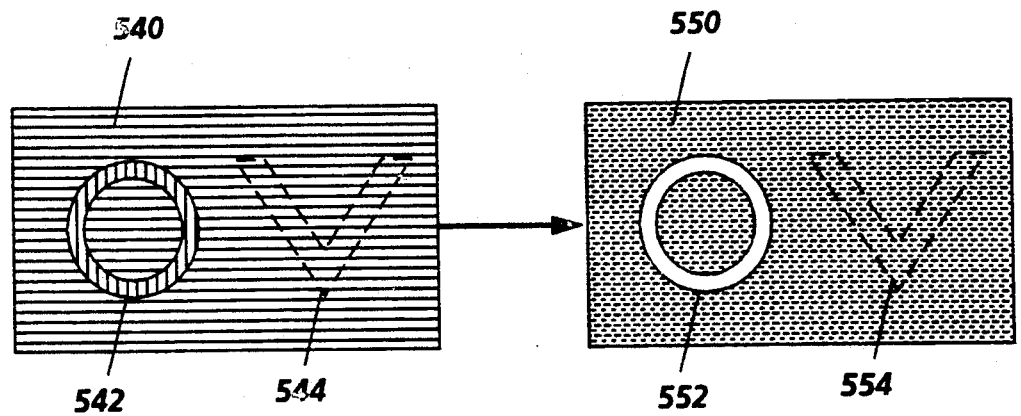

Unfortunately, these criteria are impossible to achieve when several colors must be mapped onto a much more limited range of grays. Since legibility is obviously paramount for what is, after all, text, and since the background pattern provides more flexibility in choice of grays, color/graphics text is simulated as follows: (1) a unique gray pattern represents each of the eight non-intense background colors, as illustrated in FIGS. 31A, 31B, and 31C, in which background colors 500, 520, and 540 are mapped respectively to gray pixel patterns 510, 530, and 550. (2) Other, possibly non-unique, gray patterns represent each of the possible eight intense background colors. (3) Foreground color invariance is sacrificed; instead, the two most legible of white, 50% gray, and black are chosen depending on background. Of the two legible choices, one is used for the lighter foreground colors and the other for the darker foreground colors. In FIGS. 31A and 31B, lighter foreground colors 502 and 522, which are the same color, are mapped respectively to pixel patterns 512 and 532, which are different, similarly, darker foreground colors 504 and 524, which are the same color, are mapped respectively to pixel patterns 514 and 534, which are different, with pixel patterns 512, 514, 532, and 534 being chosen from three pixel patterns. (4) If the foreground and background colors are the same, the character is invisible. In FIG. 312C, background color 540 is the same as foreground color 544, so that pixel pattern 554, rather than being chosen from the three pixel patterns chosen for the foregrounds in FIGS. 31A and 31B, is the same as pixel pattern 550 to which background color 540 is mapped.

Changes in the "shape" of PC emulator cursor are supported. The term "shape" refers to the range of scan lines that the cursor will occupy. On the host system display 50 the cursor representations are two pixels high. The cursor is always as wide as a character, which is eight pixels wide in the 80column mode and 16 pixels in the 40-column mode.

For graphics in the color/graphics mode, there are two resolution modes: medium resolution graphics and high resolution graphics. In the medium mode, the PC screen 125 is divided into 320×200 pixels. On the host system display 50, each of these pixels is represented as four pixels, as indicated in Illustration I below. The resulting comparable host system display screen will, therefore, be 640×400 pixels. The extra height is due to the smaller pixels on the host system display. The extra width is a result of being in medium resolution.

Illustration I two host system pixels high two pixels wide

Sixteen colors are available to choose from, but only four colors can be displayed at any time.

Since there are four host system pixels for each PC medium resolution pixel, combinations of the four different quandrants of each PC medium resolution pixel can be employed to illustrate different levels of shading representing different colors. Table VIII below illustrates how shadings may be represented by seven different pattern representations or by sixteen different pattern representation.

Though the most practical choice would be the group of sixteen pixel patterns since move colors can be represented, many of these patterns, for instance, 1, 2, 4, and 8, would be indistinguishable at the size user 18 will view them. Thus, the set of seven pixel patterns is the preferred lower level that is acceptable with shading levels remaining distinguishable.

TABLE VIII

Seven patterns: 0 1 2 3 4 5 6

Sixteen patterns: 0 1 2 3 4 5 6 7

Pixel numbers: 8 9 10 11 12 13 14 15

Table IX below illustrates an example of one possible mapping of colors to the seven pixel pattern representation different from that shown in Table VIII. However, the pattern representation in Table IX provides a better visual distinguishing level between color representations. Color mappings in terms of darkness are listed from 0 (the darkest) to 6 (the lightest), although color mappings 2, 3, 4 and 5 are arbitrary in terms of darkness since these patterns are at the same level of gray, but preferred for pattern representation and shading distinction since, in these patterns, one of four possible corner pixels of the quadrant pattern is the only pixel highlighted. Other patterns, of course, are possible.

High resolution graphics mode divides PC display screen 125 into 640×200 1 pixels, which translates into 640×400 host system pixels.

TABLE IX

| Intense White (white) | White (light grey) | Yellow | | 6 |

| Green | Light Green | Cyan | Light Cyan | | 5 |

TABLE IX-continued

| | Light Magenta | | 4 |

| Light Red | Light Blue | | 3 |

| Brown | Magenta | | 2 |

| Blue | Red | Dark Grey | | 1 |

| | Black | | 0 |

Text may be selected in PC window 124 in either Monochrome or Color/graphics text mode and transferred to a ViewPoint destination as previously explained.

XI. Input Mechanism and Methodology

During the course of the previous discussion, attention has been directed mainly to the user interface for both host system 14 and the PC emulator via emulation window 124, the interaction between these separately operated video processors each capable of handling user input when the user input focus is directed to either system. Also, discussion has centered on user interaction with ViewPoint objects useful in the user interface environment of either or both systems. An example of the latter type of system "shared" objects are, for example, the emulated fixed disk icon and virtual floppy disk icon whose contents can be accessed both through BWS windows and through PC utilities operating in the emulated environment. Discussion will now turn to a description of the processes implemented in software underlying these ViewPoint applications in order to understand the methodology and input mechanism in handling user invoked inputs, such as <OPEN>, <PROP'S>, mouse point selection and moving data between windows or containers, and what happened procedurally to respond to these user inputs.

In conventional user interfaces, there is a defined set of acceptable user inputs and there are defined points in a sequence of operations at which the system will look for user input and will respond appropriately if an acceptable input is received. Thus, the system responds to user input only at defined points in operational sequences of the system. By contrast, the user interface of host system 14 utilizes an input mechanism which accepts user input at any time so that each input command is independent of any predefined sequence and is an action responded to by system 14 basically in the sequence received. System 14 performs the appropriate response and then waits further user input. This type of user input mechanism functions somewhat like an interrupt system wherein the system is maintaining runtime operations and when a user input is received, the system is interrupted to perform the appropriate response, after which it returns to the interrupted operations. Such an approach is much more versatile in handling user invoked commands providing a more friendly user interface.

The input mechanism used in the Xerox 6085 workstation accepts and handles user inputs in any received sequence and completes its response to each input before handling the next user input. This input mechanism is implemented in part with Mesa software, but could be implemented in substantially the same manner with another suitable programming language. As previously indicated, the hardware architecture of this workstation is discussed in more detail in patent application Ser. No. 06/856,526. As discussed there, input/output processor (IOP) 22 handles the input/output (I/O) devices and shares its bus with emulating processor 12. When IOP 22 receives user input, it provides information concerning that input to host system processor 20.

Figure 28:
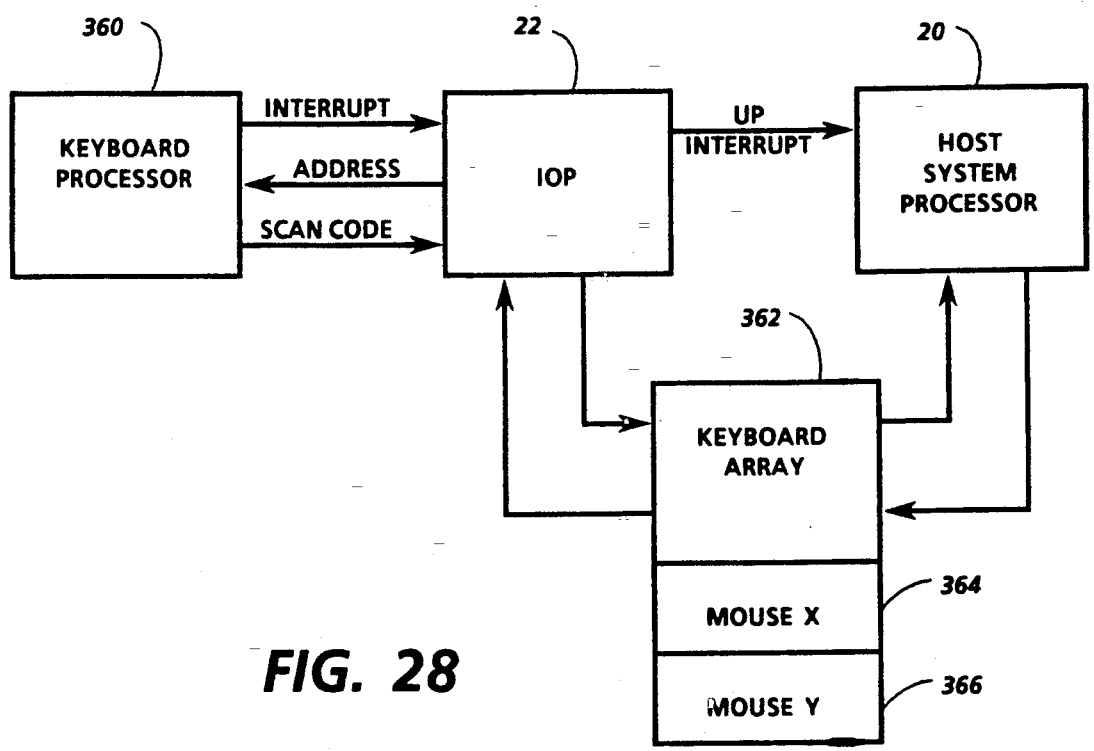
FIG. 28 is a block diagram for explaining the manner in which the host system receives user input information.

FIG. 28 shows the manner in which host system processor 20 receives information about user inputs. Keyboard processor 360 in the keyboard/mouse I/O device scans various switches and sensor latches in the keyboard and mouse to determine whether any have changed state since the last scan. If a switch or latch has changed state, keyboard processor 360 generates a scan code indicating which switch or latch has changed state and whether the change was a down or up stroke for a particular key or mouse button or if a mouse movement has been sensed and latched. Keyboard processor 360 provides an interrupt to IOP 22, and when IOP 22 services that interrupt and addresses keyboard processor 360 for that purpose, keyboard processor 360 provides the scan code it generated. A device handler, at 46 in FIG. 2, servicing the interrupt within IOP 360 receives each scan code from keyboard processor 360 and keeps track of cursor position in the X and Y dimensions based on scan codes indicating mouse movement. When a scan code is received indicating a down or up stroke, the handler sets a bit in a keyboard array 362 in main memory corresponding to that scan code. When a scan code is received indicating movement of the mouse, the handler loads new values into the mouse X position word 364 and the mouse Y position word 366 in memory.

The input mechanism involves how user actions are translated into program actions. When user 18 presses a keyboard key or moves or clicks the mouse, that action must be recognized, directed to the correct window, and then acted upon. This multiplexing of user input is the job of three processes called the (1) "Stimulus" or "stimulus level" and the (2) "Notifier" and (3) the TIP (Terminal Interface Package) table. The stimulus is a high priority process that watches for user actions and enqueues them. The Notifier then dequeues each event and directs it to a window. /All user actions are directed either to a window with the input focus or to a window with cursor click action. In the case of PC emulation window 124, other ways of placing input focus to its window when open is invoking the "Boot" command and/or moving a virtual floppy into an emulated drive configured into the PC emulator. A TIP table provides a flexible method of translating user actions into program actions. A given window always has at least one associated TIP table and may have a chain of tables. The Notifier checks a given user action against the TIP table or each table in the chain until it finds a meaning match. If it finds none, the action is disregarded. Once the Notifier has determined the correct window for a user action, it checks for that action in the window's TIP tables. A TIP table is essentially a giant select statement. The left side of the table contains various user actions and the right side of the table has a list of results. When an action is located in the left side of a table, the corresponding result on the right side is passed to a procedure called NotifyProc. The NotifyProc is then responsible for executing whatever program actions are to be associated with the user action.

Figure 29:
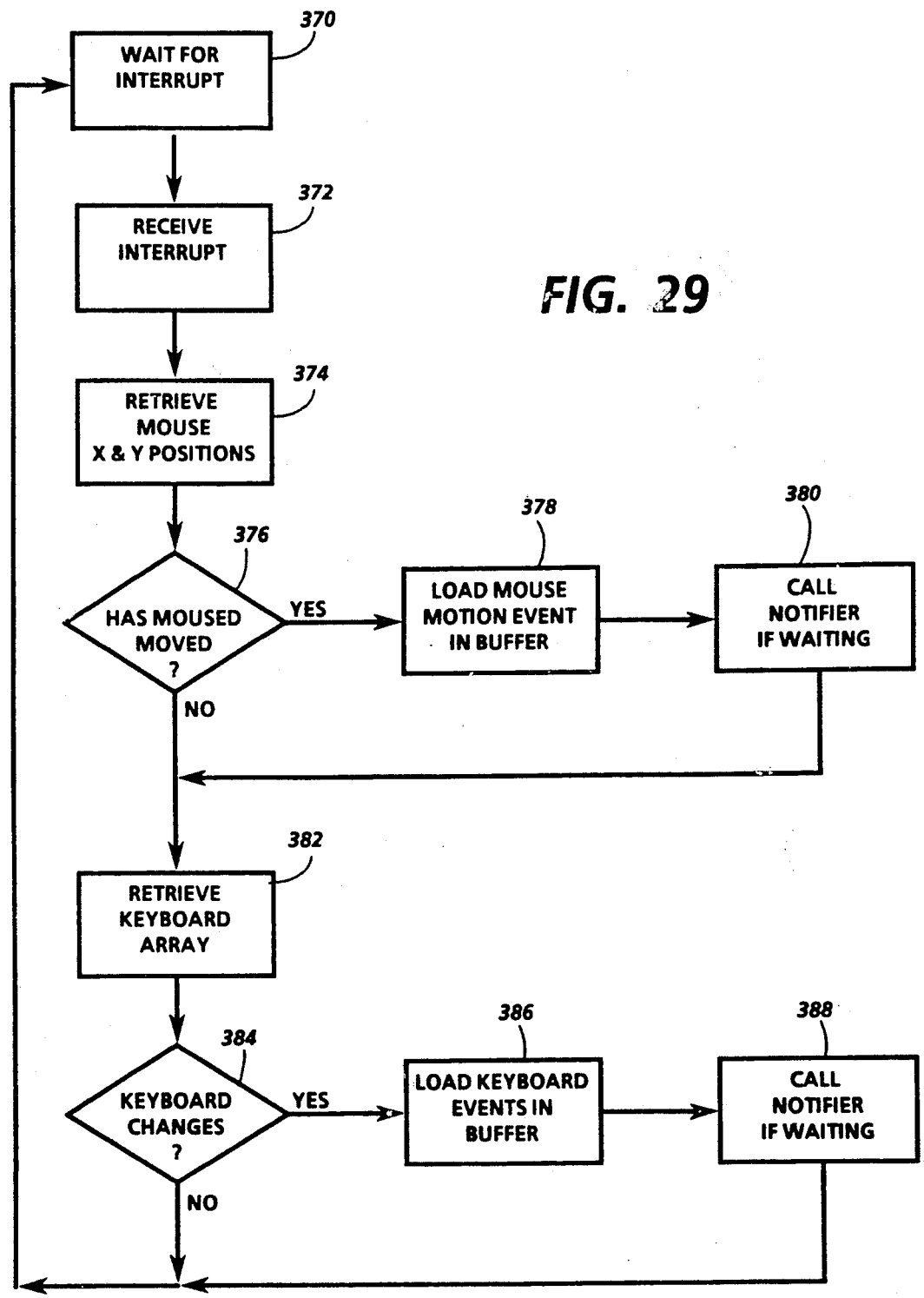
FIG. 29 is a flowchart for explaining the stimulus level operation.

As illustrated in FIG. 29, the routine executed by host processor 20, referred to as the stimulus level, detects changes in the contents of keyboard array 362 and the mouse position words 364 and 366. In box 370, the stimulus level waits for an interrupt, which it receives in box 372. This interrupt may be received at a frequency based on the frequency of display refresh, such as approximately 60 times per second. The stimulus level then retrieves the mouse X position word 364 and the Y position word 366, in box 374, and, in box 376, compares them with the previously retrieved values to determine whether the mouse has moved. If so, a mouse motion event entry is loaded into a ring buffer in memory in box 378, providing information about the mouse motion. This ring buffer may be managed in the manner described for other ring buffers in patent application Ser. No. 06/856,526. Then another routine, referred to as the notifier level or Notifier, is called in box 380 if it is waiting for a call to begin execution. Then the stimulus level proceeds to retrieve the contents of the keyboard array 362, in box 382. In box 384, the stimulus level compares the retrieved contents and compares them with the previously retrieved contents to determine whether any changes have occurred. If any keyboard or mouse button changes are found, a keyboard event entry for each such change is loaded into the ring buffer, as previously described, which is indicated at box 386. The stimulus level again calls Notifier if Notifier is waiting for a call, in box 388, and then returns to wait for an interrupt in box 370.

Figure 30:
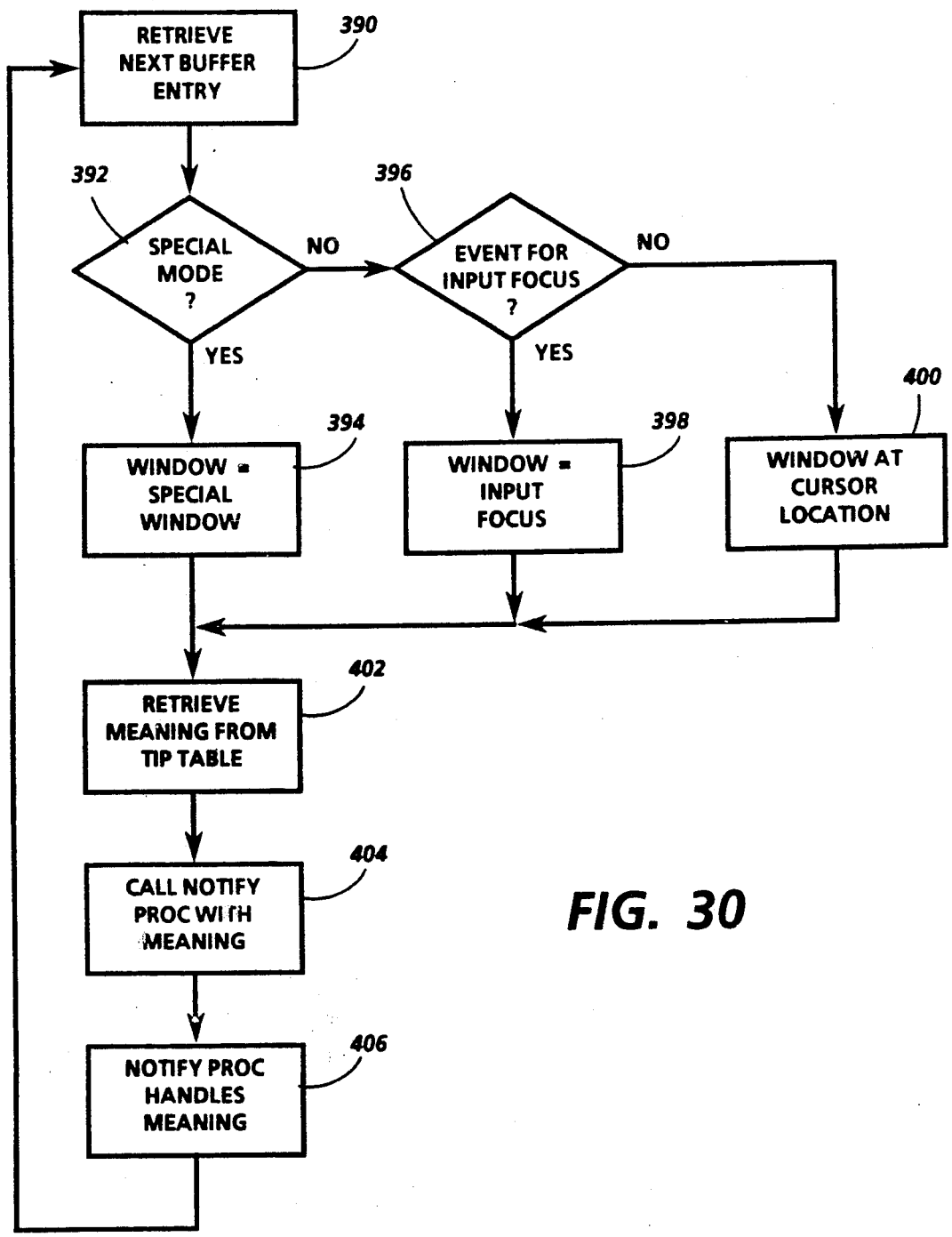
FIG. 30 is a flowchart tracing the events of the Notifier after receiving a call from the stimulus level.

FIG. 30 shows the sequence of events followed by Notifier as it empties the ring buffer after receiving a call from the stimulus level. Notifier retrieves the next event entry from the ring buffer in box 390. If the entry is a mouse motion event, Notifier calls procedures which update the position of cursor 52 and store its current location. But if the entry is a keyboard event, Notifier tests in box 392 whether it is operating in a special mode, meaning that a special window receives all keyboard events. If so, the special window is selected as the window to which the keyboard even tis provided in box 394. If not in the special mode, Notifier next tests in box 396 whether the event is an event for the window which is the current input focus, or is one of a limited number of other events such as a mouse click which may not go to the current input focus window. If the event is for the current input focus, the current input focus window is selected in box 398, but if not, the window in which cursor 52 was located when the event occurred is selected in box 400.

As is known from previous description, the user interface provides display screen 50 which can display a number of BWS windows. Each window may be thought of as a distinct screen object on desktop 54, and other screen objects include cursor 52 which follows the mouse movements, icons which appear on desktop 54, and other displayed components included in windows such as headers, command bars, properties, menus and so forth. Most icons can be opened, and the opening procedure, as discussed in more detail below, results in a window on screen 50 and a corresponding data structure in memory into which data may be entered via key operation on the keyboard 29. Notifier stores values indicating whether it is in a special mode with one of the windows a special window and indicating which window on desktop 54 is the current input focus, in each case meaning that data which is entered will be received by the data structure corresponding to that particular window. The current input focus may be changed, for example, by clicking left point button 31 on mouse 27 when cursor 52 is a window other than the one which is the current focus.

If the scan code represents a mouse click with mouse button 31 at a particular screen X,Y point which indicates a change of input focus, Notifier will call a procedure which determines the window to which the input focus has been changed and that procedure will provide a new value to Notifier for the new input focus window. This procedure will use the identified location of cursor 52 from the ring buffer entry which was previously retrieved, and will, for example, determined from that X,Y location in which window cursor 52 was located when the mouse click occurred. The cursor location can be compared with a tree data structure which includes a list of each defined window that is capable of display on screen 50, its location and any procedures applicable within the context of that window. This window data structure is contained within a larger Mesa data structure called the window package, which also holds a number of general procedures relating to windows, including a window manager which loads the display bitmap based on the contents of the tree data structure. The window package, in turn, is contained in a larger Mesa data structure at BWS 38 (FIG. 2), which also includes the Notifier and other items discussed below, including a selection controller, property sheet base code, and Containee.

The procedure called by Notifier, to determine the window selected for focus of input, thus provides the location within BWS 38 which the data structure for that window is found. If the event is an event for the current input focus, the location of the current input focus window's data structure will remain as the value stored by Notifier as the value of the current input focus.

When the appropriate window's data structure has been determined in boxes 392-400, the meaning corresponding to the keyboard event retrieved from the buffer is then retrieved from a TIP table in that window's data structure, as indicated at box 402. This TIP table is accessed based on the event retrieved from the buffer, and unless a special TIP table including the keyboard event has been set up for the current window, a default TIP table for the system will be used, providing a meaning which is ordinarily appropriate. The meaning provided by the TIP table is particularly relevant to emulation of an IBM PC, because the TIP table for emulator window 124 provides appropriate IBM scan codes for the retrieved keyboard events per Table I above. These scan codes then serve as keyboard input to PC emulating processor 12.

NotifyProc, another procedure within the current window's data structure, is called by the Notifier to service each meaning retrieved in box 402. The NotifyProc receives the meaning in box 404, and NotifyProc either updates the current window's data structure directly or calls other service procedures to do so. These other service procedures are stored within the window package in BWS 38, and may be called by the NotifyProc of any of the BWS windows when selected. NotifyProc calls the service procedure to handle the meaning in box 406.

This input mechanism, as noted above, allows each input to be separately handled, regardless of where it occurs in a sequence of inputs desired to be invoked by user 18. The actual effect of a specific input, however, may vary substantially, depending on which window receives it. Reference is now made to considerations relative to the effects of user inputs to the PC emulator.

The term "application" may be defined as a set of interrelated features of a system which provide a characteristic, recognizable function or interactive screen object. This characteristic interactive screen object may have a number of pieces, some of which are screen objects with independent forms and some of which are screen objects dependent on other screen objects. But at least one of these screen objects must be present on desktop 54 in order to make available the particular application to which they belong.

The PC emulator icon, as discussed previously, may appear on the screen as an independent screen object. Its presence on desktop 54 will depend, however, on a number of previous events. Typically, when a system using the input mechanism described above is booted and user 18 logs on, a primary window appears which includes the entire screen 50 and this particular application is called the Desktop. The data structure for the Desktop window receives all user inputs from Notifier until another window has been opened and appears on the screen, at which time that subsequently selected window may become the current input focus for user input and receive inputs directly from Notifier in the manner described above.

The firs time desktop 54 is opened at logon by user 18, it will typically have only a small number of default screen objects. One object may be header 56 or other similar screen object which provides access to various basic functions such as log off, such as through pop-up menu 58. Another default screen object may be a directory icon 60 through which user 18 may access other objects that bring about other applications available to the user. When the directory window appears, it provides access to a number of applications, each of which may be copied out of the directory window, providing other icons which remain visible as independent and established screen objects on desktop 54.

A. Invoking Icon Functions

The visible effects of opening and otherwise manipulating PC emulator icon 94 have already been discussed above. Some of the features previously discussed involve applications other than the PC emulator application, i.e. applications which may be accessed through other icons, including virtual floppy applications, emulated fixed disk applications, document applications, Interpress master applications, freehand drawing applications and so forth. Reference is now made to a more detailed explanation of the manner in which user inputs affect these types of applications during PC emulation.

PC emulation implemented according to the invention is interactive in that user inputs may be applied to configure, boot, reconfigure and reboot the emulated system, in the manner previously described. The user inputs which control these interactions include independently invoked commands for selecting the PC emulator icon, requesting display of its property sheet, requesting the opening of the icon, requesting display of its option sheet, and requesting boot or reboot.

1. Selecting the PC Emulator Icon

Before PC emulation can proceed, the PC emulator icon must be selected. User 18 selects it with the same input means used to select any icon on desktop 54, and the resulting processes within the system are similar to those which occur when any other icon is selected.

User 18 moves mouse 27 so that cursor 52 is located on PC emulator icon 94. The Notifier updates the cursor position in response to these mouse movements. With cursor 52 on PC emulator icon 94, User 18 selects the icon by clicking left mouse button 31, resulting in a point scan code. The selection to be complete must be a full mouse click. Pressing and holding down left mouse button 31 over the icon will provide a highlighted condition of icon 94 but if the mouse cursor 52, with button 31 still held down, is removed from its position over icon 94, icon selection will not be completed.

When Notifier receives a keyboard event resulting from this point scan code, as discussed in relation to FIG. 30, it obtains the window data structure corresponding to the location of cursor 52. All of the icons are displayed in the Desktop window, so that the location of the Desktop window data structure and the meaning of the point scan code are ascertainable. The meaning of the point scan code goes to the Desktop NotifyProc, which calls the appropriate service procedure for icon selection. The Desktop window data structure contains several additional types of information, including the information needed to paint the window as it appears on screen 50; a directory of icons displayed, their file types and their X,Y locations relative to an invisible block grid on desktop 54; and a procedure for identifying which icon is at the location of the cursor point based on the cursor X,Y location. Therefore, having received the point scan code, the Desktop NotifyProc calls this procedure to identify the particular icon selected.

The Containee data structure in BWS 38, mentioned above, contains two procedures for each of the file types which an icon may have. One of those procedures is PictureProc, which is a procedure to display an icon picture and can be used to modify the manner in which the icon is displayed. The other procedure in Containee, GenericProc is a procedure called to perform <OPEN>, <PROP'S>, <COPY> and <MOVE>. GenericProc will be discussed in more detail later in relation to opening an icon. Upon identifying an icon to which cursor 52 is pointing, NotifyProc calls Containee to obtain PictureProc for the file type of that icon in order to highlight the icon as displayed on the screen, which is typically accomplished by a partial video reverse.

Upon identifying a selected icon, NotifyProc also calls the selection controller in BWS 38 to make the Desktop the current selection manager, a role which will be discussed in more detail later. When the selection controller has done this, the previous selection manager receives a notification that it is no longer the selection manager, and it in turn takes appropriate steps so that its icon is no longer highlighted. Then, NotifyProc calls Notifier with a request to make the Desktop window the current input focus.

At this point, the handling of the user input which selected PC emulator icon 94 is complete, so that the Notifier proceeds to retrieve the next event entry from the ring buffer. The next event could be any possible user input, but user inputs requesting the property sheet for that icon or requesting that the icon be opened are of particular interest.

2. Request Property Sheet

User 18 may request display of the PC emulator application's property sheet 12 by invoking the <PROP'S> function on keyboard 29 when PC emulator icon 94 has been selected in the manner described above. The <PROP'S> event's meaning is provided to Desktop's NotifyProc, as is the case with other keyboard events received when the Desktop window is the current input focus.

Based on the <PROP'S> meaning, the Desktop's NotifyProc calls a procedure which identifies the current selection manager, in this case the Desktop itself, and identifies from the data structure within the NotifyProc the file type of the selected icon. Then it calls the GenericProc from BWS 38 for that file type, requesting that GenericProc set up the property sheet window.

Generic Proc has available to it a number of facilities or procedures in BWS 38 which it may use to set up a BWS window. One facility, for example, can be used to obtain the basic form of the window to be displayed on the screen, while another facility can be used to create a data structure for the window. In the case of the property sheet window, GenericProc calls the property sheet base code and other procedures to create a data structure for the property sheet window, including a NotifyProc and a TIP table, and the provide a form for the window which is then loaded into the data structure. The window includes components, including a header and a body bounded by a suitable frame. In the case of PC emulator property sheet 122, the body contains a number of items of text and a number of fields with items of text as default value with some of these items provided in different forms of the sheet as set forth in FIGS. 7, 8 and 9.

The property sheet window data structure is then added to the tree of visible windows in the BWS window package, resulting in its display. In addition, NotifyProc calls the selection controller to make the item of text in one of the fields in the property sheet window the current selection, and the selection controller will cause that item of text to be highlighted, permitting user 18 to make changes relative to the item. NotifyProc also calls Notifier to make the PC emulator property sheet window the current input focus, and Notifier provides a blinking caret after the current selection, inviting the user to add text to it. The selection controller also calls PictureProc from Containee to change the PC emulator icon back to its non-highlighted form, completing the response to the invoked <PROP'S> function.

Figure 9:
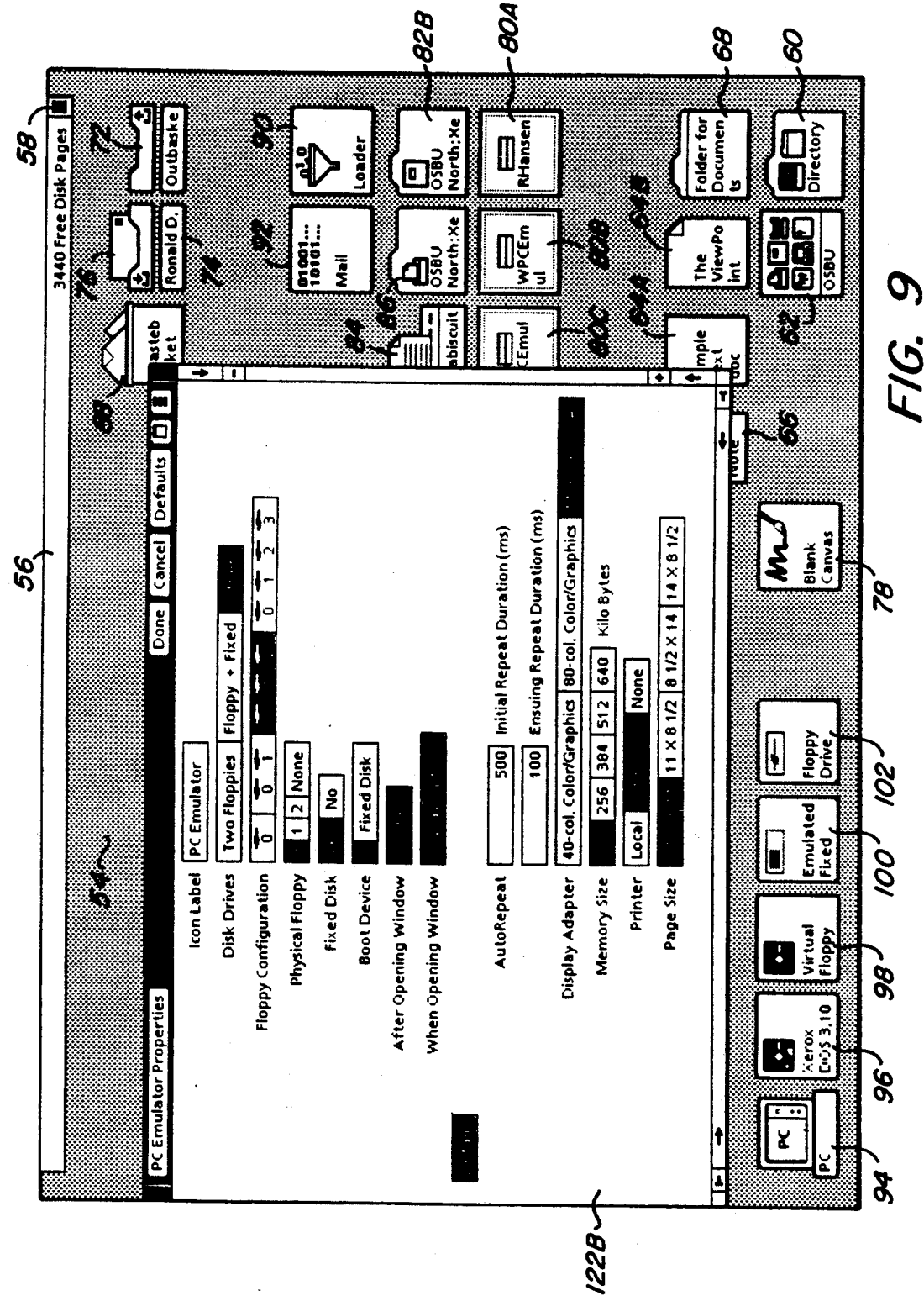
FIG. 9 is the same view as in FIG. 8 with further emulator properties displayed.

User 18 may provide various inputs while property sheet window 122 is the current input focus, as illustrated in relation to FIG. 7, 8 and 9 showing the property sheet window 122, 122A or 122B. Each of these inputs will be handled by the property sheet window's NotifyProc to obtain the effects described above. The data stored in the PC emulator property sheet window's data structure is stored in a file in fixed disk memory, accessible based on the identity of the PC emulator icon through a directory. In this manner, more than one PC emulator icon may be displayed, each configured differently to provide a separate and unique PC emulator application. The configuration of the icon will determine the manner in which the PC emulator operates when the icon is opened, as will be touched on below.

3. Opening the PC Emulator Icon

When the PC emulator icon is selected, user 18 may press the <OPEN> key on keyboard 29 to provide a scan code whose keyboard event meaning is a request to open the selected object. Another user input may perform this same function, for example, a rapid series of two mouse click scan codes, which may have the same keyboard event meaning. This transformation from user input sequences into event meanings is specified by the TIP table for the particular window with the input focus.

The Desktop's NotifyProc, upon receiving a request to open a selected icon, calls GenericProc for that icon's file type with a request to open. GenericProc then retrieves the information stored in relation to the property sheet for that icon. If the property sheet window has been displayed, user 18 may have modified that information, but if not, default values will be stored. In the case of PC emulator icon 94, the information will include not only the details of the configuration of the PC emulator, but also the initial selection of whether the option sheet should be displayed before the PC emulator window is displayed, and the further selection of whether the PC emulator should be booted automatically upon opening PC emulator window 124.

If the user selection is to display option sheet 136, GenericProc calls appropriate procedures to create the option sheet window, which is substantially similar to the property sheet window. The data structure of option sheet window 136 includes a procedure which is called when this window is closed which also calls GenericProc to create PC emulator window 124. In general, however, option sheet 136 merely enables the user to select the configuration of the PC emulator for the current session of PC emulation without changing the configuration which is stored in relation to PC emulator icon 94. Instead, the contents of the PC emulator option sheet window data structure are used directly in configuring the PC emulator when option sheet window 136 is closed.

If the user selection is not to display option sheet 136, or if option sheet 136 is being closed, GenericProc calls appropriate procedures to create PC emulation window 124. This window will include additional components not found in property sheet window 122 or option sheet window 136, including message subwindow 128, device bar 126, and display screen 125, previously discussed in relation to the FIGS. 10 and 11. Desktop NotifyProc also calls Picture Proc to convert PC emulator icon 94 to a ghost appearance at 94A, indicating to user 18 that the icon is in an opened state.

In addition, if the user selection is to boot the PC emulator automatically on opening, the GenericProc will call a procedure which boots the PC emulator with the configuration selected. If not, the configuration selection will be stored in the PC emulator window data structure so that when the user provides an input selecting the boot operation, the boot may be performed. Similarly, if user 18 selects the "Show Options" command, option sheet window 136 will be created and displayed, and user 18 will be able to change the default configuration for the current PC session. Then option sheet 136 may again be closed and the PC emulator rebooted.

Once PC emulator window 124 is displayed, user inputs to window 124 are handled by its NotifyProc as long as the current input focus remains in this window. For example, the TIP table for this window converts keyboard events to IBM scan codes to be provided to PC emulating processor 12 in the manner described in patent application Ser. No. 06/556,526.

B. Data Transfer Between System Processors

Data may be transferred from the control of one of the emulating processor and the host system main processor to the other by a number of techniques, and reference is now made to how those transfers are implemented.

Reference is again made to the transfer of data between host system 14 and emulating processor 12. In a sense, all the data in the system is under the control of host system main processor 20, in that the main processor could theoretically access it. In a more important sense, however, some of the data in the system is under the control of emulating processor 12 and can be manipulated by it during PC emulation, while other data is under the control of main processor 20 and can be manipulated by it, according to one of its applications.

The data under read/write control of the emulating processor includes data in its allocated memory on the host system hard disk, and may also include data on a physical floppy disk in the physical floppy drive; data in host system hard disk memory allocated to a virtual floppy disk; and data in host system hard disk memory allocated to an emulated fixed disk. In addition, since the data displayed in the display area of the PC emulator window is provided directly from the PC emulator's display buffer, that data is under write-only control of the PC emulator. Although the host system main processor may have access to much of this data, it must not be freely permitted to change this data, because that would interfere with the operation of the PC emulator. Conversely, the PC emulator does not have access to the remainder of memory, so that the host system is protected from a crash of the PC emulator resulting from defective or malicious software.

As discussed above, the user may provide inputs which cause selected data under the control of one of the processors to be transferred to the control of the other processor. This means that data under the control of the PC emulating processor may be moved or copied so that one of the host system main processor applications may manipulate it, and that data under the control of the main processor may be moved or copied so that the PC emulating processor may manipulate it. Various techniques for transferring data could be implemented, including the use of a move or copy user input, the use of an exit and boot procedure, the use of a bitmap capture user input and so forth.

1. Move/Copy Input

User 18 may transfer data by invoking a <MOVE> or <COPY> via keyboard 29 or other equivalent and suitable user input. The basic sequence the user follows is to indicate selection of an object to be transferred, to provide the move/copy input, and to provide an input indicating the destination to which the object is to be transferred. Within this basic sequence, a wide variety of specific techniques can be developed, suitable for the type of data transfer being made. The following techniques relate to the data transfers previously described in relation to FIGS. 21–23 and 25–27.

If the selected object is text in the PC emulation window 124, the selection is made by selecting the "Pause" command, and then a sequence of point and adjust mouse button commands are utilized to select the text. It should be noted that user 18, whether input focus is in window 124 or in any other ViewPoint window or on desktop 54, can move mouse 27 while holding down a mouse button 31 or 33 thereby pinpointing the desired selection by watching the highlighting change across the display as this mouse motion is carried on. Holding down point button 31 will select a single character while its release followed by holding down adjust button 33 will dynamically expand or reduce the amount of selected text, as seen by the highlighted text, from the point of original release of point button 31. Complete selection by release of the mouse button, which is a mouse click, makes the PC emulation window the current selection manager. The NotifyProc of PC emulation window 124 examines the mouse motion events to determine the characters to be selected, then calls PaintProc to highlight the selected text. Although text cannot be moved out of the PC emulation window, it can be copied. Therefore, if user 18 invokes <COPY> while the text is selected, NotifyProc calls a procedure which modifies the system TIP table so that a point down scan code anywhere on desktop 54 has a special meaning called "copy mode down.

When user 18 then provides the point down input, the Notifier determines which window cursor 52 is pointing to and retrieves the meaning "copy mode down for that BWS window's NotifyProc. This NotifyProc will then call the selection controller to determine whether the current selection can be copied into that window; if it is an open document window, text could be transferred, for example. If The window can accept the selection, the selection controller also relays a request to that effect o the current selection manager, which provides the current selection. The selection controller also calls a procedure to convert the selected text object into data suitable for the document window's data structure. Then the selection controller passes the selected text object to the document window's data structure, and the document window's NotifyProc makes its window the current selection manager.

If the selected object is text in a document window, the selection is made by an appropriate sequence of point and adjust mouse actions. The document window is the current selection manager. Its NotifyProc calls PaintProc to highlight the selected text. If the user then selects the <MOVE> or <COPY> function while the text is selected, NotifyProc calls a procedure which changes the system TIP table so that the point down scan code's meaning is "move mode down" or "copy mode down". When the user then provides the point down input in PC emulator window 124, the Notifier provides this meaning to the emulator window's NotifyProc, which calls the selection controller to determine whether it can accept the selected object and to transfer the selection if acceptable. The selection controller relays this request to the current selection manager, the document window, with a request to convert the selected object into text. Then the selection controller passes the selected text object in its converted form to the emulator window's data structure, which converts the text into keyboard scan codes appropriate to the IBM PC and then makes itself the current selection manager. Rather than displaying the selected text in emulation window 124, however, the emulator window's NotifyProc calls a procedure which passes the IBM scan codes to emulating processor 12 as emulated keystrokes in the manner described in patent application Ser. No. 06/856,526.

The transfer of virtual floppies and Interpress masters is similar to the sequences outlined above, but with some important variations. In moving a virtual floppy or Interpress master out of PC emulator window 124, a mouse click at a cursor location on an emulated floppy drive or Interpress printer in device bar 126 suffices both to select the virtual floppy or the Interpress master, respectively, and to change the system TIP table so that the meaning of point down is "move mode down". PC emulation window 124 is the current selection manager, and its NotifyProc calls the PictureProc to get a tiny cursor, e.g. tiny cursor 98" in FIG. 10, representing the virtual floppy or Interpress master being transferred. If user 18 then provides a click on desktop 54, the Desktop window NotifyProc determines whether there is an icon at the X,Y location of cursor 52. If so, that icon's GenericProc is called and requested to take the selected object, and it will call the selection controller to determine whether it can do so. If the X,Y location is not on an icon, the Desktop itself calls the selection controller, which in turn calls the current selection manager, emulator window 124, to convert the selected object into a file which, results in an icon on desktop 54 at that location.

In moving or copying a virtual floppy onto an emulated floppy drive in device bar 126 of PC emulation window 124, the icon for the virtual floppy is selected in the same manner as the selection of PC emulator icon 94 as previously described. Then, either the <MOVE> or <COPY> function will result in the assignment of the "move mode down or copy mode down meaning to a point down" input. If the point down" occurs in PC emulation window 124, the selection controller will call the PC emulation window data structure to determine whether the X,Y location of cursor 52 is on an emulated floppy drive. If so, the selection controller will pass the location of the virtual floppy to the PC emulation window data structure, which will treat it as if it were a part of the configuration of the PC emulator.

The move/copy procedures thus permit the transfer of data between the control of the two processors with relatively little interruption of PC emulation. We turn now to a transfer of data which requires boot and exit procedures to effect a transfer.

2. Exit/Boot Transfer

The emulated fixed disk is an example an application which permits the transfer of data between the control of the two processors, but not without boot and exit procedures for the PC emulator. Like the virtual floppy discussed above, the emulated fixed disk is on the host system's hard disk but can only be under the control of one of the processors at a time. In the case of the virtual floppy, one of the procedures which is called when the virtual floppy is transferred ensures that only one of the processors has control of it at a given time.

Emulated fixed disk icon 100 represents data on the hard disk which is under the control of host system main processor 20. In order to place this data under the control of PC emulating processor 12, user 18 selects "Show Options" command in command bar 130 of the PC emulation window 124. The default window NotifyProc handles the mouse action for this command and calls a procedure to create option sheet 136. User 18 then reconfigures sheet 136 to include emulated fixed disk icon 100 and selects the "Reconfigure" command in command bar 130, in response to which the default window NotifyProc calls an exit procedure resulting in the halt operation of PC emulating processor 12. Then, the user selects boot or reboot, and the PC emulator window NotifyProc calls a boot procedure which uses the data from the option sheet window data structure to place the emulated fixed disk under the control of the PC emulator removing it from the control of host system main processor 20.

On the other hand, if the PC emulator is operating in a configuration including the emulated fixed disk icon 100, the data it contains will be under the control of PC emulating processor 12. In order to transfer control, user 18 similarly selects the "Show Options" command, and the reverse procedure outlined above occurs. Option sheet 136 is set up and user 18 removes emulated fixed disk 100 from the PC emulator configuration. At this point, control is transferred to host system main processor 20, but the PC emulator is not operating until user 18 again selects boot or reboot.

The Exit/Boot technique could be applied to other data structures on the host system hard disk, and is especially useful for transfer of large volumes of data. In contrast, the next technique is more appropriate for relatively small volumes of data not in the form of text, such as graphical data in PC emulation window 124.

3. Freehand Drawing

As described above, the freehand drawing application provides a technique for transferring the contents of the bitmap for a selected part of the screen into a special freehand drawing window data structure which can receive bitmap data. This technique does not require the interruption of PC emulation, because it obtains the data directly from the bitmap and therefore does not interfere with continuing operation of PC emulating processor 12.

The freehand drawing window NotifyProc, upon receiving a point down action via the left mouse button on its pop-up menu 211, calls NotifyProc to set up the pop-up menu. Then, if a point up event on pop-up menu 211 is received, NotifyProc calls a procedure corresponding to the location of the cursor 52 on the pop-up menu 211. If the command selected is "Copy Screen", the CaptureScreenBits procedure is called, and the Notifier is placed in a mode in which all keyboard events will go to the freehand drawing window, wherever they occur on desktop 54. As a result, the content of the display bitmap in the rectangle defined by the point up and the adjust up scan codes at the moment the adjust up scan code is received will be copied to the freehand drawing window data structure by procedures called by that window's NotifyProc.

The result of copying a part of the bitmap memory which covers any portion of PC emulation window 124 will be to transfer the data displayed there under control of PC emulating processor 12 to the control of the host system main processor 20, so that this too is a technique for transferring control.

Reference is again made to virtual floppy 96 and FIG. 17 relative to access of the virtual floppy from either the PC emulator or from desktop 54. The virtual floppy may be formatted to a filing system such as MS-DOS. the virtual floppy may be moved in its iconic form for insertion into an emulated fixed drive configured in the PC emulator and its contents accessed by running an MS-DOS utility or program. When the same virtual floppy is placed on desktop 54 in the ViewPoint world, its contents may also be accessed, as previously described in connection with FIG. 17B, by employing the <OPEN> function on the virtual floppy icon on desktop 54. A filing system interpreter written in Mesa code interprets the file contents of the virtual floppy for display on desktop 54 when the <OPEN> function is invoked.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A system comprising:
   a. display screen having a plurality of pixels, each pixel including a plurality of positions, each pixel position having a first state in which it appears light and a second state in which it appears dark; and
   a processor connected for providing a display on the display screen, the processor comprising an emulator for emulating a target processor that provides a color display that includes a plurality of background colors including a first background color and a plurality of foreground colors including a first foreground color, the target processor further providing within the color display a first background area of the first background color and a first character of the first foreground color, the first character being positioned within the first background area;
   the emulator mapping the plurality of background colors and the plurality of foreground colors to a plurality of patterns of pixel positions for display on the display screen;
   the patterns including a plurality of background patterns for mapping the plurality of background colors, the background patterns including a first background pattern for mapping the first background color;
   the patterns further including first, second, and third foreground patterns for mapping the plurality of foreground colors, the first and second foreground patterns being more legible relative to the first background pattern than the third foreground pattern;
   the emulator mapping the first background area to the first background pattern and the first character to one of the first and second foreground patterns.

2. The system of claim 1 in which the pixel positions in the first background pattern include at least one pixel position in the first state and at least one pixel position in the second state.

3. The system of claim 1 in which the pixel positions in a white one of the first, second, and third foreground patterns are all in the first state, the pixel positions in a black one of the first, second, and third foreground patterns are all in the second state, and the pixel positions in a gray one of the first, second, and third foreground patterns include at least one pixel position in the first state and at least one pixel position in the second state.

4. The system of claim 3 in which, of the pixel positions in the gray foreground pattern, half are in the first state and half are in the second state.

5. The system of claim 3 in which the first foreground pattern is the white foreground pattern and the second foreground pattern is the gray foreground pattern.

6. The system of claim 3 in which the first foreground pattern is the white foreground pattern and the second foreground pattern is the black foreground pattern.

7. The system of claim 3 in which the first foreground pattern is the gray foreground pattern and the second foreground pattern is the black foreground pattern.

8. The system of claim 1 in which the plurality of background colors further includes a second background color, the target processor further providing within the color display a second background area of the second background color and a second character of the first foreground color, the second character being positioned within the second background area; the background patterns including a second background pattern for mapping the second background color; the second and third foreground patterns being more legible relative to the second background pattern than the first foreground pattern; the emulator mapping the second background area to the second background pattern and the second character to one of the second and third foreground patterns.

9. The system of claim 1 in which the plurality of foreground colors further includes a second foreground color, the target processor further providing within the color display a second background area of the first background color and a second character of the second foreground color, the second character being positioned within the second background area; the first foreground color being lighter than the second foreground color; the emulator mapping the first character to the first foreground pattern and the second character to the second foreground pattern.

10. The system of claim 1 in which the plurality of foreground colors further includes a second foreground color that is the same as the first background color, the target processor further providing within the color display a second background area of the first background color and a second character of the second foreground color, the second character being positioned within the second background area, the second character being invisible against the second background area; the emulator mapping the second character to the first background pattern.

* * * * *